United States Patent
Hatano et al.

(10) Patent No.: US 12,295,455 B2
(45) Date of Patent: May 13, 2025

(54) SHOE

(71) Applicant: ASICS CORPORATION, Kobe (JP)

(72) Inventors: Genki Hatano, Kobe (JP); Norihiko Taniguchi, Kobe (JP); Shinsaku Wakasugi, Kobe (JP); Yousuke Atarashi, Kobe (JP); Shingo Takashima, Kobe (JP); Yuya Kozuka, Kobe (JP); Satoru Abe, Kobe (JP); Masanori Sakaguchi, Kobe (JP)

(73) Assignee: ASICS CORPORATION, Kobe (JP)

( * ) Notice: Subject to any disclaimer, the term of this patent is extended or adjusted under 35 U.S.C. 154(b) by 0 days.

(21) Appl. No.: 17/675,636

(22) Filed: Feb. 18, 2022

(65) Prior Publication Data
US 2022/0264997 A1    Aug. 25, 2022

(30) Foreign Application Priority Data

Feb. 19, 2021    (JP) .................................. 2021-025352

(51) Int. Cl.
*A43B 23/02* (2006.01)
*A43B 23/22* (2006.01)

(52) U.S. Cl.
CPC ............ *A43B 23/028* (2013.01); *A43B 23/02* (2013.01); *A43B 23/0225* (2013.01); *A43B 23/0235* (2013.01); *A43B 23/22* (2013.01)

(58) Field of Classification Search
CPC . A43B 23/02; A43B 23/0225; A43B 23/0235; A43B 23/042

(Continued)

(56) References Cited

U.S. PATENT DOCUMENTS 10,241,498 B1    3/2019  Beard et al.
2006/0048413 A1*  3/2006  Sokolowski ....... A43B 23/0235
                                                    36/45

(Continued)

FOREIGN PATENT DOCUMENTS

JP    2018-534990 A    11/2018
JP    2020-036880 A     3/2020

(Continued)

OTHER PUBLICATIONS

The extended European search report issued by the European Patent Office dated Jun. 28, 2022, which corresponds to European Patent Application No. 22156844.7-1015 and is related to U.S. Appl. No. 17/675,636.

(Continued)

*Primary Examiner* — Marie D Bays
(74) *Attorney, Agent, or Firm* — Studebaker & Brackett PLLC

(57) ABSTRACT

A shoe comprises a flexible shell having an internal space and a sole body accommodated in the shell. The shell includes a bottom wall portion and a peripheral wall portion. The bottom wall portion and a portion of the peripheral wall portion adjacent to the bottom wall portion define a lower space which is a space of the internal space in which the sole body is disposed. A portion of the peripheral wall portion located above the portion adjacent to the bottom wall portion forms an upper space of the internal space that is a space in which the wearer's foot is inserted. The bottom wall portion covers a lower surface of the sole body and thus has an external surface configuring a tread of the shoe.

18 Claims, 38 Drawing Sheets

(58) Field of Classification Search
USPC .................................................... 36/45, 55
See application file for complete search history.

(56) References Cited

U.S. PATENT DOCUMENTS

| | | | |
|---|---|---|---|
| 2016/0166007 A1* | 6/2016 | Bruce | A43B 23/042 36/31 |
| 2016/0206039 A1 | 7/2016 | Cross et al. | |
| 2016/0206042 A1* | 7/2016 | Cross | A43B 1/04 |
| 2016/0206046 A1* | 7/2016 | Cross | A43B 23/0205 |
| 2017/0325546 A1 | 11/2017 | Becker et al. | |
| 2018/0343961 A1* | 12/2018 | Bruce | A43B 23/042 |
| 2019/0014854 A1* | 1/2019 | Santos | D04C 1/06 |
| 2019/0053569 A1* | 2/2019 | Johnson | A43B 13/141 |
| 2020/0048798 A1 | 2/2020 | O'Haire et al. | |
| 2021/0219659 A1 | 7/2021 | Ventenat | |
| 2021/0227936 A1 | 7/2021 | Nagata et al. | |
| 2022/0007789 A1* | 1/2022 | Corcoran-Tadd | A43B 23/04 |
| 2022/0104588 A1* | 4/2022 | Zinner | A43B 23/042 |
| 2022/0266561 A1* | 8/2022 | Wakasugi | A43B 23/0225 |

FOREIGN PATENT DOCUMENTS

| | | |
|---|---|---|
| WO | 2019/234374 A1 | 12/2019 |
| WO | 2020044492 A1 | 3/2020 |

OTHER PUBLICATIONS

An Office Action; "Notice of Reasons for Refusal," mailed by the Japanese Patent Office on Jun. 4, 2024, which corresponds to Japanese Patent Application No. 2021-025352 and is related to U.S. Appl. No. 17/675,636.

* cited by examiner

SHOE

This nonprovisional application is based on Japanese Patent Application No. 2021-025352 filed on Feb. 19, 2021 with the Japan Patent Office, the entire contents of which are hereby incorporated by reference.

BACKGROUND OF THE INVENTION

Field of the Invention

The present invention relates to a shoe, and more particularly to a shoe comprising a sole body and a shell accommodating the sole body.

Description of the Background Art

U.S. Pat. No. 10,241,498 disclose a shoe comprising a sole body, an upper body, and a shell in which the sole body and the upper body are accommodated, as shown in FIGS. 6E and 6F.

For the shoe disclosed in this document, a plurality of holes are provided in a bottom wall portion of the shell and a plurality of projections are provided on a lower surface of the sole body, and the plurality of projections are inserted into the holes. Thus, the plurality of projections provided on the sole body will be exposed and positioned on an external surface of the bottom wall portion of the shell so as to project outward, and a tread is thus composed of an end surface of each projection.

SUMMARY OF THE INVENTION

The shoe disclosed in the above document has the tread composed of the plurality of projections provided to the sole body, and accordingly, it is necessary to select a material having excellent abrasion resistance as a material constituting the sole body, and there arises a problem in that a room for selection of material for the sole body is reduced in consideration of other functions of the sole body such as better foot comfort, ensured cushioning, and the like.

In order to avoid this, while the plurality of projections may be formed of a material different from the remainder of the sole body, doing so would cause another problem, that is, an increased number of parts, which places a burden on the cost for manufacturing the shoe.

Further, in manufacturing the shoe disclosed in the above document, it is necessary to insert the plurality of projections of the sole body into the plurality of holes in the bottom wall portion of the shell while aligning the plurality of projections with the plurality of holes. This also results in a cumbersome manufacturing step and as a result would place a burden on the cost for manufacturing the shoe.

The present invention has been made in order to address the above issues, and contemplates a shoe that can suppress an increase in the number of parts of the shoe while increasing a degree of freedom in selecting material for a sole body of the shoe and that can also be manufactured more easily than conventional.

A shoe according to the present invention comprises a shell and a sole body. The shell is formed of a flexible member having an internal space to receive a foot of a wearer of the shoe. The sole body is accommodated in the shell and supports the sole of the foot of the wearer. The shell includes a bottom wall portion and a peripheral wall portion erected from a peripheral edge of the bottom wall portion. For the shoe according to the present invention, the bottom wall portion and a portion of the peripheral wall portion adjacent to the bottom wall portion define a lower space of the internal space in which the sole body is disposed, and a portion of the peripheral wall portion located above the portion adjacent to the bottom wall portion defines at least a portion of an upper space of the internal space in which the foot of the wearer is inserted. For the shoe according to the present invention, the bottom wall portion covers a lower surface of the sole body and thus has an external surface configuring a tread of the shoe.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described in detail with reference to the accompanying drawings. In the following embodiments, identical or common portions are identically denoted in the figures, and will not be described repeatedly.

First Embodiment

Figure 1:
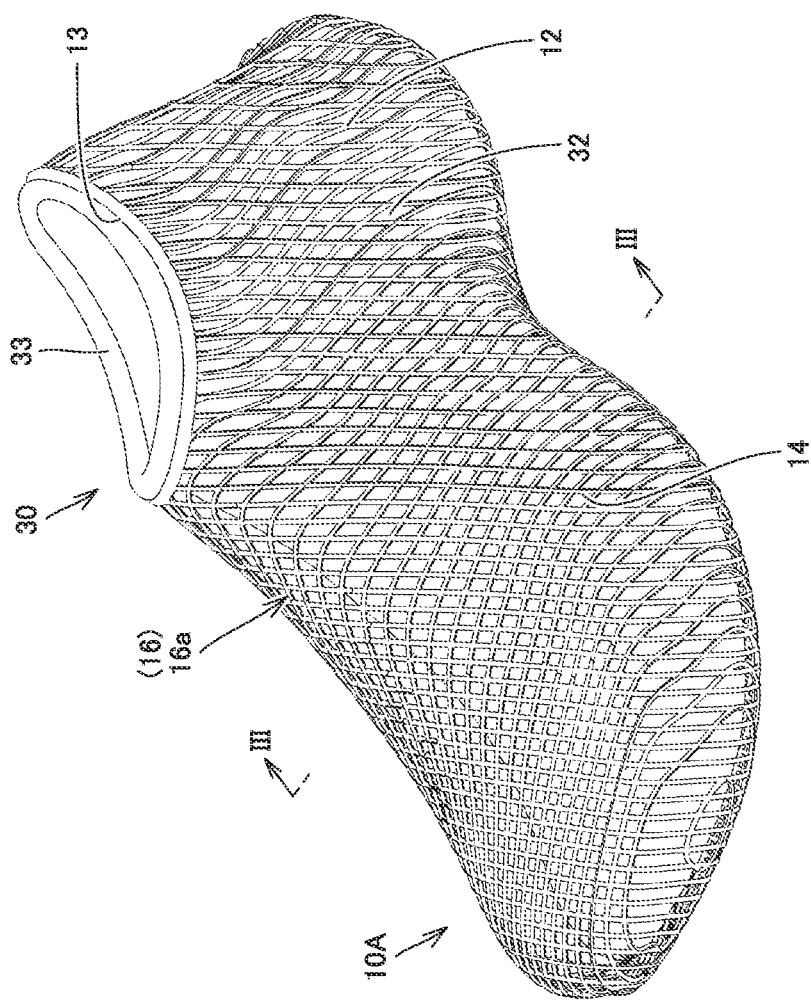
FIG. 1 is a perspective view of a shoe according to a first embodiment.
Figure 2:
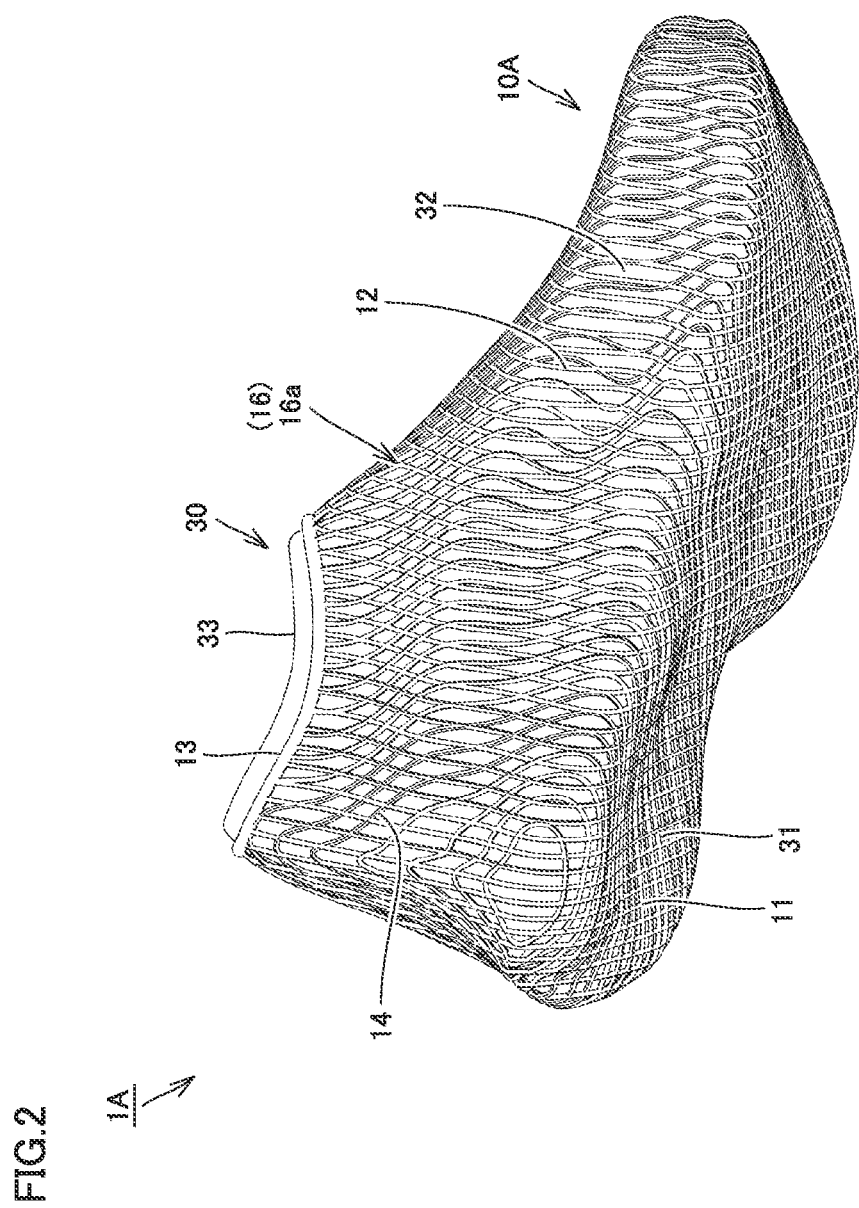
FIG. 2 is a perspective view of the shoe shown in FIG. 1, as seen in a different direction.
Figure 3:
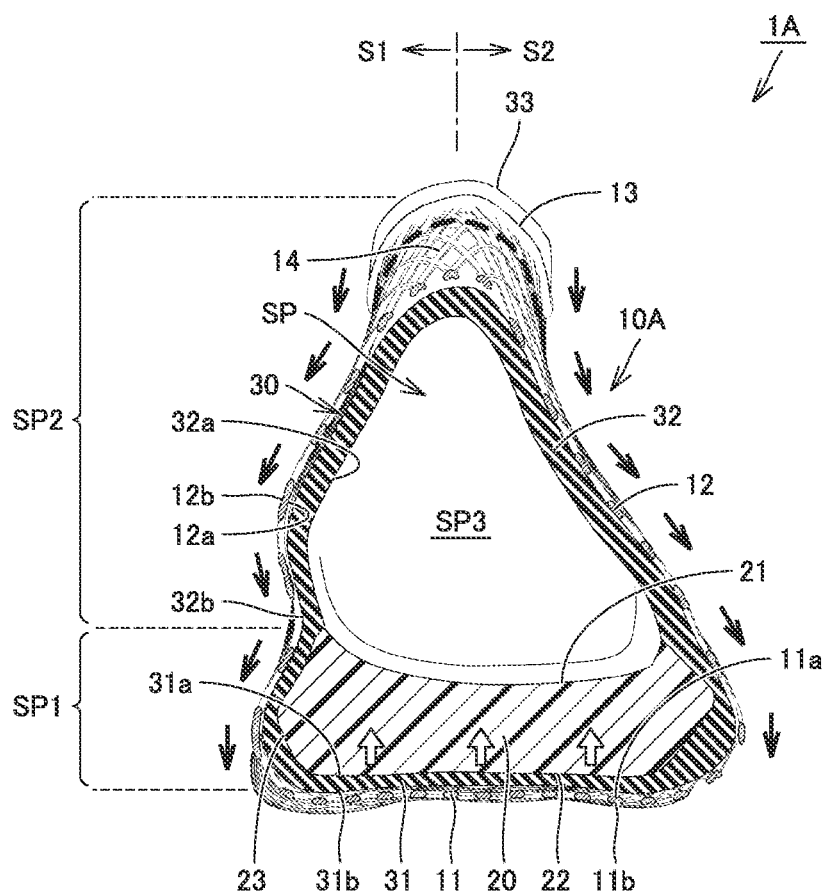
FIG. 3 is a cross-sectional view of the shoe shown in FIG. 1.

FIG. 1 is a perspective view of a shoe according to a first embodiment and FIG. 2 is a perspective view of the shoe shown in FIG. 1, as seen in a different direction. FIG. 3 is a cross section taken along a line III-III indicated in FIG. 1. Initially, a configuration of a shoe 1A according to the present embodiment will be described with reference to FIGS. 1 to 3.

As shown in FIGS. 1 to 3, the shoe 1A according to the present embodiment is in the form of a sock substantially entirely covering a foot of a wearer of the shoe (that is, a portion on the side of the distal end as seen at an ankle) and comprises a shell 10A, a sole body 20 (see FIG. 3) and an upper body 30. An upper portion of the shoe 1A is provided with a topline 33 through which the foot of the wearer is inserted, and an internal space SP (see FIG. 3) into which the foot of the wearer is inserted when the shoe 1A is worn is formed inside the shoe 1A.

Prior to describing a specific configuration of the shoe 1A, the names of parts of the shoe 1A will be described with reference to FIG. 5 described hereinafter. Although the FIG. 5 plan view only shows the shell 10A for convenience of illustration, similar names are used when the shoe 1A is viewed as a whole.

Figure 5:
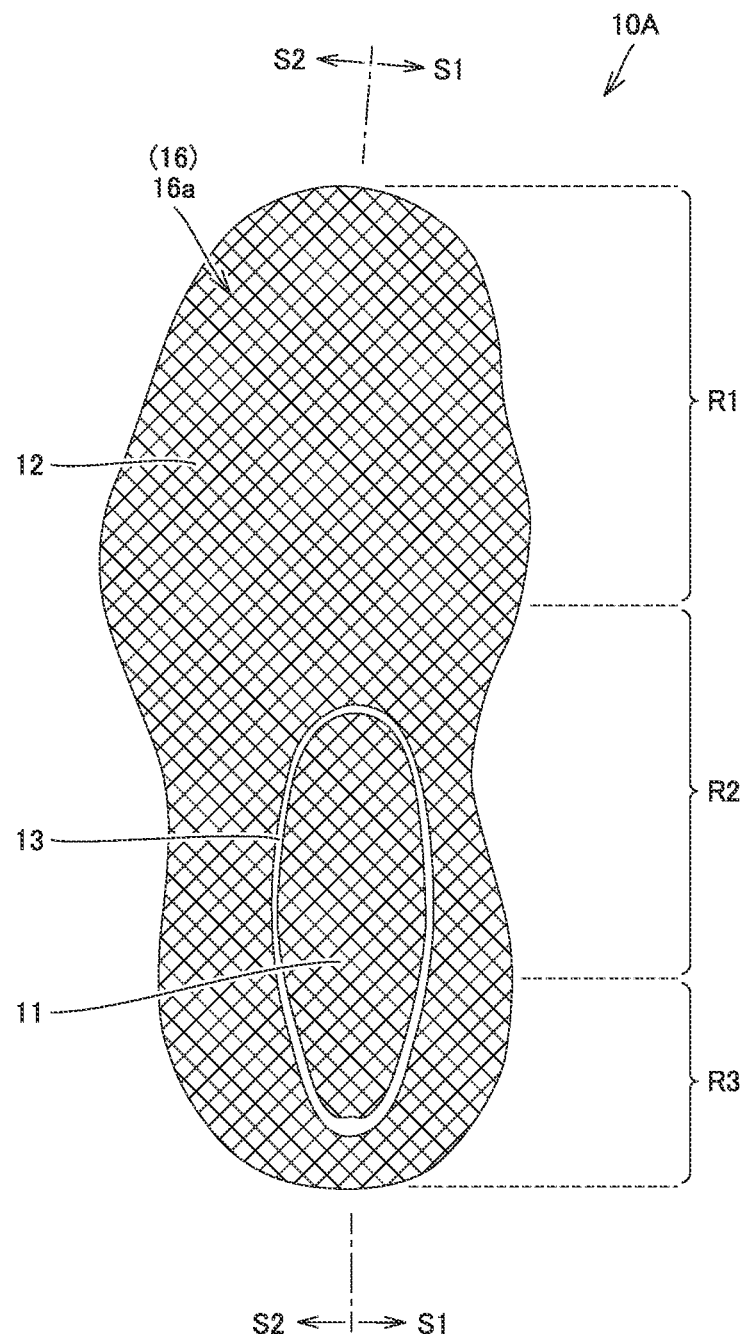
FIG. 5 is a schematic plan view of a shell shown in FIG. 1.

Further, as shown in FIG. 5, in a lateral direction (a generally lateral direction in FIG. 5) that is a direction matching the direction of the width of the foot of the wearer in plan view, the shoe 1A is divided into a portion on a medial foot side representing a medial side of the foot in anatomical position (that is, a side closer to the median) (i.e., a portion on a side S1 in FIG. 5) and a portion on a lateral foot side representing a lateral side of the foot in anatomical position (that is, a side farther from the median) (i.e., a portion on a side S2 in FIG. 5).

Further, in a longitudinal direction (a generally vertical direction in FIG. 5) that is a direction matching the direction of the length of the foot of the wearer in plan view, the shoe 1A is divided into a forefoot portion R1 located to correspond to the toes and ball of the foot of the wearer, a midfoot portion R2 located to correspond to the arch of the foot of the wearer, and a rearfoot portion R3 located to correspond the heel of the foot of the wearer.

Herein, with reference to the front end of the shoe 1A, when a position corresponding to a dimension of 40% of a dimension of the shoe 1A in the longitudinal direction of the shoe 1A from the front end is defined as a first boundary position, and a position corresponding to a dimension of 80% of the dimension of the shoe 1A in the longitudinal direction of the shoe 1A from the front end is defined as a second boundary position, the forefoot portion R1 corresponds to a portion included between the front end and the first boundary position in the longitudinal direction, the midfoot portion R2 corresponds to a portion included between the first boundary position and the second boundary position in the longitudinal direction, and the rearfoot portion R3 corresponds to a portion included between the second boundary position and the rear end of the shoe 1A in the longitudinal direction.

As shown in FIGS. 1 to 3, for the shoe 1A according to the present embodiment, the sole body 20 is accommodated in the upper body 30, and the upper body 30 with the sole body 20 accommodated therein is further accommodated in the shell 10A. The shell 10A, the sole body 20, and the upper body 30 are all located across the forefoot portion R1, the midfoot portion R2, and the rearfoot portion R3.

More specifically, the shell 10A constitutes an outermost shell of the shoe 1A, and is formed of a single flexible member in the form of a bag. The shell 10A includes a bottom wall portion 11 and a peripheral wall portion 12 erected to extend continuously upward from a peripheral edge of the bottom wall portion 11, and the bottom wall portion 11 defines an outermost surface of the shoe 1A located on a lower side of the shoe 1A in the vertical direction and the peripheral wall portion 12 defines an outermost surface of the shoe 1A located in the longitudinal direction and the lateral direction.

The bottom wall portion 11 has an inner surface 11a and an outer surface 11b serving as a pair of main surfaces, and the peripheral wall portion 12 has an inner surface 12a and an outer surface 12b serving as a pair of main surfaces. The shell 10A has the bottom wall portion 11 and the peripheral wall portion 12 composed of a mesh member 16a serving as a base structure portion 16, and accordingly, these portions of the shell 10A have numerous holes 14 formed to reach the inner surfaces 11a and 12a and the outer surfaces 11b and 12b. Details of the base structure portion 16 will be described hereinafter.

An insertion portion 13 in the form of an opening is provided at an upper end of the peripheral wall portion 12. The insertion portion 13 is provided across the midfoot portion R2 and the rearfoot portion R3.

As shown in FIG. 3, an internal space SP is formed in the shell 10A. The internal space SP is defined by the inner surface 11a of the bottom wall portion 11 and the inner surface 12a of the peripheral wall portion 12, and communicates with the insertion portion 13. The internal space SP is located across the forefoot portion R1, the midfoot portion R2, and the rearfoot portion R3. The internal space SP includes a space in which the sole body 20 and the upper body 30 are disposed as they are accommodated therein, and an insertion space SP3 that is a space in which a foot of the wearer is inserted.

As shown in FIGS. 1 to 3, the upper body 30 configures a part of a portion of the shoe 1A that comes into contact with the foot of the wearer to hold the foot of the wearer, and is composed of a flexibly deformable bag-shaped member. The upper body 30 is accommodated in the internal space SP of the shell 10A. The upper body 30 includes a bottom portion 31 and a wall portion 32 erected to extend continuously upward from a peripheral edge of the bottom portion 31.

The bottom portion 31 has an inner surface 31a and an outer surface 31b serving as a pair of main surfaces, and the wall portion 32 has an inner surface 32a and an outer surface 32b serving as a pair of main surfaces. The outer surface 31b of the bottom portion 31 of the upper body 30 faces the inner surface 11a of the bottom wall portion 11 of the shell 10A, and the outer surface 32b of the wall portion 32 of the upper body 30 faces the inner surface 12a of the peripheral wall portion 12 of the shell 10A. Thus, the bottom portion 31 covers the inner surface 11a of the bottom wall portion 11 of the shell 10A, and the wall portion 32 covers the inner surface 12a of the peripheral wall portion 12 of the shell 10A.

In addition, the above-described topline 33 is provided at an upper end of the wall portion 32. The topline 33 is provided across the midfoot portion R2 and the rearfoot portion R3.

Figure 4:
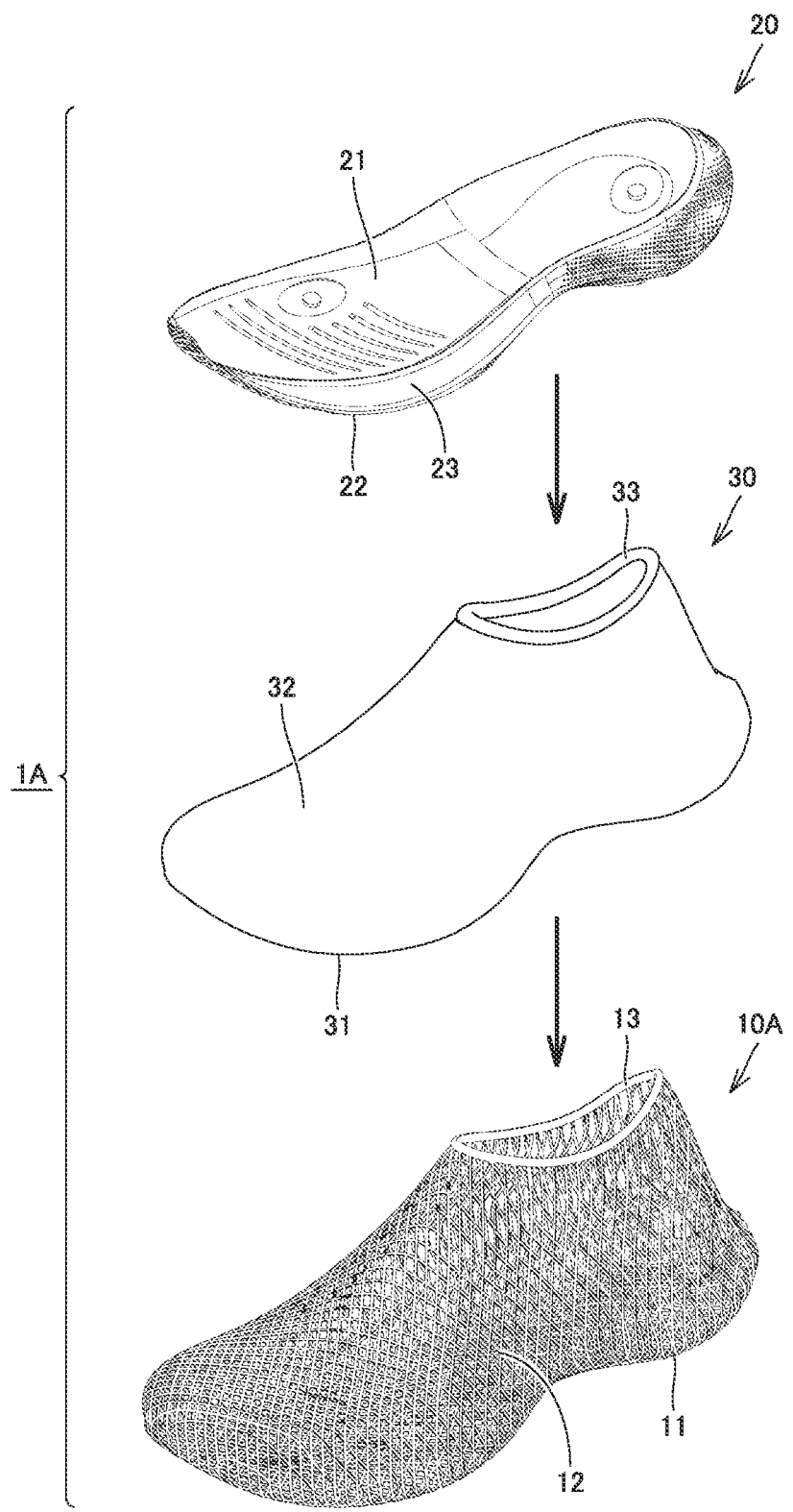
FIG. 4 is an exploded perspective view for illustrating a structure for assembling the shoe shown in FIG. 1.

The sole body 20 forms a part of a portion of the shoe 1A that comes into contact with the foot of the wearer to support the sole of the foot of the wearer, and is composed of an elastically deformable flat member (see FIG. 4). The sole body 20 is accommodated in the internal space SP of the shell 10A, and further accommodated in the upper body 30.

The sole body 20 has an upper surface 21 and a lower surface 22 serving as a pair of main surfaces, and a side surface 23 interconnecting the upper surface 21 and the lower surface 22. The lower surface 22 of the sole body 20 faces the inner surface 31a of the bottom portion 31 of the upper body 30, and the side surface 23 of the sole body 20 faces a portion of the inner surface 32a of the wall portion 32 of the upper body 30 closer to a lower end. Thus, the sole body 20 covers the inner surface 31a of the bottom portion 31 of the upper body 30 and the portion of the inner surface 32a of the wall portion 32 of the upper body 30 closer to the lower end.

As shown in FIG. 3, the internal space SP of the shell 10A is divided into a lower space SP1 and an upper space SP2. The lower space SP1 is located at a lower portion of the shoe 1A in the vertical direction, and the upper space SP2 is located at an upper portion of the shoe 1A in the vertical direction.

The lower space SP1 is a space defined by the bottom wall portion 11 and a portion of the peripheral wall portion 12 adjacent to the bottom wall portion 11 (hereinafter, this portion of the peripheral wall portion 12 will be referred to as a "first portion"), and the entirety of the sole body 20 and a lower portion of the upper body 30 (that is, the bottom portion 31 and a portion of the wall portion 32 adjacent to the bottom portion 31) are disposed in the lower space SP1.

The upper space SP2 is a space defined by a portion of the peripheral wall portion 12 located above the first portion (hereinafter, this portion of the peripheral wall portion 12 will be referred to as a "second portion"), and an upper portion of the upper body 30 (that is, a portion of the wall portion 32 located above the portion of the wall portion 32 adjacent to the bottom portion 31) is disposed in the upper space SP2.

As described above, since the upper body 30 is accommodated in the internal space SP so as to cover the inner surfaces 11a and 12a of the shell 10A, and the sole body 20 is accommodated in the internal space SP so as to cover the inner surface 31a of the bottom portion 31 of the upper body 30 and the portion of the inner surface 32a of the wall portion 32 of the upper body 30 closer to the lower end, the insertion space SP3 defined by the sole body 20 and the upper body 30 will be formed in the internal space SP of the shell 10A.

The insertion space SP3 is a space in which the foot of the wearer is inserted when the shoe is worn, and more specifically, it is defined by the upper surface 21 of the sole body 20 and a portion of the inner surface 32a of the wall portion 32 of the upper body 30 uncovered with the sole body 20 (that is, the inner surface 32a of the wall portion 32 at a location corresponding to the second portion of the peripheral wall portion 12 of the shell 10A). The insertion space SP3 is included in the upper space SP2 of the internal space SP.

Note that, for the shoe 1A according to the present embodiment, the upper body 30 has a shape that entirely covers a portion of the foot of the wearer on the side of the distal end as seen at an ankle of the wearer, and a portion of the shell 10A that defines the upper space SP2, at a portion other than that corresponding to the topline 33 through which the foot of the wearer is inserted, entirely covers a portion of the foot of the wearer excluding the sole of the foot of the wearer.

Therefore, when a user wears the shoe 1A, a portion of the foot of the wearer excluding the wearer's sole (i.e., the instep and a peripheral surface of the heel, etc.) comes into contact with the inner surface 32a of the wall portion 32 of the flexibly deformable upper body 30, and the sole of the foot of the wearer comes into contact with the upper surface 21 of the elastically deformable sole body 20. Therefore, the shell 10A does not come into direct contact with the foot of the wearer, thereby ensuring that the user wears the shoe comfortably.

Note that it is not a requirement that the upper body 30 and the sole body 20 entirely come into contact with the foot of the wearer, and the upper body 30 and the sole body 20 may be notched away or have a portion removed to have an opening insofar as the user can wear the shoe comfortably.

For the shoe 1A according to the present embodiment, as has been described above, an outermost shell of the shoe 1A is composed of the shell 10A, and in particular, by covering the lower surface 22 of the sole body 20 with the bottom wall portion 11 of the shell 10A, an outermost surface of the shoe 1A located on a lower side in the vertical direction is defined by the bottom wall portion 11 of the shell 10A. Thus, the shoe 1A has a tread composed of the outer surface 11b of the bottom wall portion 11 of the shell 10A.

Accordingly, by this configuration, in contrast to conventional shoes, the sole body 20 does not form a tread, which significantly increases a room for selection of material for the sole body 20, and an optimal material can be selected for the sole body 20 for functions required for a general sole in view of improved foot comfort and ensured cushioning. Performance required for the tread, such as abrasion resistance and grip, can be ensured by selecting a material for the shell 10A or in addition selecting a shape therefor. Therefore, the number of parts is not increased as compared with conventional shoes.

Thus, the shoe 1A according to the present embodiment can suppress an increase in the number of parts thereof while increasing a degree of freedom in selecting a material for the sole body.

Further, for the shoe 1A according to the present embodiment, as has been described above, the outermost shell of the shoe 1A is composed of the shell 10A, and the shell 10A includes the bottom wall portion 11 that defines the tread, and the peripheral wall portion 12 erected from a peripheral edge of the bottom wall portion 11 and including a portion that covers the instep of a foot of the wearer. By this configuration, there is also an advantage in that the shoe presents higher performance than a conventional shoe having an outermost shell composed of a sole and an upper (that is, a shoe which does not comprise such a member as the shell 10A of the shoe 1A according to the present embodiment).

That is, the above-described conventional shoe is typically configured such that the upper including a portion covering the instep of the foot of the wearer is composed of a woven material, a knitted material, nonwoven fabric, or the like and furthermore, the upper is bonded or the like to the sole by adhesion or the like, and accordingly, a delay is easily caused in a period of time for which a load acting on the portion of the upper that covers the instep when the wearer of the shoe kicks the ground is transmitted to the sole via a side wall of the upper, and the shoe would poorly follow the foot for running or the like, in particular.

In contrast, the shoe 1A according to the present embodiment is configured such that the peripheral wall portion 12 of the shell 10A including a portion covering the instep of the foot of the wearer is composed of a member composed of resin or rubber, as will be described hereinafter, and in addition, composed of a harder material than a woven material, a knitted material, nonwoven fabric, and the like, and furthermore, the peripheral wall portion 12 including the portion covering the instep and the bottom wall portion 11 including a portion defining the tread are integrally composed of the shell 10A composed of a single member. This allows a load acting when kicking the ground to be transmitted faster, and the shoe can thus excellently follow the foot for running, in particular. A direction in which the shell 10A transmits a load is schematically indicated in FIG. 3 by solid arrows, and a direction of a load thereby acting on the bottom wall portion 11 of the shell 10A is schematically indicated in FIG. 3 by blank arrows.

Thus, the shoe 1A according to the present embodiment can not only suppress an increase in the number of parts thereof while increasing a degree of freedom in selecting a material for the sole body but can also excellently follow the foot.

FIG. 4 is an exploded perspective view for illustrating a structure for assembling the shoe according to the present embodiment. Hereinafter, a structure and method for assembling the shoe 1A according to the present embodiment will be described with reference to FIG. 4.

As shown in FIG. 4, the shoe 1A according to the present embodiment is manufactured by assembling together the shell 10A, the sole body 20, and the upper body 30 separately manufactured in advance. The shell 10A, the sole body 20 and the upper body 30 may be manufactured in any method.

Specifically, initially, the upper body 30 is inserted into the internal space SP of the shell 10A. As the upper body 30 is flexibly deformable, the upper body 30 can be inserted into the internal space SP of the shell 10A via the insertion portion 13 in the form of an opening provided at an upper end of the shell 10A. The inserted upper body 30 is disposed along the inner surfaces 11a and 12a of the shell 10A. The upper body 30 in a vicinity of the topline 33 is externally exposed from the insertion portion 13 of the shell 10A.

Subsequently, the upper body 30 is fixed to the shell 10A. This can be done for example by sewing, bonding, welding, clipping, or engagement by engaging portions provided to the upper body 30 and the shell 10A, or the like. When the upper body 30 does not easily move inside the shell 10A, the former may not be fixed to the latter.

Subsequently, the sole body 20 is inserted into the internal space SP of the shell 10A (more precisely, an interior of the upper body 30 disposed in the internal space SP of the shell 10A). Since the sole body 20 is elastically deformable, the sole body 20 can be inserted into the internal space SP of the shell 10A through the insertion portion 13 in the form of an opening provided at the upper end of the shell 10A (more precisely, the topline 33 provided to the upper body 30). The inserted sole body 20 is disposed along the inner surface 31a of the bottom portion 31 of the upper body 30.

Subsequently, the sole body 20 is fixed to the upper body 30. This can be done for example by sewing, bonding, welding, clipping, or engagement by engaging portions provided to the sole body 20 and the upper body 30, or the like. When the sole body 20 does not easily move inside the upper body 30, the former may not be fixed to the latter.

The above procedure completes assembling the shell 10A, the sole body 20 and the upper body 30 together, and hence manufacturing the shoe 1A according to the present embodiment. Note that the above-described assembling method is merely an example, and other assembling methods may be adopted.

Thus, the shoe 1A according to the present embodiment can be manufactured through a very simple operation, that is, the shell 10A, the sole body 20, and the upper body 30 that are separately manufactured in advance are assembled together, and the shoe is thus manufactured more easily than conventional. In addition, assembling the shell 10A, the sole body 20 and the upper body 30 together does not require a cumbersome positioning operation or the like, either.

Thus, the shoe 1A according to the present embodiment can not only suppress an increase in the number of parts thereof while increasing a degree of freedom in selecting a material for the sole body but can also be manufactured more easily than conventional.

While the shell 10A may basically be formed of any material that is flexible, preferably, the shell 10A has appropriate strength. From this viewpoint, the shell 10A is preferably composed of a resin material or a rubber material. More specifically, when the shell 10A is composed of resin, for example, it can for example be polyolefin resin, an ethylene-vinyl acetate copolymer (EVA), a polyamide-based thermoplastic elastomer (TPA, TPAE), thermoplastic polyurethane (TPU), or a polyester-based thermoplastic elastomer (TPEE). When the shell 10A is composed of rubber, it can for example be butadiene rubber.

The shell 10A can also be composed of a polymer composition. In that case, examples of a polymer contained in the polymer composition include olefinic polymers such as olefinic elastomers and olefinic resins. Examples of the olefinic polymer include polyolefins of polyethylene (for example, linear low density polyethylene (LLDPE), high density polyethylene (HDPE), and the like), polypropylene, an ethylene-propylene copolymer, a propylene-1-hexene copolymer, a propylene-4-methyl-1-pentene copolymer, a propylene-1-butene copolymer, an ethylene-1-hexene copolymer, an ethylene-4-methyl-pentene copolymer, an ethylene-1-butene copolymer, a 1-butene-1-hexene copolymer, 1-butene-4-methyl-pentene, an ethylene-methacrylic acid copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer, an ethylene-butyl acrylate copolymer, a propylene-methacrylic acid copolymer, a propylene-methyl methacrylate copolymer, a propylene-ethyl methacrylate copolymer, a propylene-butyl methacrylate copolymer, a propylene-methyl acrylate copolymer, a propylene-ethyl acrylate copolymer, a propylene-butyl acrylate copolymer, an ethylene-vinyl acetate copolymer (EVA), and a propylene-vinyl acetate copolymer.

The polymer may be an amide-based polymer such as an amide-based elastomer or an amide-based resin. Examples of the amide-based polymer include polyamide 6, polyamide 11, polyamide 12, polyamide 66, and polyamide 610.

The polymer may be an ester-based polymer such as an ester-based elastomer or an ester-based resin. Examples of the ester-based polymer include polyethylene terephthalate and polybutylene terephthalate.

The polymer may be a urethane-based polymer such as a urethane-based elastomer or a urethane-based resin. Examples of the urethane-based polymer include polyester-based polyurethane and polyether-based polyurethane, and urethane acrylate can be suitably used.

The polymer may be a styrene-based polymer such as a styrene-based elastomer or a styrene-based resin. Examples of the styrene-based elastomer include a styrene-ethylene-butylene copolymer (SEB), a styrene-butadiene-styrene copolymer (SBS), a hydrogenated product of SBS (a styrene-ethylene-butylene-styrene copolymer (SEBS)), a styrene-isoprene-styrene copolymer (SIS), a hydrogenated product of SIS (a styrene-ethylene-propylene-styrene copolymer (SEPS)), a styrene-isobutylene-styrene copolymer (SIBS), styrene-butadiene-styrene-butadiene (SBSB), and styrene-butadiene-styrene-butadiene-styrene (SBSBS). Examples of the styrene-based resin include polystyrene, acrylonitrile styrene resin (AS), and acrylonitrile butadiene styrene resin (ABS).

Examples of the polymer include polymethylmethacrylate or similar urethane-based acrylic polymers, polyester-based acrylic polymers, polyether-based acrylic polymers, polycarbonate-based acrylic polymers, epoxy-based acrylic polymers, conjugated diene polymer-based acrylic polymers and hydrogenated products thereof, urethane-based methacrylic polymers, polyester-based methacrylic polymers, polyether-based methacrylic polymers, polycarbonate-based methacrylic polymers, epoxy-based methacrylic polymers, conjugated diene polymer-based methacrylic polymers and hydrogenated products thereof, a polyvinyl chloride-based resin, a silicone-based elastomer, butadiene rubber (BR), isoprene rubber (IR), chloroprene rubber (CR), natural rubber (NR), styrene-butadiene rubber (SBR), acrylonitrile-butadiene rubber (NBR), butyl rubber (IIR), and the like.

While the sole body 20 may basically be composed of any material that is elastically deformable, preferably, the sole body 20 is composed of a member having an excellent cushioning effect while having appropriate strength. From this point of view, for example, a resin foam material including a resin material as a main component and a foaming agent, a crosslinking agent and the like as a subcomponent is used as the sole body 20. Alternatively, a rubber foam material including a rubber material as a main component and a plasticizer, a foaming agent, a reinforcing agent, and a crosslinking agent as subcomponents may be used.

Particularly suitably, the sole body 20 can be composed of a foam material such as polyolefin resin, an ethylene-vinyl acetate copolymer (EVA), a polyamide-based thermoplastic elastomer (TPA, TPAE), thermoplastic polyurethane (TPU), a polyester-based thermoplastic elastomer (TPEE) and the like. The sole body 20 is not necessarily formed of a foam material, and may be formed of a non-foam material.

While the upper body 30 may basically be formed of any material that is flexibly deformable, preferably, it is a woven material, a knitted material, nonwoven fabric, synthetic leather, resin, or the like. In particular, as will be described hereinafter, when it is formed of a woven material, a knitted material, nonwoven fabric or the like of heat-shrinkable synthetic fiber, the upper body 30 can better fit the foot of the wearer. Examples of the heat-shrinkable synthetic fiber include those including polyester, polyurethane, or the like as a main component.

That is, when the upper body 30 is formed of a woven material, a knitted material, nonwoven fabric or the like of heat-shrinkable synthetic fiber, the upper body 30 is formed in the form of a bag in advance and undergoes heat treatment with a last inserted therein. The upper body 30 is heated and thus shrinks, and is thus changed in shape to come into close contact with the last and will maintain the changed shape. Therefore, by preparing a last corresponding to the shape of the foot of the wearer, and molding the upper body 30 using the last, the upper body 30 can be formed to fit the foot of the wearer. Further, when the above-described heat treatment using the last is performed with the upper body incorporated in the shell 10A, the upper body 30 will also fit the shell 10A, and the shoe can further better fit the foot of the wearer.

Note that, while the last may be of a standard shape corresponding to the size of the foot of the wearer, using a last manufactured based on foot shape data obtained by actually measuring the foot of the wearer allows the shoe 1A to be manufactured to further better fit the foot of the wearer.

While the shell 10A may be manufactured in any method, it can for example be manufactured by injection molding, cast molding, or additive manufacturing using a three-dimensional additive manufacturing apparatus. In particular, when the shell 10A is additively manufactured using a three-dimensional additive manufacturing apparatus, the shell 10A can have a variety of structures which are difficult to manufacture by injection molding or cast molding.

Figure 6:
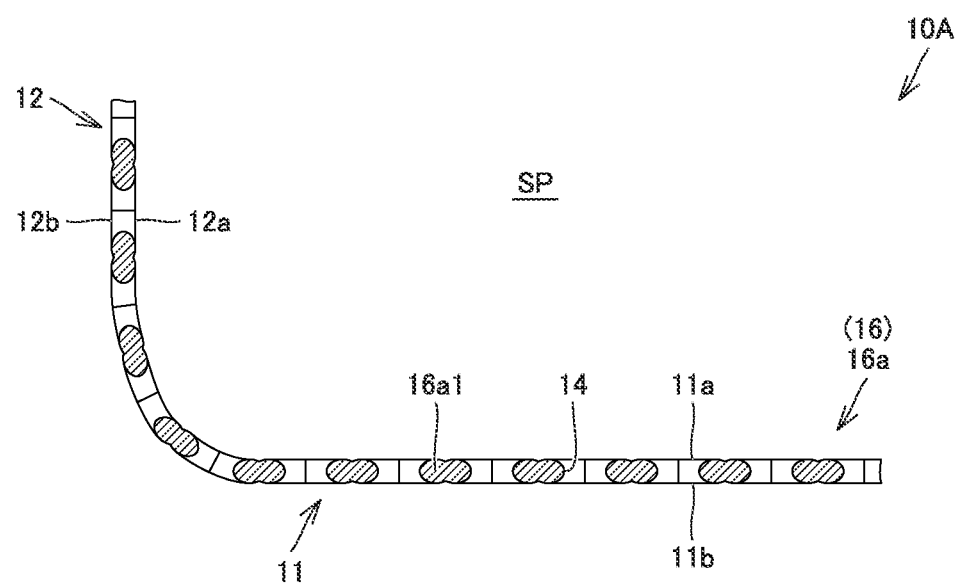
FIG. 6 is a partial cross-sectional view of the shell shown in FIG. 5.

FIG. 5 is a schematic plan view of a shell that the shoe according to the present embodiment comprises, and FIG. 6 is a partial cross-sectional view of the shell shown in FIG. 5. Hereinafter, a structure of the shell 10A that the shoe 1A according to the present embodiment comprises will be described in detail with reference to FIGS. 5 and 6 and FIGS. 1 to 4.

As shown in FIGS. 5 and 6, the shell 10A has a base structure portion 16 composed of a curved mesh member 16a. As shown in FIGS. 1 to 5, this base structure portion 16 is located throughout the bottom wall portion 11 and peripheral wall portion 12 of the shell 10A (that is, throughout the shell 10A excluding the insertion portion 13).

Thus, the inner surface 11a and the outer surface 11b of the bottom wall portion 11 are composed of a pair of main surfaces of the base structure portion 16 composed of the mesh member 16a, and the inner surface 12a and the outer surface 12b of the peripheral wall portion 12 are also composed of a pair of main surfaces of the base structure portion 16 composed of the mesh member 16a. It is not a requirement that the mesh member 16a be entirely curved, and it may be partially uncurved.

The mesh member 16a includes a plurality of wire elements 16a1 connected so as to intersect with one another, and thereby has intersection points formed as the wire elements 16a1 intersect with one another, and a hole 14 located between adjacent wire elements 16a1. The cross section shown in FIG. 6 is a cross section including an intersection of the wire elements 16a1. For the shell 10A, the plurality of wire elements 16a1 are disposed to be orthogonal to one another in the form of a lattice, and the plurality of wire elements 16a1 are each disposed to extend obliquely with respect to the longitudinal and lateral directions of the shoe 1A.

Providing the shell 10A with the numerous holes 14 reduces the shell 10A in weight, and the numerous holes 14 allowing the upper body 30 accommodated in the internal space SP of the shell 10A to be externally visible contribute to improvement in design.

While the shell 10A having such a structure can also be manufactured by injection molding or cast molding, the shell 10A can be relatively easily manufactured by additive manufacturing using a three-dimensional additive manufacturing apparatus, as set forth above, in particular.

(First to Third Exemplary Variations)

Figure 7:
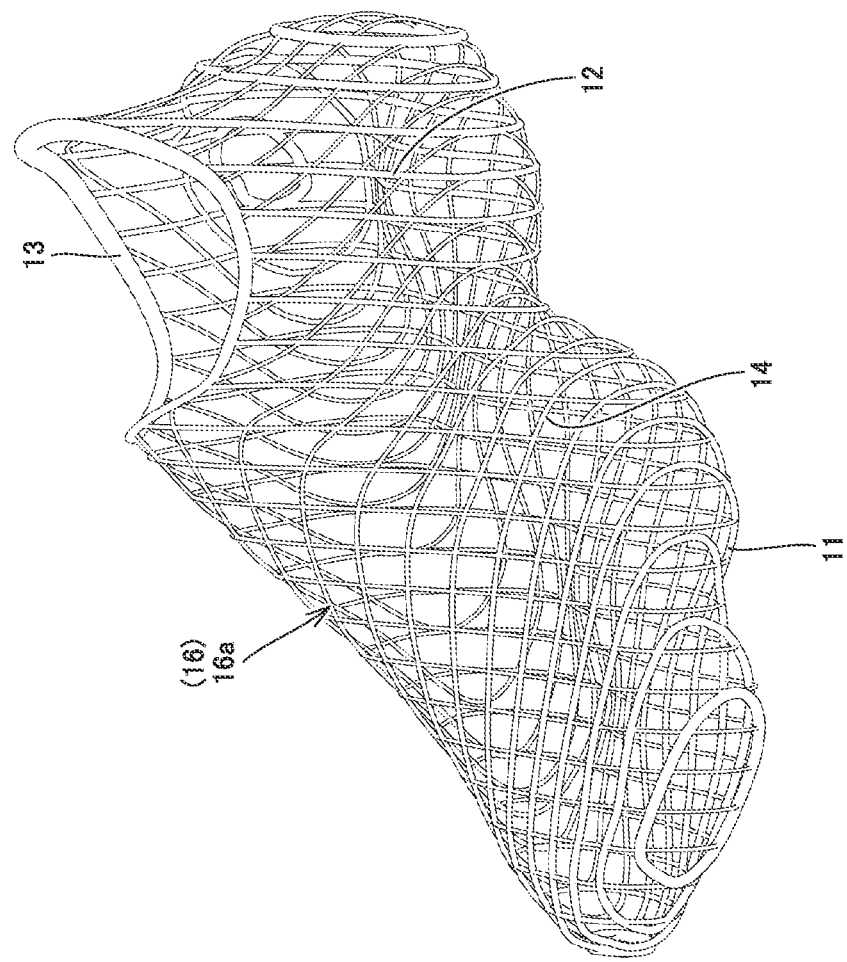
FIG. 7 is a perspective view of a shell that a shoe comprises according to a first exemplary variation.
Figure 8:
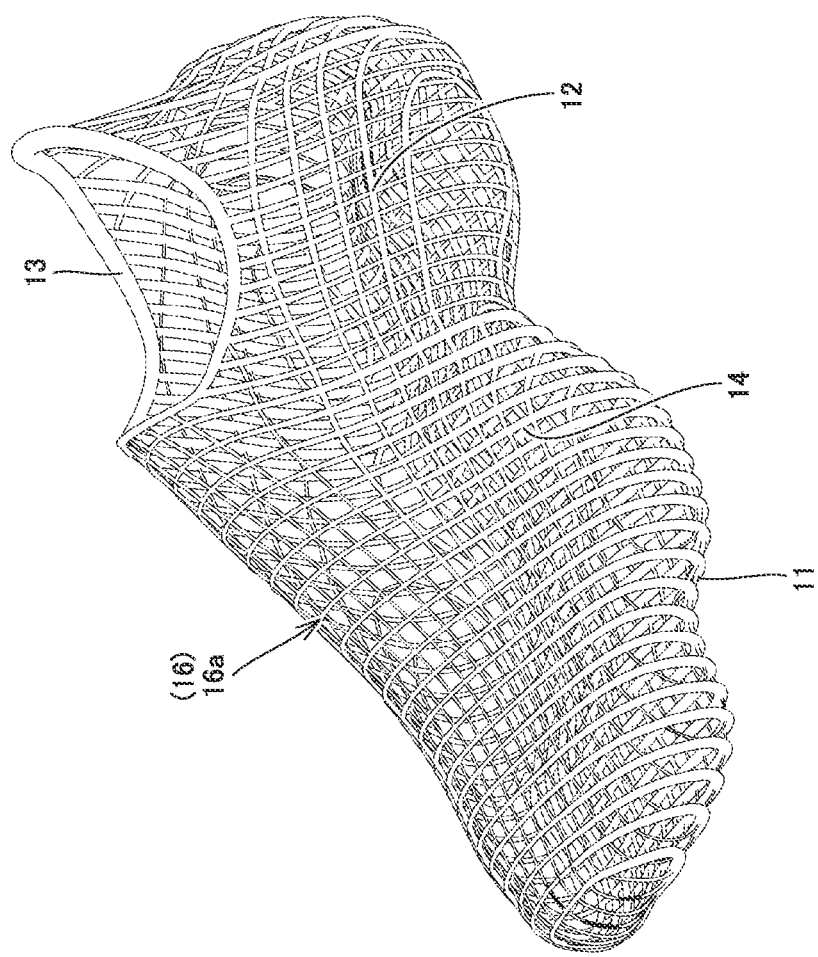
FIG. 8 is a perspective view of a shell that a shoe comprises according to a second exemplary variation.
Figure 9:
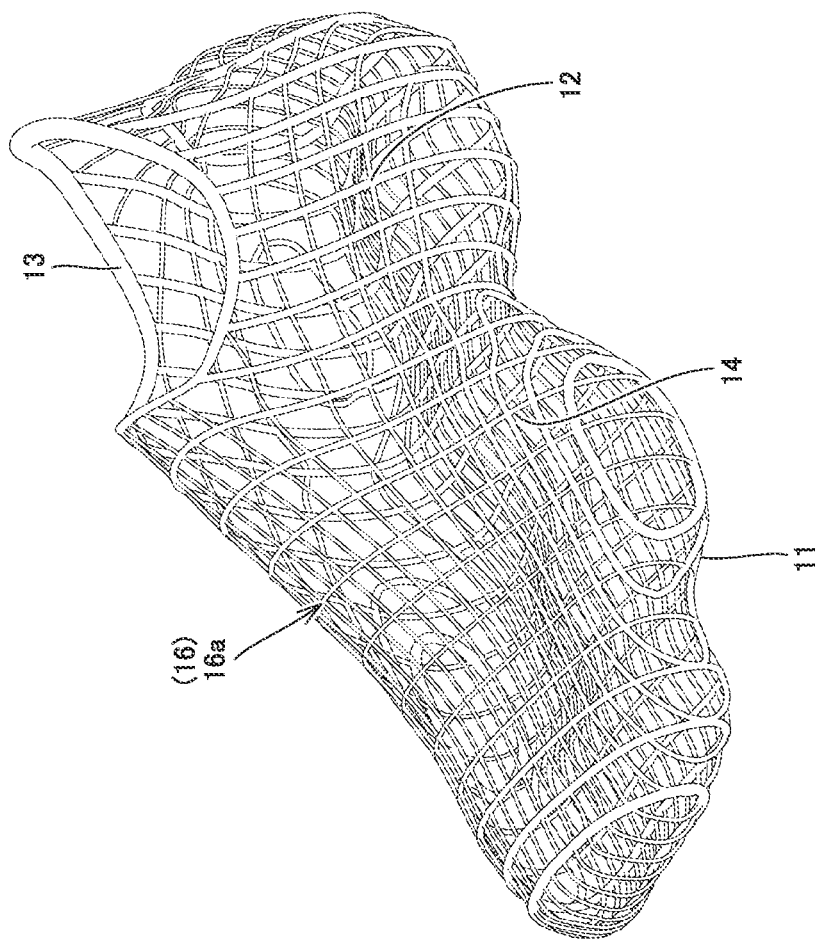
FIG. 9 is a perspective view of a shell that a shoe comprises according to a third exemplary variation.

FIGS. 7 to 9 are perspective views of shells that shoes according to first to third exemplary variations, respectively, comprise. Hereinafter, the shoes according to the first to third exemplary variations based on the first embodiment will be described with reference to FIGS. 7 to 9. The shoes according to the first to third exemplary variations comprise shells 10A1 to 10A3 shown in FIGS. 7 to 9, respectively, instead of the shell 10A that the shoe 1A according to the first embodiment comprises, and have a remainder in configuration similar to that of the first embodiment.

As shown in FIG. 7, the shell 10A1 that the shoe according to the first exemplary variation comprises is different from the shell 10A that the shoe 1A according to the first embodiment comprises in the density of the mesh member 16a serving as the base structure portion 16. That is, when the shell 10A1 is compared with the shell 10A, the former has a larger distance between adjacent wire elements 16a1 and hence is smaller in density than the latter.

As shown in FIG. 8, the shell 10A2 that the shoe according to the second exemplary variation comprises is different from the shell 10A that the shoe 1A according to the first embodiment comprises in that the plurality of wire elements 16a1 included in the mesh member 16a serving as the base structure portion 16 extend in a different direction. That is, for the shell 10A2, the plurality of wire elements 16a1 are disposed to be orthogonal to one another in the form of a lattice, and the plurality of wire elements 16a1 are each disposed to extend in parallel to either the longitudinal direction of the shoe 1A or the lateral direction of the shoe 1A.

As shown in FIG. 9, the shell 10A3 that the shoe according to the third exemplary variation comprises is different from the shell 10A2 that the shoe according to the second exemplary variation comprises in the density of the mesh member 16a serving as the base structure portion 16. That is, when the shell 10A3 is compared with the shell 10A2, the former has a larger distance between adjacent wire elements 16a1 and hence is smaller in density than the latter.

Further, as shown in FIGS. 7 to 9, the shells 10A1 to 10A3 that the shoes according to the first to third exemplary variations comprise are configured such that the plurality of wire elements 16a1 vary in thickness for different portions. Specifically, for these shells 10A1 to 10A3, the plurality of wire elements 16a1 are configured to be larger in thickness at a portion of the forefoot portion R1 closer to the front end, an edge portion of the forefoot portion R1 on the medial side, an edge portion of the forefoot portion R1 on the lateral side, an edge portion of the midfoot portion R2 on the medial side, an edge portion of the midfoot portion R2 on the lateral side, the rearfoot portion R3 (a portion covering a peripheral surface of the heel of the wearer, in particular), and the like than other portions.

Thus, when the wire element 16a1 of the mesh member 16a serving as the base structure portion 16 is changed in thickness for different portions of the shells 10A1 to 10A3, the shells 10A1 to 10A3 can be changed in rigidity for the different portions, which can improve fitness and adjust a degree of transmission of load, adjust shape retention strength, improve durability and the like, and by adjusting these in accordance with how the shoe is used, the shoe can be a high-performance shoe.

Second Embodiment

Figure 10:
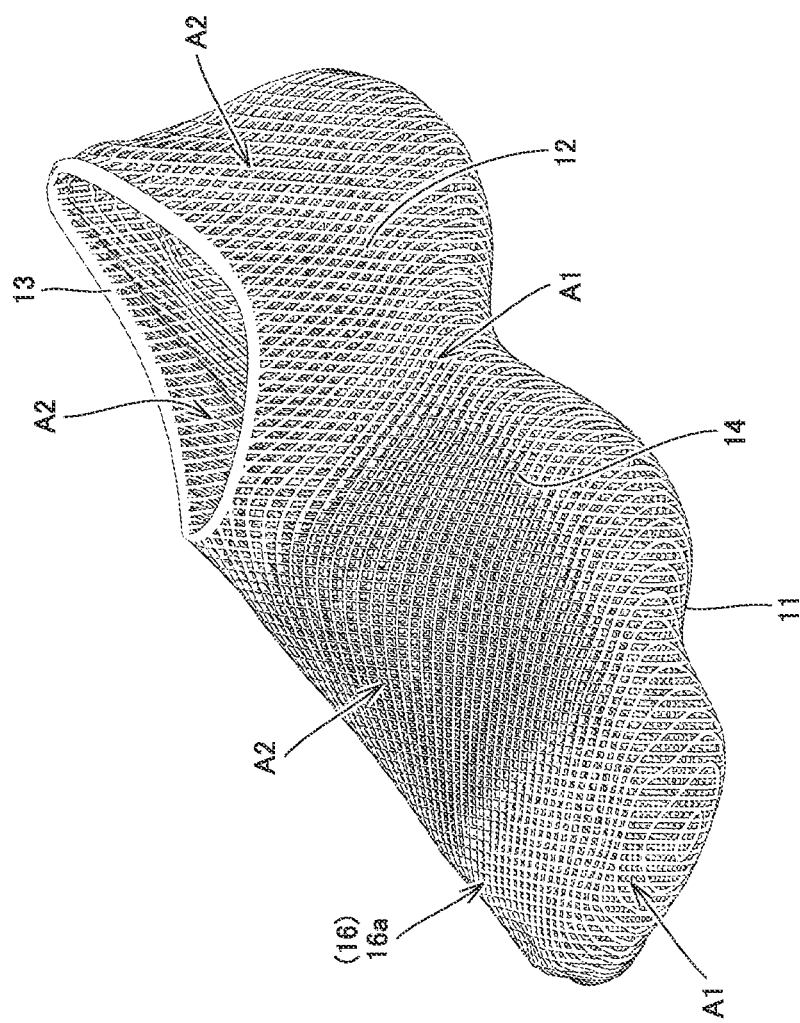
FIG. 10 is a perspective view of a shell that a shoe comprises according to a second embodiment.
Figure 11:
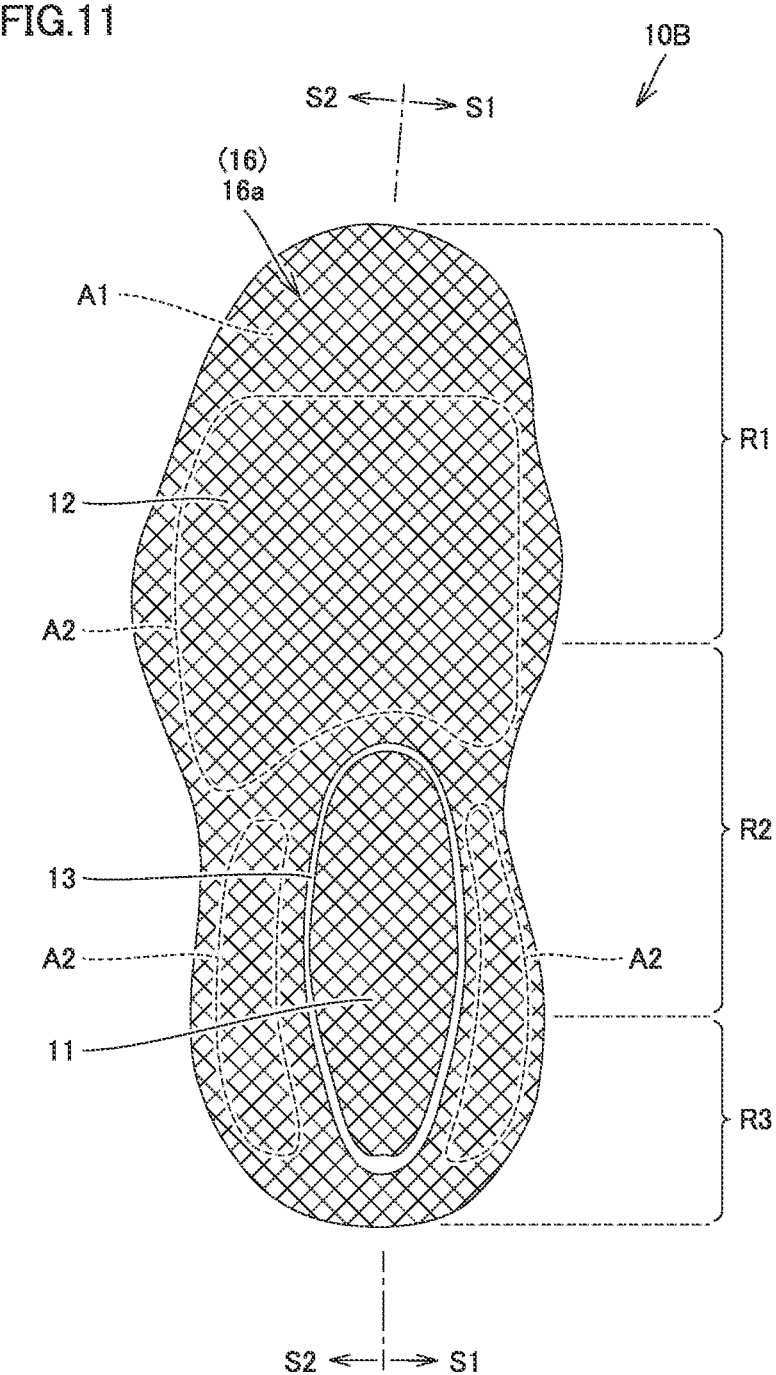
FIG. 11 is a schematic plan view of the shell shown in FIG. 10.

FIG. 10 is a perspective view of a shell that a shoe comprises according to a second embodiment, and FIG. 11 is a schematic plan view of the shell shown in FIG. 10. Initially, the shoe according to the present embodiment will be described with reference to FIGS. 10 and 11. The shoe according to the present embodiment comprises a shell 10B shown in FIGS. 10 and 11 instead of the shell 10A that the shoe 1A according to the first embodiment comprises, and has a remainder in configuration similar to that of the first embodiment.

As shown in FIGS. 10 and 11, the shell 10B that the shoe according to the present embodiment comprises, as well as the shell 10A according to the first embodiment, includes the bottom wall portion 11 and the peripheral wall portion 12, and has the insertion portion 13 in the form of an opening at an upper end of the peripheral wall portion 12. The shell 10B has the bottom wall portion 11 and the peripheral wall portion 12 composed of the mesh member 16a serving as the base structure portion 16, and accordingly, these portions of the shell 10B have numerous holes 14.

For the shell 10B, of a portion of the peripheral wall portion 12 that defines the upper space SP2, a portion covering the instep of a foot of the wearer, a portion covering a peripheral surface of the heel of the foot of the wearer, and a portion adjacent to the topline 33 through which the foot of the wearer is inserted are all configured as a multilayer structure portion A2, and a remaining portion of the peripheral wall portion 12 other than the portion of the peripheral wall portion 12 that defines the upper space SP2 and a portion of the bottom wall portion 11 and peripheral wall portion 12 that defines the lower space SP1 are both configured as a monolayer structure portion A1.

In FIG. 11, in order to facilitate understanding, a boundary portion between the monolayer structure portion A1 and the multilayer structure portion A2 is indicated by a broken line. For the shell 10B, of the multilayer structure portion A2, the portion covering the peripheral surface of the heel of the foot of the wearer and the portion adjacent to the topline 33 through which the foot of the wearer is inserted are provided so as to be contiguous to each other.

Figure 12A:
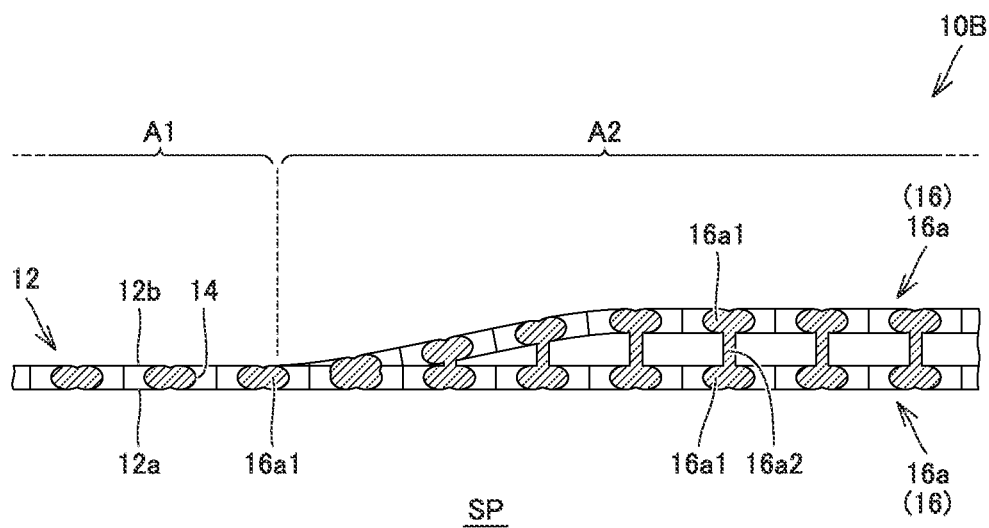
FIG. 12A is a partial cross-sectional view of the shell shown in FIG. 10.
Figure 12B:
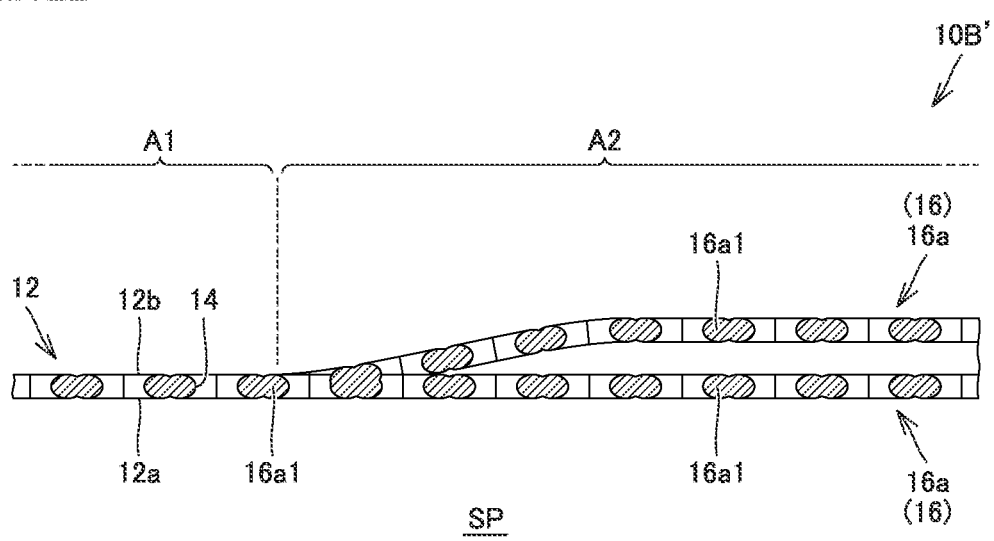
FIG. 12B is a partial cross-sectional view for illustrating another exemplary configuration of the shell shown in FIG. 10.

FIG. 12A is a partial cross-sectional view of the shell shown in FIG. 10 and FIG. 12B is a partial cross-sectional view for illustrating another exemplary configuration of the shell shown in FIG. 10. Hereinafter, a configuration of the multilayer structure portion A2 of the shell 10B will be described in detail with reference to FIGS. 12A and 12B.

As shown in FIG. 12A, for the shell 10B, each layer included in the multilayer structure portion A2 is composed of the mesh member 16a serving as the base structure portion 16, as described above. Specifically, the multilayer structure portion A2 is configured such that the base structure portion 16 starts to branch from the boundary portion between the monolayer structure portion A1 and the multilayer structure portion A2, and the base structure portion 16 thus has two layers stacked in the direction of the thickness of the peripheral wall portion 12.

Further, for the multilayer structure portion A2 composed of the two-layer base structure portion 16, the wire elements 16a1 included in the two-layer base structure portion 16 have each intersection point facing another intersection point, and mutually facing intersection points are coupled by a coupling portion 16a2. The coupling portion 16a2 functions as a deformable portion more deformable than the base structure portion 16.

By this configuration, a portion provided with the multilayer structure portion A2 has the coupling portion 16a2 deformed and the multilayer structure portion A2 is thus easily compressed and deformed in the direction of the thickness of the peripheral wall portion 12. Therefore, providing the multilayer structure portion A2 to a portion at which wearing pressure relatively easily increases, i.e., the portion that covers the instep of a foot of a wearer, the portion that covers the peripheral surface of the heel of the foot of the wearer, and the portion adjacent to the topline 33 through which the foot of the wearer is inserted, as set forth above, allows the wearer to wear the shoe further comfortably.

Further, with this structure, the peripheral wall portion 12 at the portion provided with the multilayer structure portion A2 will generally be increased in thickness and hence also be reinforced.

Thus, the shoe according to the present embodiment can provide the effect described in the first embodiment, and in addition thereto, can also be effective in that the shoe is worn further comfortably and further reinforced. The shell 10B having such a structure can be relatively easily manufactured by additive manufacturing using a three-dimensional additive manufacturing apparatus, as set forth above, in particular.

Note that it is not a requirement that the multilayer structure portion A2 be provided at all of the above-described three portions, and providing it at any of these allows the shoe to be worn more comfortably. Further, it is not a requirement that the multilayer structure portion A2 be composed of the base structure portion 16 composed of two layers, and it may be composed of a base structure portion 16 composed of three or more layers. Further, the multilayer structure portion A2 may be provided at a portion other than the above-described three portions in view of better foot comfort and reinforcement depending on how the shoe is used, and in some cases, the bottom wall portion 11 and the peripheral wall portion 12 may entirely be composed of the multilayer structure portion A2.

In contrast, a shell 10B' according to another exemplary configuration shown in FIG. 12B is not provided with the above-described coupling portion 16a2 and has the multilayer structure portion A2 composed only of the base structure portion 16 having two stacked layers. In such a configuration, in addition to the effect described in the first embodiment, a reinforcing effect can further be obtained.

Third Embodiment

Figure 13:
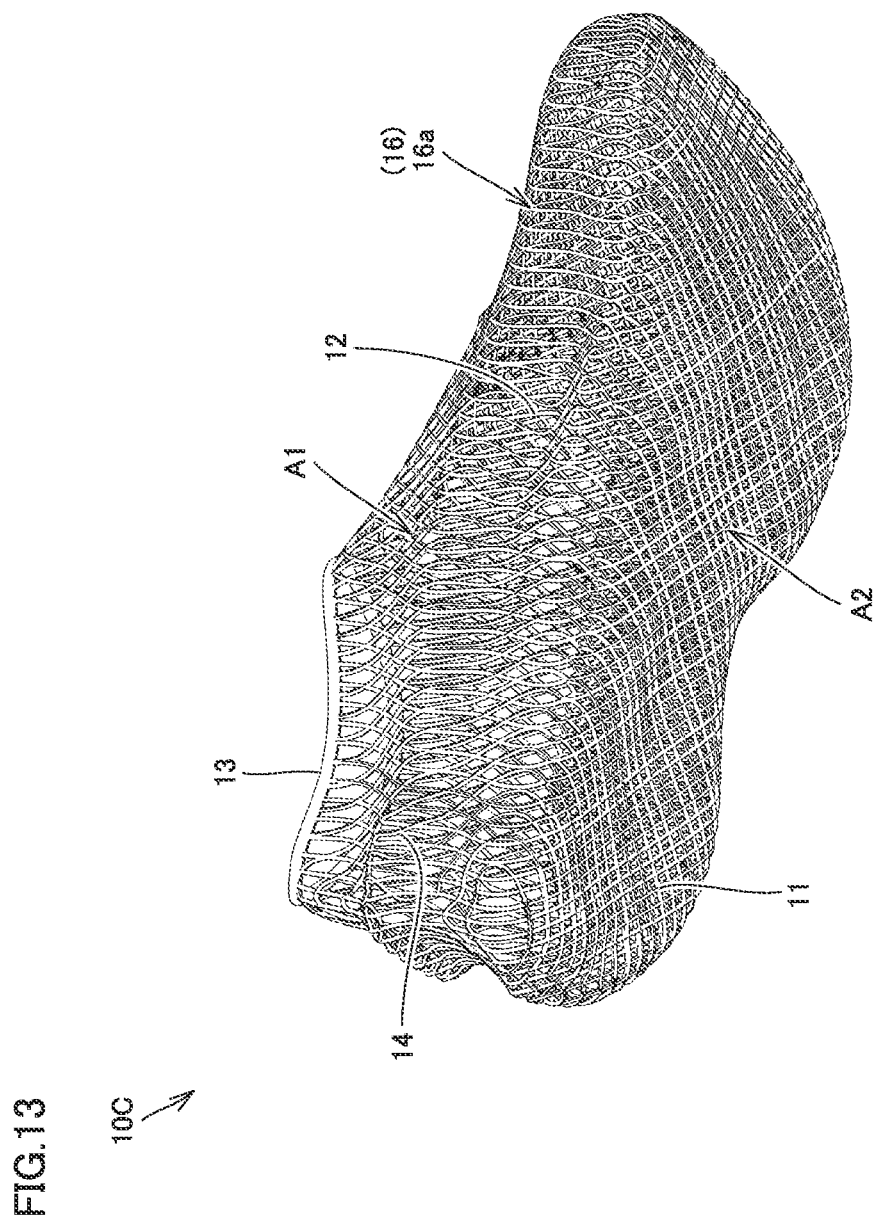
FIG. 13 is a perspective view of a shell that a shoe comprises according to a third embodiment.
Figure 14:
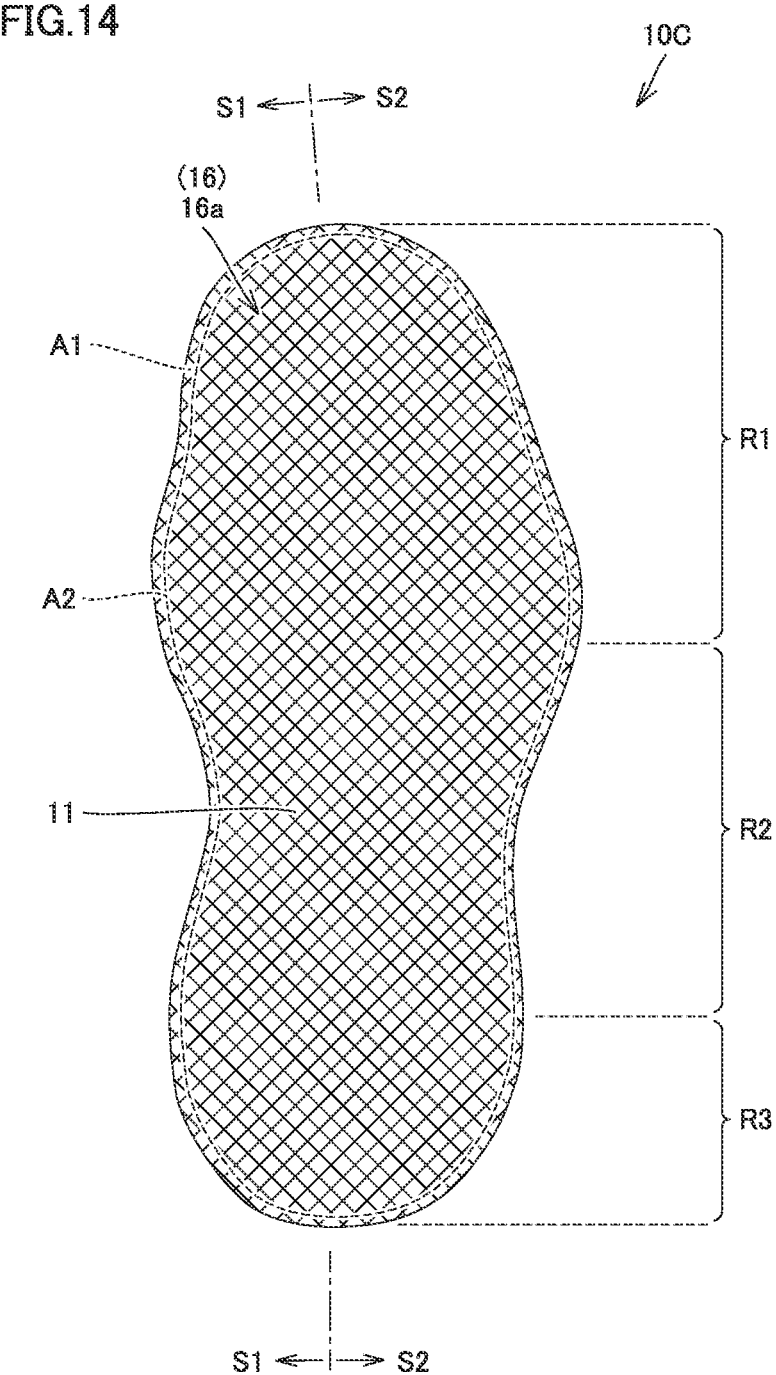
FIG. 14 is a schematic bottom view of the shell shown in FIG. 13.

FIG. 13 is a perspective view of a shell that a shoe comprises according to a third embodiment, and FIG. 14 is a schematic bottom view of the shell shown in FIG. 13. Initially, the shoe according to the present embodiment will be described with reference to FIGS. 13 and 14. The shoe according to the present embodiment comprises a shell 10C shown in FIGS. 13 and 14 instead of the shell 10A that the shoe 1A according to the first embodiment comprises, and has a remainder in configuration similar to that of the first embodiment.

As shown in FIGS. 13 and 14, the shell 10C that the shoe according to the present embodiment comprises, as well as the shell 10A according to the first embodiment, includes the bottom wall portion 11 and the peripheral wall portion 12, and has the insertion portion 13 in the form of an opening at an upper end of the peripheral wall portion 12. The shell 10C has the bottom wall portion 11 and the peripheral wall portion 12 composed of the mesh member 16a serving as the base structure portion 16, and accordingly, these portions of the shell 10C have numerous holes 14.

For the shell 10C, the bottom wall portion 11 is configured as the multilayer structure portion A2, and the peripheral wall portion 12 is configured as the monolayer structure portion A1. In FIG. 14, in order to facilitate understanding, a boundary portion between the monolayer structure portion A1 and the multilayer structure portion A2 is indicated by a broken line.

Figure 15A:
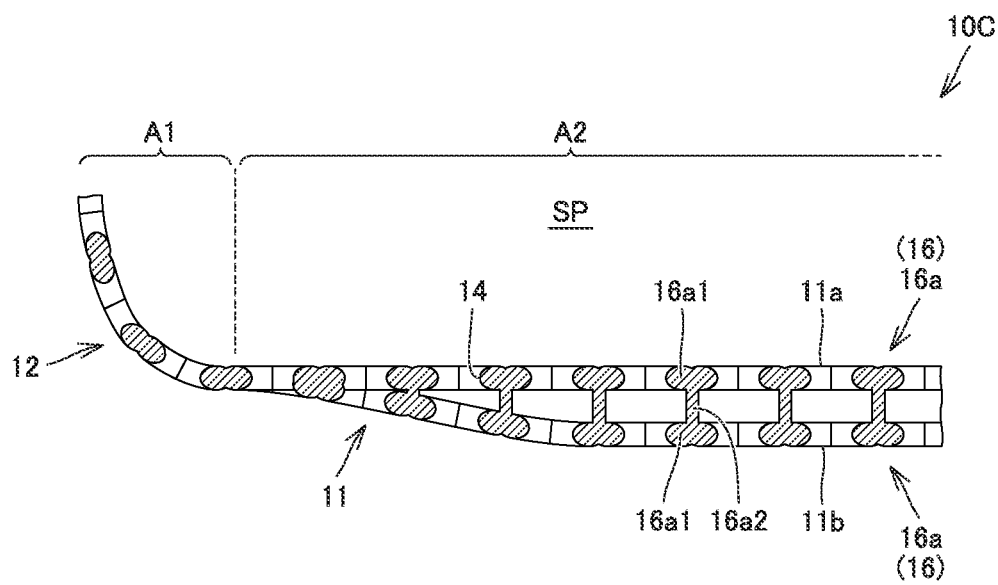
FIG. 15A is a partial cross-sectional view of the shell shown in FIG. 13.
Figure 15B:
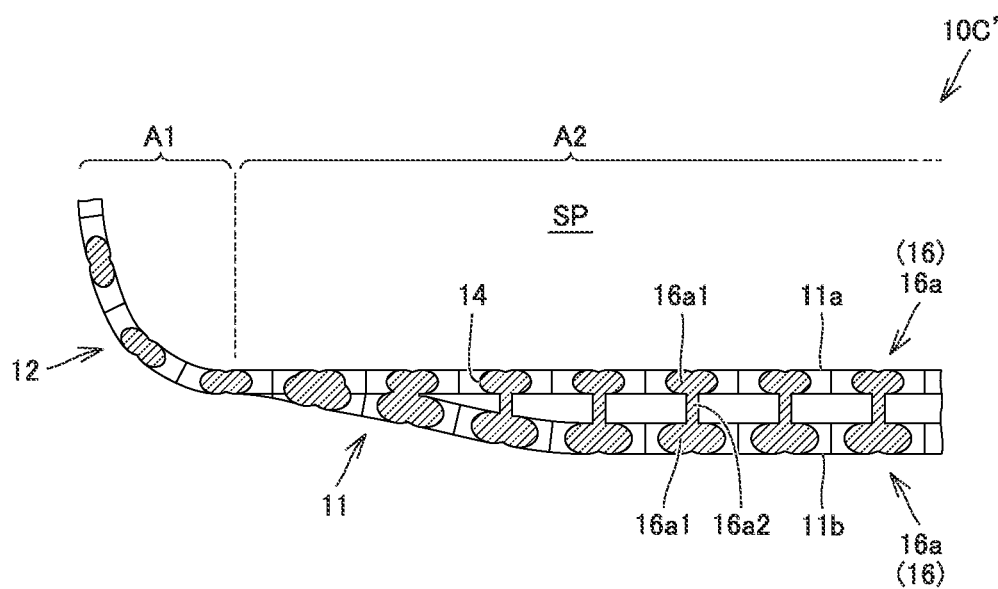
FIG. 15B is a partial cross-sectional view for illustrating another exemplary configuration of the shell shown in FIG. 13.

FIG. 15A is a partial cross-sectional view of the shell shown in FIG. 13 and FIG. 15B is a partial cross-sectional view for illustrating another exemplary configuration of the shell shown in FIG. 13. Hereinafter, a configuration of the multilayer structure portion A2 of the shell 10C will be described in detail with reference to FIGS. 15A and 15B.

As shown in FIG. 15A, for the shell 10C, each layer included in the multilayer structure portion A2 is composed of the mesh member 16a serving as the base structure portion 16, as described above. Specifically, the multilayer structure portion A2 is configured such that the base structure portion 16 starts to branch from the boundary portion between the monolayer structure portion A1 and the multilayer structure portion A2, and the base structure portion 16 thus has two layers stacked in the direction of the thickness of the bottom wall portion 11.

Further, for the multilayer structure portion A2 composed of the two-layer base structure portion 16, the wire elements 16a1 included in the two-layer base structure portion 16 have each intersection point facing another intersection point, and mutually facing intersection points are coupled by the coupling portion 16a2. The coupling portion 16a2 functions as a deformable portion more deformable than the base structure portion 16.

By this configuration, a portion provided with the multilayer structure portion A2 has the coupling portion 16a2 deformed and the multilayer structure portion A2 is thus easily compressed and deformed in the direction of the thickness of the bottom wall portion 11. Therefore, providing the multilayer structure portion A2 at the bottom wall portion 11 can provide an enhanced cushioning effect.

Further, with this configuration, the bottom wall portion 11 at the portion provided with the multilayer structure portion A2 will generally be increased in thickness and hence also be reinforced.

Thus, the shoe according to the present embodiment can provide the effect described in the first embodiment, and in addition thereto, can also provide a better cushioning effect and a reinforcement effect. The shell 10C having such a structure can be relatively easily manufactured by additive manufacturing using a three-dimensional additive manufacturing apparatus, as set forth above, in particular.

Note that it is not a requirement that the multilayer structure portion A2 be composed of the base structure portion 16 composed of two layers, and it may be composed of a base structure portion 16 composed of three or more layers.

In contrast, a shell 10C' according to another exemplary configuration shown in FIG. 15B is configured such that the two-layer base structure portion 16 constituting the multilayer structure portion A2 is configured such that a base structure portion 16 defining the outer surface 11b of the bottom wall portion 11 serving as a tread is larger in thickness than a base structure portion 16 defining the internal space SP. In such a configuration, the bottom wall portion 11 is increased in thickness as a whole and can be further effective for increased reinforcement and durability.

Fourth Embodiment

Figure 16:
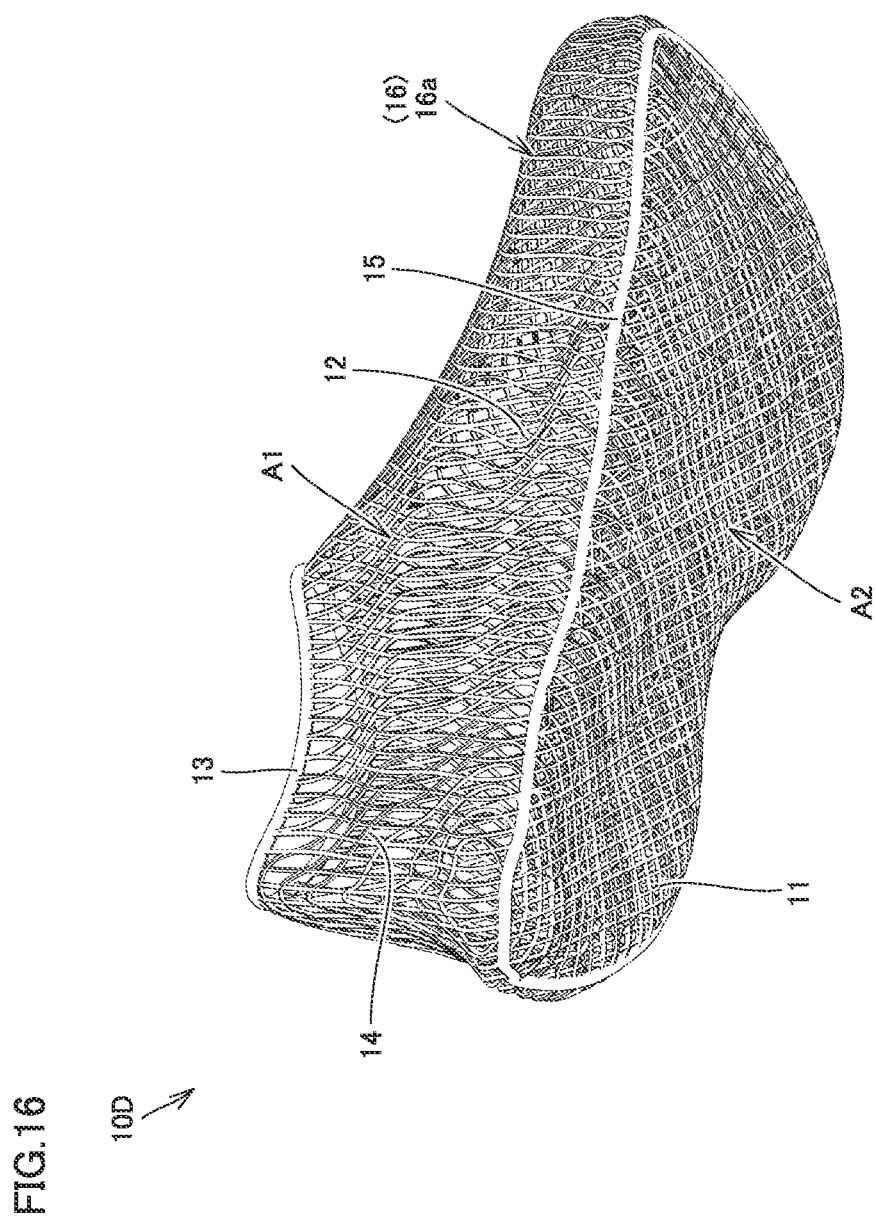
FIG. 16 is a perspective view of a shell that a shoe comprises according to a fourth embodiment.
Figure 17:
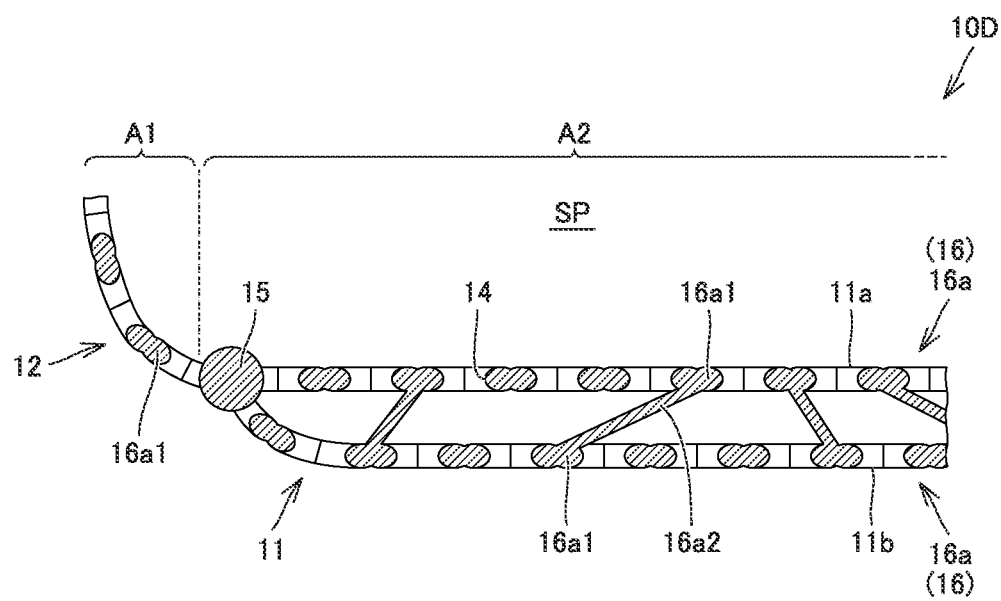
FIG. 17 is a partial cross-sectional view of the shell shown in FIG. 16.

FIG. 16 is a perspective view of a shell that a shoe comprises according to a fourth embodiment and FIG. 17 is a partial cross-sectional view of the shell shown in FIG. 16. Hereinafter, the shoe according to the present embodiment will be described with reference to FIGS. 16 and 17. The shoe according to the present embodiment comprises a shell 10D shown in FIGS. 16 and 17 instead of the shell 10A that the shoe 1A according to the first embodiment comprises, and has a remainder in configuration similar to that of the first embodiment.

As shown in FIGS. 16 and 17, the shell 10D that the shoe according to the present embodiment comprises, as well as the shell 10A according to the first embodiment, includes the bottom wall portion 11 and the peripheral wall portion 12, and has the insertion portion 13 in the form of an opening at an upper end of the peripheral wall portion 12. The shell 10D has the bottom wall portion 11 and the peripheral wall portion 12 composed of the mesh member 16a serving as the base structure portion 16, and accordingly, these portions of the shell 10D have numerous holes 14.

For the shell 10D, the bottom wall portion 11 is configured as the multilayer structure portion A2, and the peripheral wall portion 12 is configured as the monolayer structure portion A1. A wire-shaped, frame-shaped portion 15 larger in thickness than the wire element 16a1 constituting the base structure portion 16 is provided at a boundary between the bottom wall portion 11 and the peripheral wall portion 12 that is a boundary portion between the monolayer structure portion A1 and the multilayer structure portion A2.

As shown in FIG. 17, for the shell 10D, each layer included in the multilayer structure portion A2 is composed of the mesh member 16a serving as the base structure portion 16, as described above. Specifically, the multilayer structure portion A2 is configured such that the base structure portion 16 starts to branch from the frame-shaped portion 15 that is the boundary portion between the monolayer structure portion A1 and the multilayer structure portion A2, and the base structure portion 16 thus has two layers stacked in the direction of the thickness of the bottom wall portion 11.

Further, for the multilayer structure portion A2 composed of the two-layer base structure portion 16, the wire elements 16a1 included in the base structure portion 16 disposed in layers have intersection points coupled by the coupling portion 16a2. The coupling portion 16a2 does not necessarily extend in the direction of the thickness of the bottom wall portion 11, and instead extends at random so as to intersect that direction. The coupling portion 16a2 functions as a deformable portion more deformable than the base structure portion 16.

While in FIG. 17, for convenience of illustration, a plurality of coupling portions 16a2 are all shown to extend only in a direction parallel to the cross section shown in FIG. 17, the plurality of coupling portions 16a2 are also formed to extend in various directions when viewed in the direction of the thickness of the bottom wall portion 11.

By this configuration as well, a portion provided with the multilayer structure portion A2 has the coupling portion 16a2 deformed and the multilayer structure portion A2 is thus easily compressed and deformed in the direction of the thickness of the bottom wall portion 11. Therefore, providing the multilayer structure portion A2 at the bottom wall portion 11 can provide an enhanced cushioning effect.

Further, with this configuration, the bottom wall portion 11 at the portion provided with the multilayer structure portion A2 will generally be increased in thickness and hence also be reinforced.

Thus, the shoe according to the present embodiment can provide the effect described in the first embodiment, and in addition thereto, can also provide a better cushioning effect and a reinforcement effect. The shell 10D having such a structure can be relatively easily manufactured by additive manufacturing using a three-dimensional additive manufacturing apparatus, as set forth above, in particular.

Note that it is not a requirement that the multilayer structure portion A2 be composed of the base structure portion 16 composed of two layers, and it may be composed of a base structure portion 16 composed of three or more layers.

Fifth Embodiment

Figure 18:
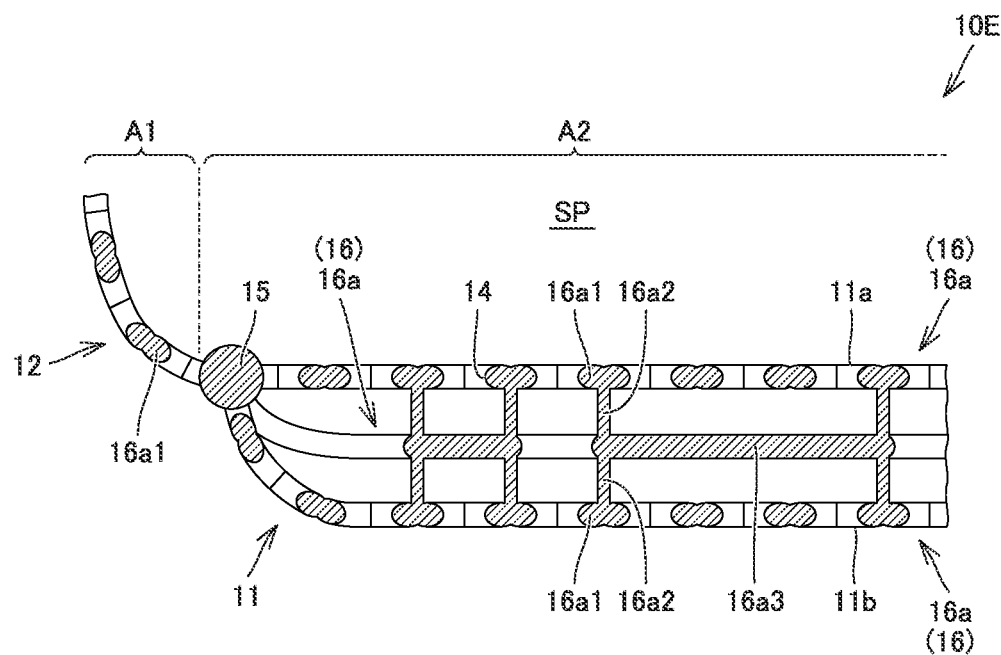
FIG. 18 is a partial cross-sectional view of a shell that a shoe comprises according to a fifth embodiment.
Figure 19:
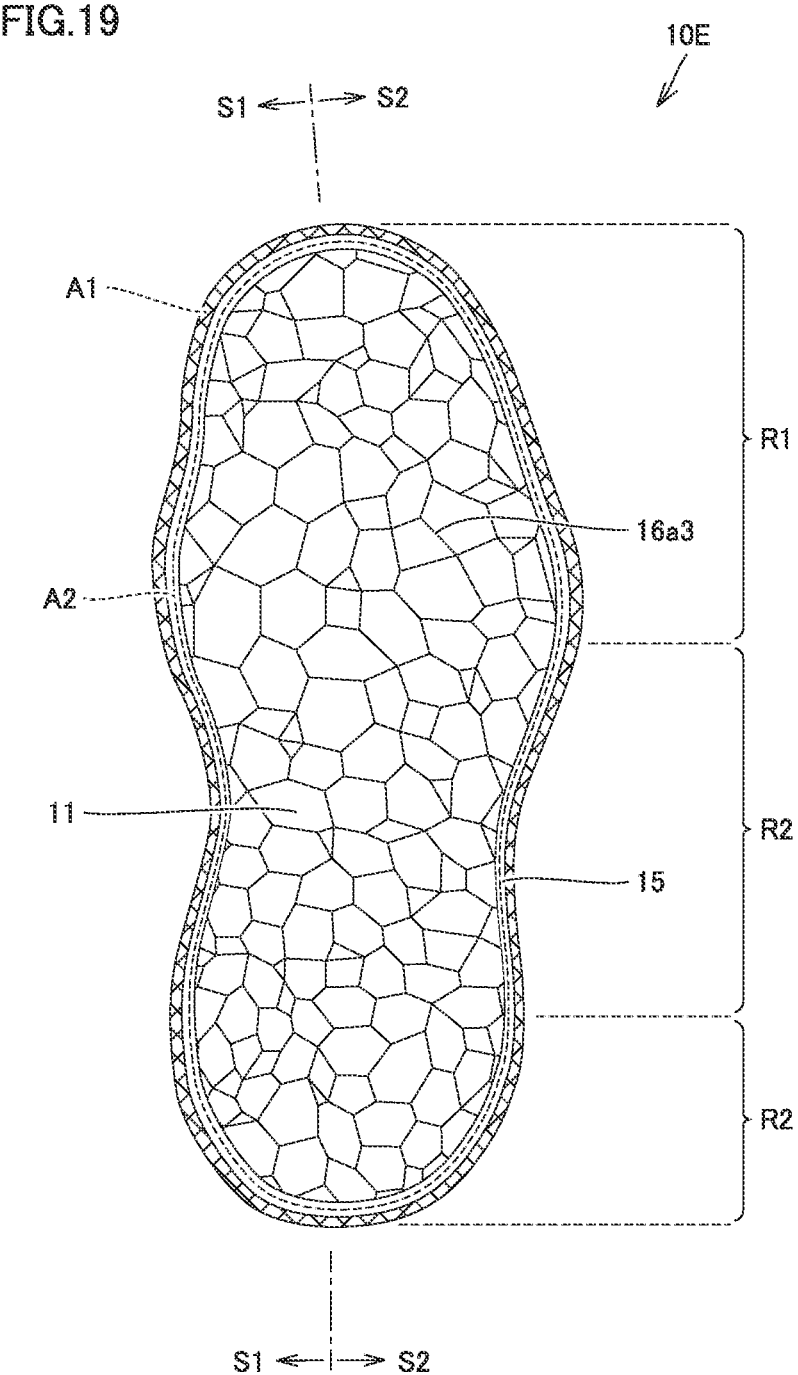
FIG. 19 is a schematic bottom view of the FIG. 18 shell partially cut away.

FIG. 18 is a partial cross-sectional view of a shell that a shoe comprises according to a fifth embodiment, and FIG. 19 is a schematic bottom view of the FIG. 18 shell partially cut away. Hereinafter, the shoe according to the present embodiment will be described with reference to FIGS. 18 and 19. The shoe according to the present embodiment comprises a shell 10E shown in FIGS. 18 and 19 instead of the shell 10A that the shoe 1A according to the first embodiment comprises, and has a remainder in configuration similar to that of the first embodiment.

As shown in FIG. 18, the shell 10E that the shoe according to the present embodiment comprises, as well as the shell 10A according to the first embodiment, includes the bottom wall portion 11 and the peripheral wall portion 12, and has the insertion portion 13 in the form of an opening at an upper end of the peripheral wall portion 12, although not shown in FIG. 18. The shell 10E has the bottom wall portion 11 and the peripheral wall portion 12 composed of the mesh member 16a serving as the base structure portion 16, and accordingly, these portions of the shell 10E have numerous holes 14.

For the shell 10E, the bottom wall portion 11 is configured as the multilayer structure portion A2, and the peripheral wall portion 12 is configured as the monolayer structure portion A1. The wire-shaped, frame-shaped portion 15 larger in thickness than the wire element 16a1 constituting the base structure portion 16 is provided at a boundary between the bottom wall portion 11 and the peripheral wall portion 12 that is a boundary portion between the monolayer structure portion A1 and the multilayer structure portion A2.

As shown in FIG. 18, for the shell 10E, each layer included in the multilayer structure portion A2 is composed of the mesh member 16a serving as the base structure portion 16, as described above. Specifically, the multilayer structure portion A2 is configured such that the base structure portion 16 starts to branch from the frame-shaped portion 15 that is the boundary portion between the monolayer structure portion A1 and the multilayer structure portion A2, and the base structure portion 16 thus has three layers stacked in the direction of the thickness of the bottom wall portion 11.

Of the three-layer base structure portion 16, a base structure portion 16 defining the outer surface 11b of the bottom wall portion 11 serving as a tread and a base structure portion 16 defining the internal space SP include a plurality of wire elements 16a1 disposed to be orthogonal to one another in the form of a lattice.

In contrast, as shown in FIG. 19, a base structure portion 16 as an intermediate layer disposed between the two base structure portions 16 has a wire element 16a3 running in a Voronoi diagram. Note that in FIG. 19, for ease of understanding, of the bottom wall portion 11, the base structure portion 16 defining the outer surface 11b of the bottom wall portion 11 serving as the tread and the base structure portion 16 defining the internal space SP are not shown, and the boundary portion between the monolayer structure portion A1 and the multilayer structure portion A2 is indicated by a broken line.

The base structure portion 16 as the intermediate layer formed of the wire element 16a3 running in a Voronoi diagram is configured to have a larger mesh size than the other base structure portions 16. With this configuration, the base structure portion 16 serving as the intermediate layer functions as a deformable portion more deformable than the other base structure portions 16.

Further, as shown in FIG. 18, for the multilayer structure portion A2 composed of the three-layer base structure portion 16, the wire elements 16a1 and 16a3 included in the base structure portions 16 of two adjacent layers have some intersection points facing one another, and these mutually facing intersection points are coupled by the coupling portion 16a2. The coupling portion 16a2 functions as a deformable portion more deformable than the base structure portion 16.

By this configuration, a portion provided with the multilayer structure portion A2 has the base structure portion 16 as the intermediate layer and the coupling portion 16a2 deformed and the multilayer structure portion A2 is thus easily compressed and deformed in the direction of the thickness of the bottom wall portion 11. Therefore, providing the multilayer structure portion A2 at the bottom wall portion 11 can provide an enhanced cushioning effect.

Further, with this configuration, the bottom wall portion 11 at the portion provided with the multilayer structure portion A2 will generally be increased in thickness and hence also be reinforced.

Thus, the shoe according to the present embodiment can provide the effect described in the first embodiment, and in addition thereto, can also provide a better cushioning effect and a reinforcement effect. The shell 10E having such a structure can be relatively easily manufactured by additive manufacturing using a three-dimensional additive manufacturing apparatus, as set forth above, in particular.

It is not a requirement that the base structure portion 16 serving as the intermediate layer be a single layer, and it may be two or more layers. Further, in the intermediate layer, it is not a requirement that the wire element 16a3 run in a Voronoi diagram, and it may run in the form of a truss, a lattice, a honeycomb, or the like.

Sixth Embodiment

Figure 20:
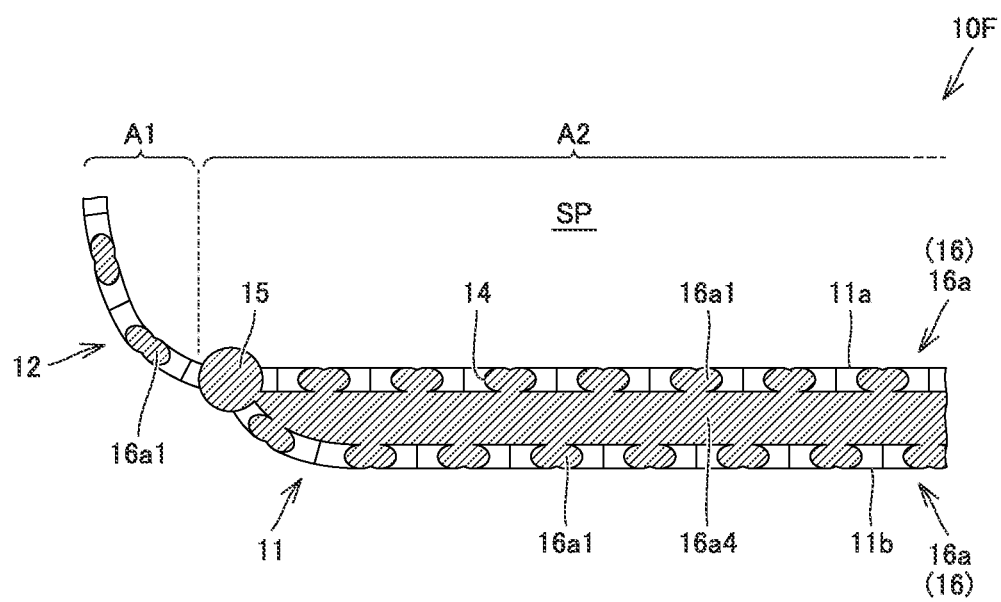
FIG. 20 is a partial cross-sectional view of a shell that a shoe comprises according to a sixth embodiment.

FIG. 20 is a partial cross-sectional view of a shell that a shoe comprises according to a sixth embodiment. Hereinafter, the shoe according to the present embodiment will be described with reference to FIG. 20. The shoe according to the present embodiment comprises a shell 10F shown in FIG. 20 instead of the shell 10A that the shoe 1A according to the first embodiment comprises, and has a remainder in configuration similar to that of the first embodiment.

As shown in FIG. 20, the shell 10F that the shoe according to the present embodiment comprises, as well as the shell 10A according to the first embodiment, includes the bottom wall portion 11 and the peripheral wall portion 12, and has the insertion portion 13 in the form of an opening at an upper end of the peripheral wall portion 12, although not shown in FIG. 20. The shell 10F has the bottom wall portion 11 and the peripheral wall portion 12 composed of the mesh member 16a serving as the base structure portion 16, and accordingly, these portions of the shell 10F have numerous holes 14.

For the shell 10F, the bottom wall portion 11 is configured as the multilayer structure portion A2, and the peripheral wall portion 12 is configured as the monolayer structure portion A1. The wire-shaped, frame-shaped portion 15 larger in thickness than the wire element 16a1 constituting the base structure portion 16 is provided at a boundary between the bottom wall portion 11 and the peripheral wall portion 12 that is a boundary portion between the monolayer structure portion A1 and the multilayer structure portion A2.

The multilayer structure portion A2 is configured such that the base structure portion 16 starts to branch from the frame-shaped portion 15 that is the boundary portion between the monolayer structure portion A1 and the multilayer structure portion A2, and the base structure portion 16 thus has two layers stacked in the direction of the thickness of the bottom wall portion 11, and furthermore, a plate-shaped buried layer 16a4 is provided so as to fill a space between the two layers of the base structure portion 16. The buried layer 16a4 is integrated with each wire element 16a1 included in the two-layer base structure portion 16.

With this configuration, the bottom wall portion 11 at the portion provided with the multilayer structure portion A2 will generally be increased in thickness and hence reinforced. Further, with the above configuration, the holes 14 provided in the two-layer base structure portion 16 are all closed by the plate-shaped buried layer 16a4, and the bottom wall portion 11 is generally, significantly increased in rigidity.

Thus, the shoe according to the present embodiment can provide the effect described in the first embodiment, and in addition thereto, can also provide a reinforcement effect. While the shell 10F having such a structure can also be manufactured by injection molding or cast molding, the shell can be relatively easily manufactured by additive manufacturing using a three-dimensional additive manufacturing apparatus, as set forth above, in particular.

Seventh Embodiment

Figure 21:
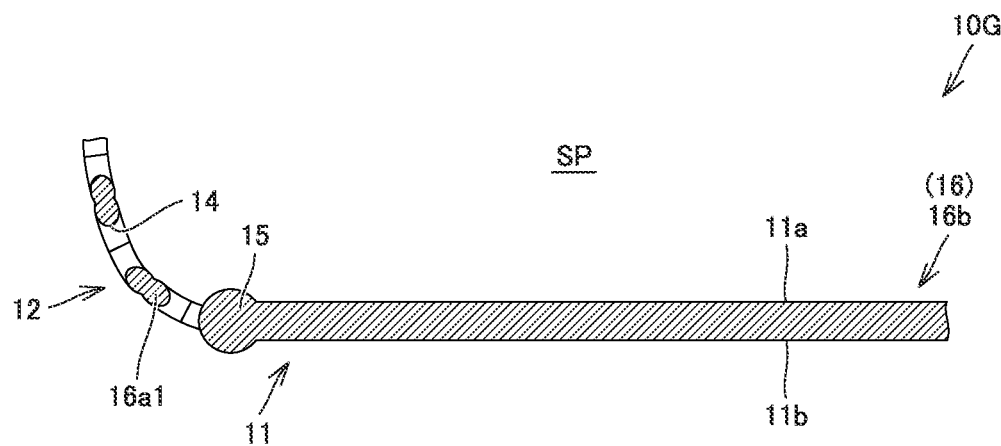
FIG. 21 is a partial cross-sectional view of a shell that a shoe comprises according to a seventh embodiment.

FIG. 21 is a partial cross-sectional view of a shell that a shoe comprises according to a seventh embodiment. Hereinafter, the shoe according to the present embodiment will be described with reference to FIG. 21. The shoe according to the present embodiment comprises a shell 10G shown in FIG. 21 instead of the shell 10A that the shoe 1A according to the first embodiment comprises, and has a remainder in configuration similar to that of the first embodiment.

As shown in FIG. 21, the shell 10G that the shoe according to the present embodiment comprises, as well as the shell 10A according to the first embodiment, includes the bottom wall portion 11 and the peripheral wall portion 12, and has the insertion portion 13 in the form of an opening at an upper end of the peripheral wall portion 12, although not shown in FIG. 21. The shell 10G has the peripheral wall portion 12 composed of the mesh member 16a serving as the base structure portion 16, and accordingly, this portion of the shell 10G has numerous holes 14. In contrast, the shell 10G has the bottom wall portion 11 composed of a plate-shaped member 16b serving as the base structure portion 16, and accordingly, that portion of the shell 10G has no numerous hole 14.

In such a configuration, the bottom wall portion 11 is formed of the plate-shaped member 16b having no hole, and is thus significantly enhanced in rigidity.

Thus, the shoe according to the present embodiment can provide the effect described in the first embodiment, and in addition thereto, can have the bottom wall portion 11 effectively enhanced in strength. While the shell 10G having such a structure can also be manufactured by injection molding or cast molding, the shell can be relatively easily manufactured by additive manufacturing using a three-dimensional additive manufacturing apparatus, as set forth above, in particular.

Eighth Embodiment

Figure 22:
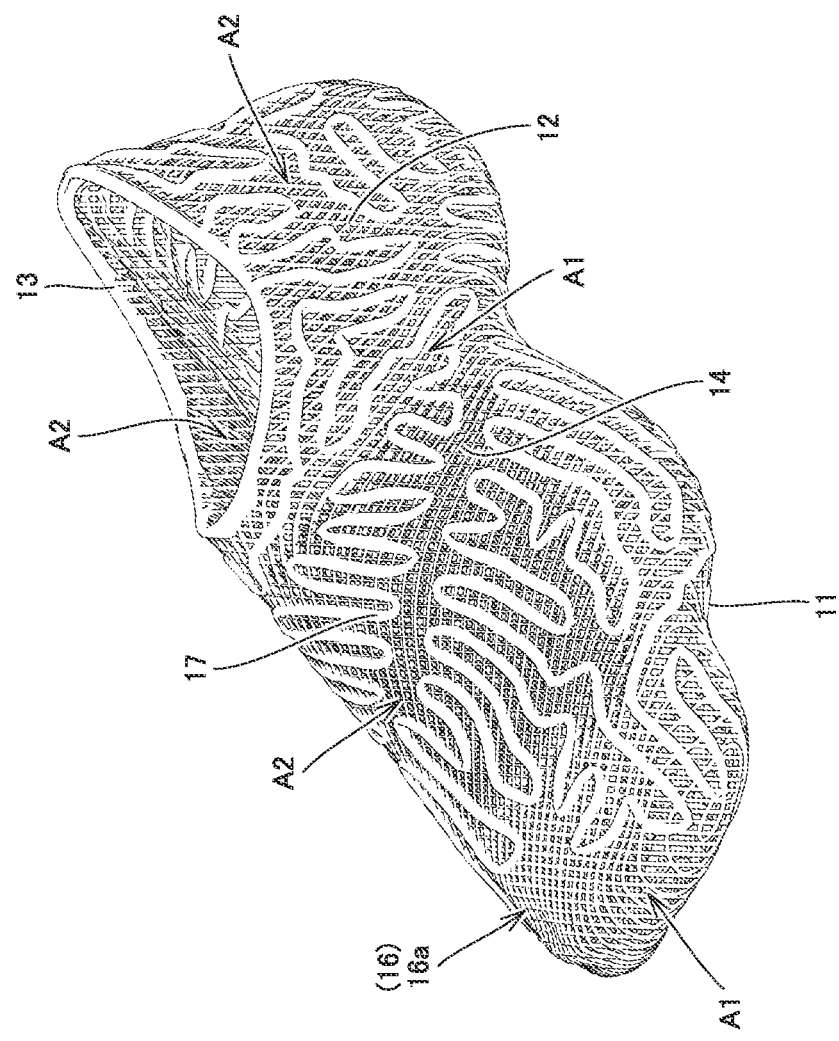
FIG. 22 is a perspective view of a shell that a shoe comprises according to an eighth embodiment.
Figure 23A:
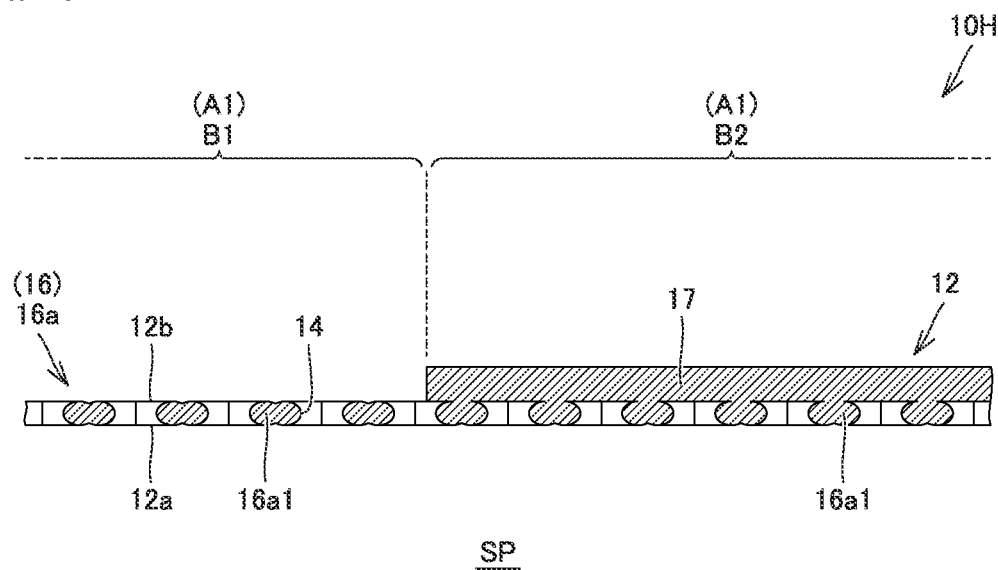
FIGS. 23A and 23B are partial cross-sectional views of the shell shown in FIG. 22.
Figure 23B:
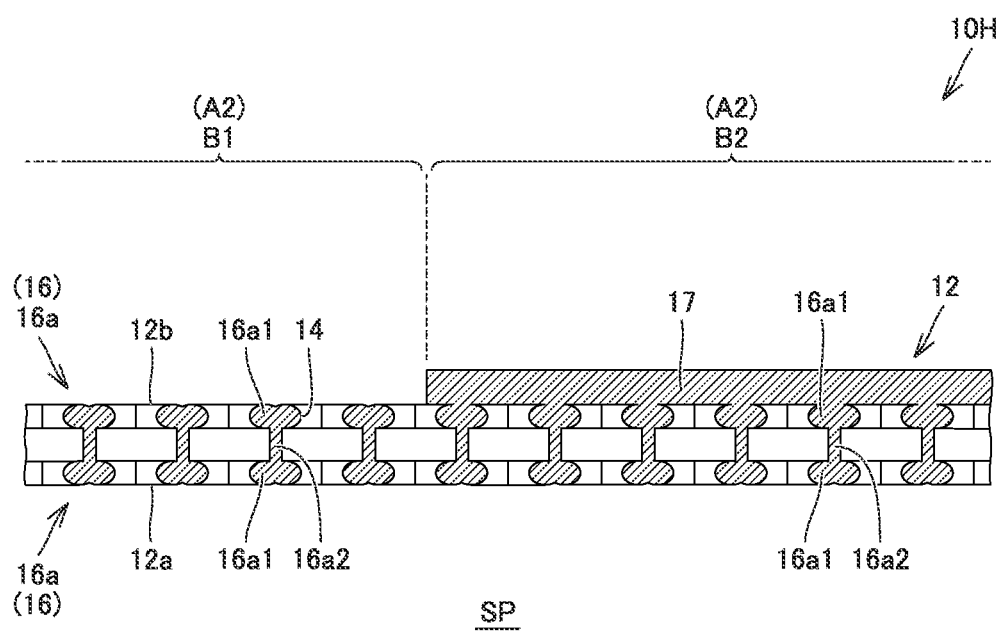

FIG. 22 is a perspective view of a shell that a shoe comprises according to an eighth embodiment. FIG. 23A is a partial cross-sectional view of a monolayer structure portion of the shell shown in FIG. 22, and FIG. 23B is a partial cross-sectional view of a multilayer structure portion of the shell shown in FIG. 22. Hereinafter, the shoe according to the present embodiment will be described with reference to FIGS. 22, and 23A and 23B. The shoe according to the present embodiment comprises a shell 10H shown in FIGS. 22, and 23A and 23B instead of the shell 10A that the shoe 1A according to the first embodiment comprises, and has a remainder in configuration similar to that of the first embodiment.

As shown in FIGS. 22, and 23A and 23B, the shell 10H that the shoe according to the present embodiment comprises, as well as the shell 10A according to the first embodiment, includes the bottom wall portion 11 and the peripheral wall portion 12, and has the insertion portion 13 in the form of an opening at an upper end of the peripheral wall portion 12. The shell 10H has the bottom wall portion 11 and the peripheral wall portion 12 composed of the mesh member 16a serving as the base structure portion 16, and accordingly, these portions of the shell 10H have numerous holes 14.

For the shell 10H, of a portion of the peripheral wall portion 12 that defines the upper space SP2, a portion covering the instep of a foot of the wearer, a portion covering a peripheral surface of the heel of the foot of the wearer, and a portion adjacent to the topline 33 through which the foot of the wearer is inserted are all configured as the multilayer structure portion A2, and a remaining portion of the peripheral wall portion 12 other than the portion of the peripheral wall portion 12 that defines the upper space SP2 and a portion of the bottom wall portion 11 and peripheral wall portion 12 that defines the lower space SP1 are both configured as the monolayer structure portion A1. The monolayer structure portion A1 and the multilayer structure portion A2 thus configured are basically similar to those of the shell 10B that the shoe according to the second embodiment comprises.

For the shell 10H, the peripheral wall portion 12 is configured to include a design portion 17 in addition to the base structure portion 16. The design portion 17 is provided to improve in design the shoe comprising the shell 10H, and is formed on the shell 10H so as to be externally visible. The shell 10H is provided as the design portion 17 with a curved motif running to extend in a meandering manner.

As shown in FIG. 23A, the monolayer structure portion A1 is provided with the design portion 17 in a design region B2 such that the design portion 17 covers a portion of a surface of the base structure portion 16 (that is, the outer surface 12b of the peripheral wall portion 12). The design portion 17 is integrated with each wire element 16a1 included in the base structure portion 16. In contrast, in a non-design region B1 without the design portion 17, the base structure portion 16 is present alone.

As shown in FIG. 23B, the multilayer structure portion A2 is provided with the design portion 17 in the design region B2 such that the design portion 17 covers a portion of a surface of that base structure portion 16 of the two-layer base structure portion 16 which defines the outer surface 12b of the peripheral wall portion 12. The design portion 17 is integrated with each wire element 16a1 included in that base structure portion 16 which defines the outer surface 12b of the peripheral wall portion 12. In contrast, in the non-design region B1 without the design portion 17, the two-layer base structure portion 16 is present alone.

Such a configuration improves in design the shoe comprising the shell 10H. Further, in the portion provided with the design portion 17, a reinforcement effect is also exhibited by the design portion 17.

Thus, the shoe according to the present embodiment can provide the effect described in the first embodiment, and in addition thereto, can also be an effectively excellently aesthetic and reinforced shoe. The shell 10H having such a structure can be relatively easily manufactured by additive manufacturing using a three-dimensional additive manufacturing apparatus, as set forth above, in particular.

Figure 24A:
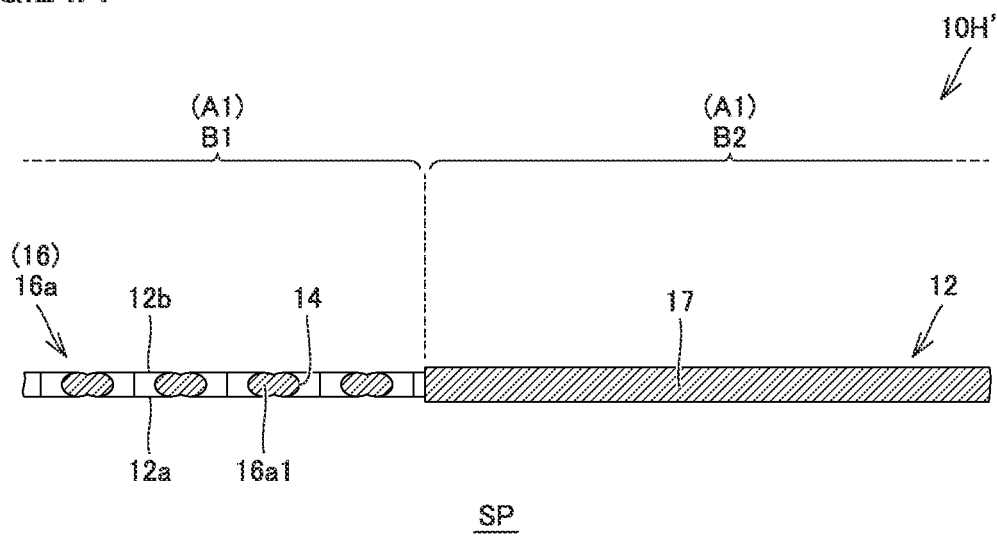
FIGS. 24A and 24B are partial cross-sectional views for illustrating another exemplary configuration of the shell shown in FIG. 22.
Figure 24B:
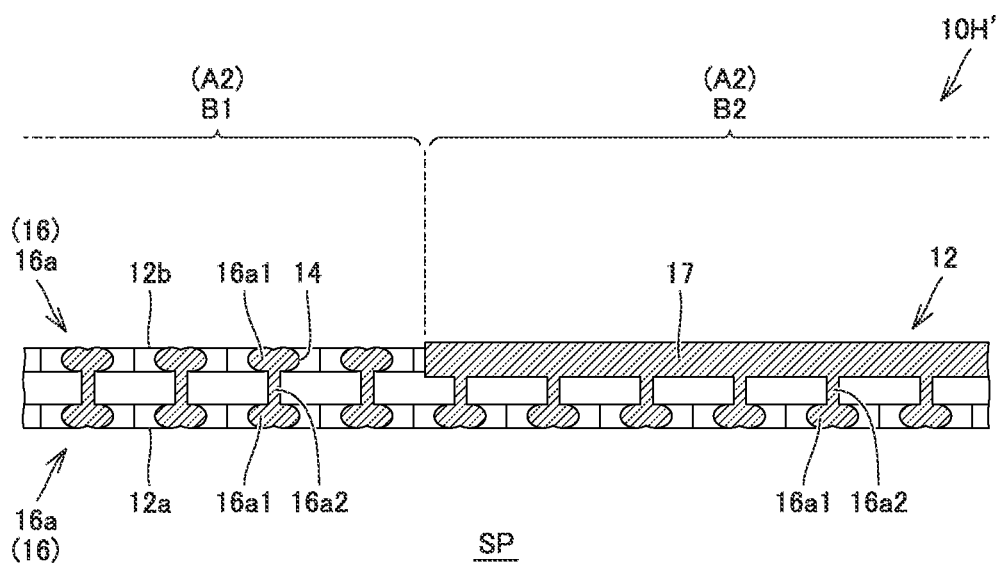

FIG. 24A is a partial cross-sectional view of a monolayer structure portion in another exemplary configuration of the shell shown in FIG. 22, and FIG. 24B is a partial cross-sectional view of a multilayer structure portion in another exemplary configuration of the shell shown in FIG. 22. Hereinafter, the other exemplary configuration of the shell shown in FIG. 22 will be described with reference to FIGS. 24A and 24B.

As shown in FIGS. 24A and 24B, a shell 10I' according to the other exemplary configuration is provided with the design portion 17 so as to completely cover a surface of the base structure portion 16, rather than a portion thereof. That is, as shown in FIG. 24A, the monolayer structure portion A1 is provided with the design portion 17 provided in the design region B2 and completely burying the wire element 16a1 included in the base structure portion 16, and as shown in FIG. 24B, the multilayer structure portion A2 is provided with the design portion 17 provided in the design region B2 and completely burying the wire element 16a1 included in that base structure portion 16 of the two-layer base structure portion 16 which defines the outer surface 12b of the peripheral wall portion 12.

Such a configuration can also provide the effect described in the first embodiment, and in addition thereto, can also provide an effectively excellently aesthetic and reinforced shoe (Fourth and Fifth Exemplary Variations)

Figure 25:
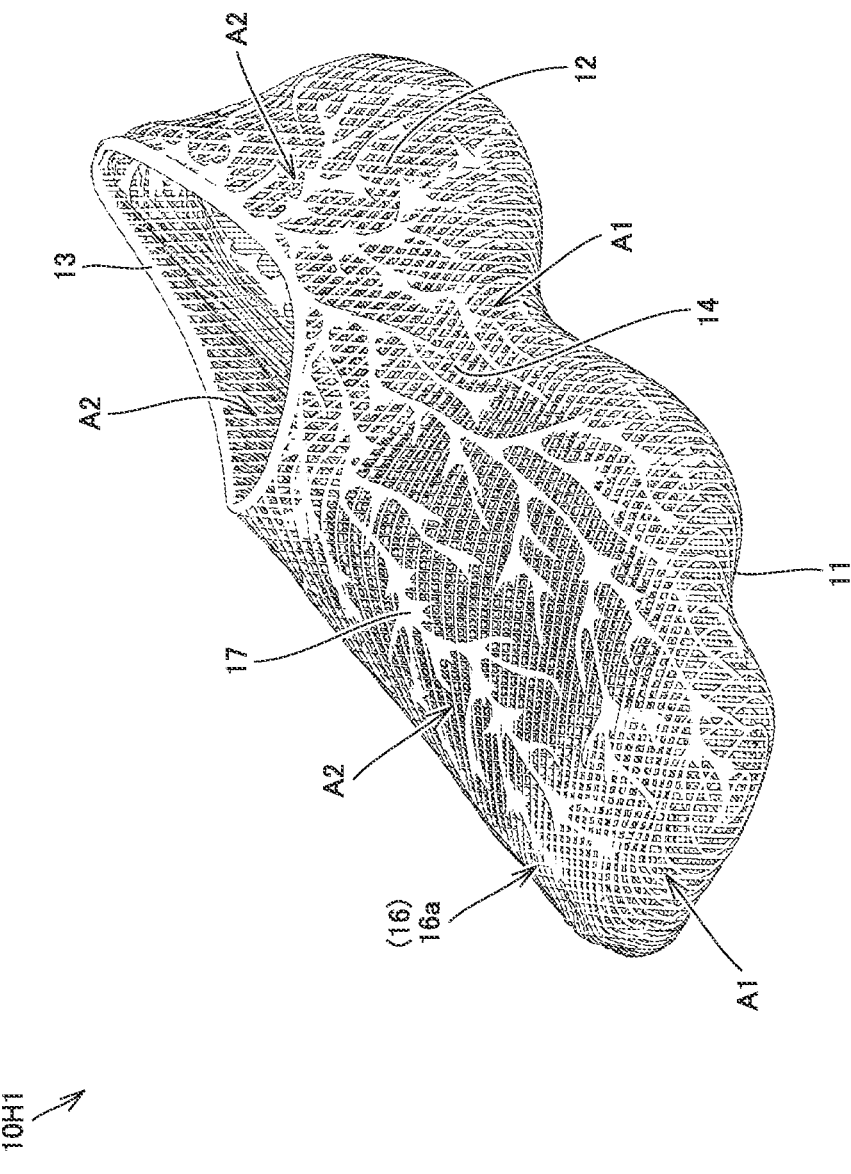
FIG. 25 is a perspective view of a shell that a shoe comprises according to a fourth exemplary variation.
Figure 26:
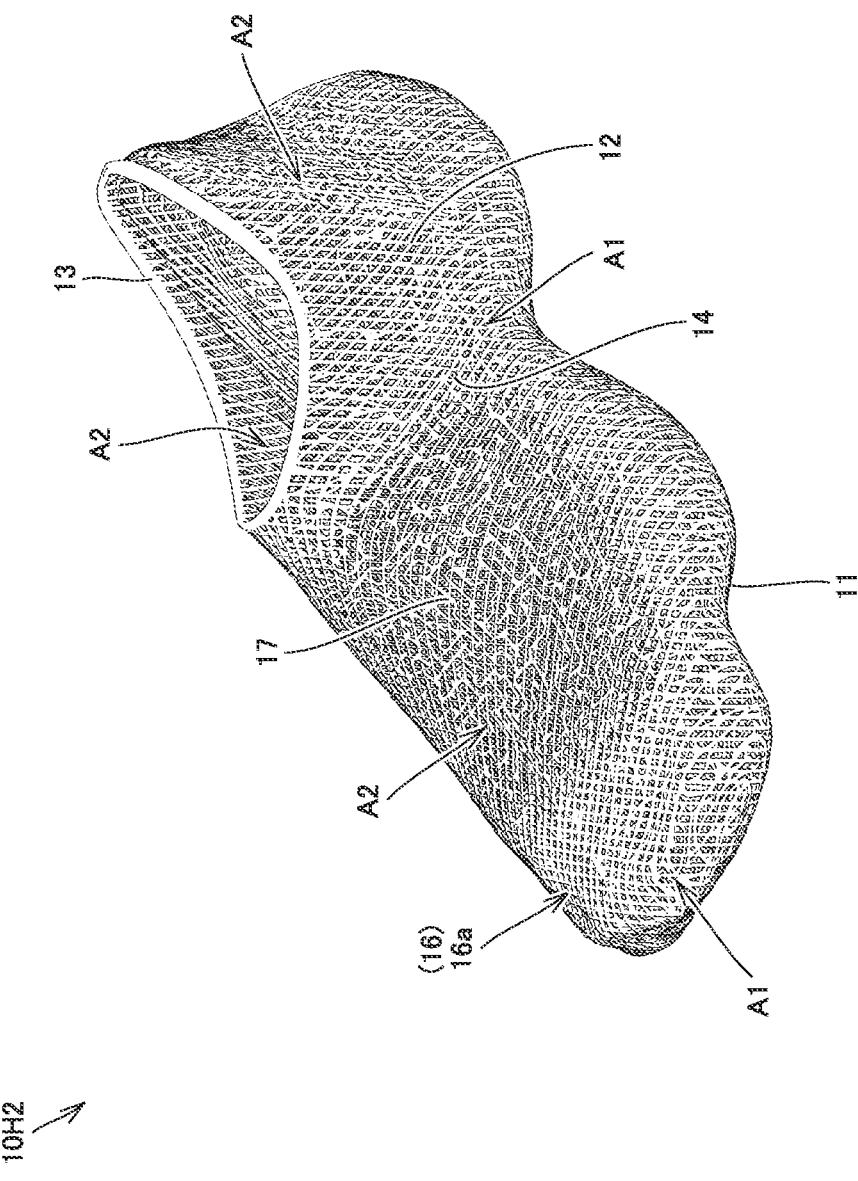
FIG. 26 is a perspective view of a shell that a shoe comprises according to a fifth exemplary variation.

FIGS. 25 and 26 are perspective views of shells that shoes according to fourth and fifth exemplary variations, respectively, comprise. Hereinafter, with reference to FIGS. 25 and 26, the shoes according to the fourth and fifth exemplary variations based on the eighth embodiment will be described. The shoes according to the fourth and fifth exemplary variations comprise shells 10H1 to 10H2 shown in FIGS. 25 to 26, respectively, instead of the shell 10A that the shoe 1A according to the first embodiment comprises, and have a remainder in configuration similar to that of the first embodiment.

As shown in FIG. 25, the shell 10H1 that the shoe according to the fourth exemplary variation comprises is different from the shell 10H that the shoe according to the eighth embodiment comprises in the motif of the design portion 17. That is, the shell 10H1 is provided as the design portion 17 with a curved or straight motif branched and extending like a branch of a tree.

As shown in FIG. 26, the shell 10H2 that the shoe according to the fifth exemplary variation comprises is different from the shell 10H that the shoe according to the eighth embodiment comprises in the motif of the design portion 17. That is, the shell 10H2 is provided as the design portion 17 with a curved or straight motif branched and extending like a labyrinth.

Thus a motif as the design portion 17 can be changed in various ways, and a design portion 17 of various designs such as logos and various graphics can also be provided.

Ninth Embodiment

Figure 27:
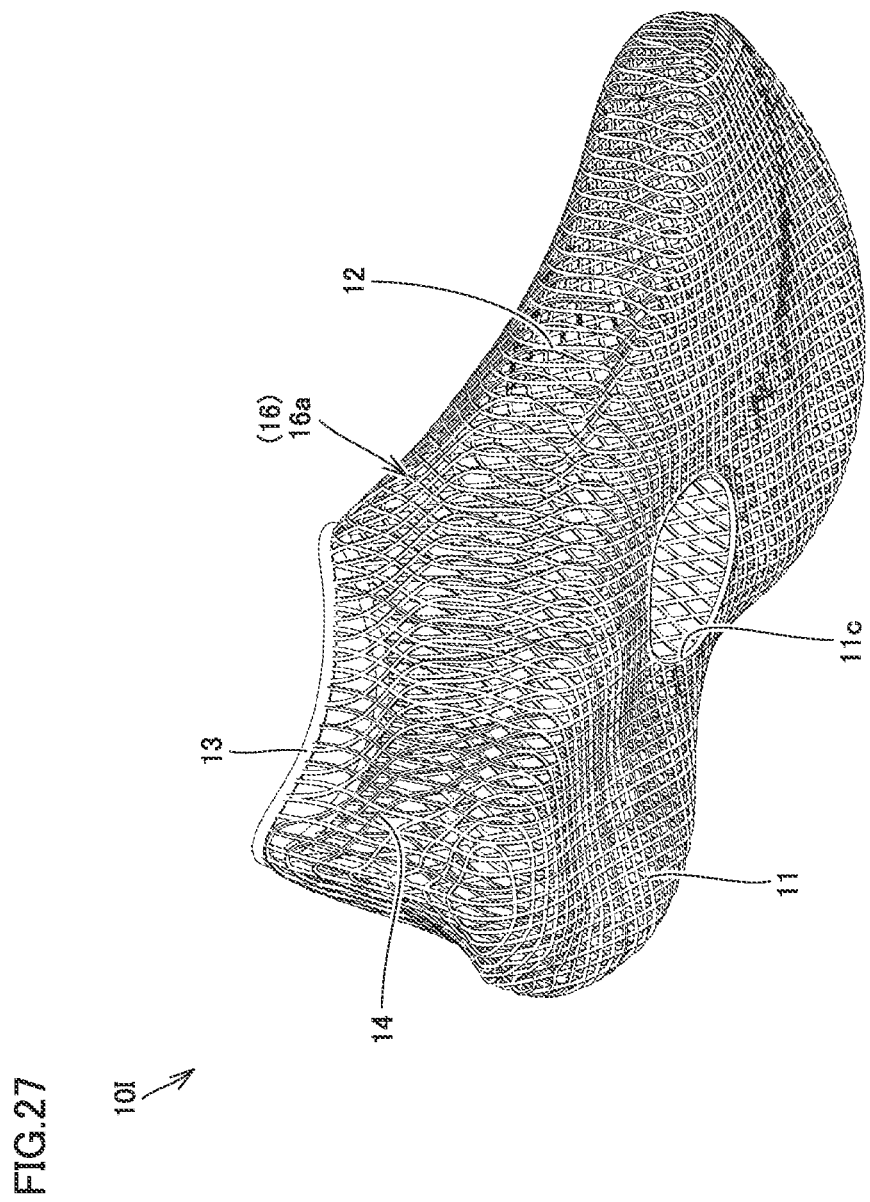
FIG. 27 is a perspective view of a shell that a shoe comprises according to a ninth embodiment.

FIG. 27 is a perspective view of a shell that a shoe comprises according to a ninth embodiment. Hereinafter, the shoe according to the present embodiment will be described with reference to FIG. 27. The shoe according to the present embodiment comprises a shell 10I shown in FIG. 27 instead of the shell 10A that the shoe 1A according to the first embodiment comprises, and has a remainder in configuration similar to that of the first embodiment.

As shown in FIG. 27, the shell 10I that the shoe according to the present embodiment comprises, as well as the shell 10A according to the first embodiment, includes the bottom wall portion 11 and the peripheral wall portion 12, and has the insertion portion 13 in the form of an opening at an upper end of the peripheral wall portion 12. The shell 10I has the bottom wall portion 11 and the peripheral wall portion 12 composed of the mesh member 16a serving as the base structure portion 16, and accordingly, these portions of the shell 10I have numerous holes 14.

The shell 10I is provided with an opening 11c at a generally central portion of the bottom wall portion 11 (that is, a portion corresponding to the arch of a foot of the wearer). When the shell 10I is thus provided with the opening 11c, the portion provided with the opening 11c can expose the lower surface 22 of the sole body 20 in a larger area than that provided with the hole 14.

Therefore, various types of indications such as various types of logos and shoe sizes provided on the lower surface 22 of the sole body 20 at the exposed portion can be externally, visibly recognized.

Thus, the shoe according to the present embodiment can provide the effect described in the first embodiment, and in addition thereto, can easily provide various types of indications on the bottom surface of the shoe. While the shell 10I having such a structure can also be manufactured by injection molding or cast molding, the shell can be relatively easily manufactured by additive manufacturing using a three-dimensional additive manufacturing apparatus, as set forth above, in particular.

The opening is not particularly limited in position, number, size, shape and the like, and is changeable as appropriate. In particular, it is not a requirement that the opening be provided on the bottom wall of the shell, and may be provided on the peripheral wall of the shell.

Tenth Embodiment

Figure 28:
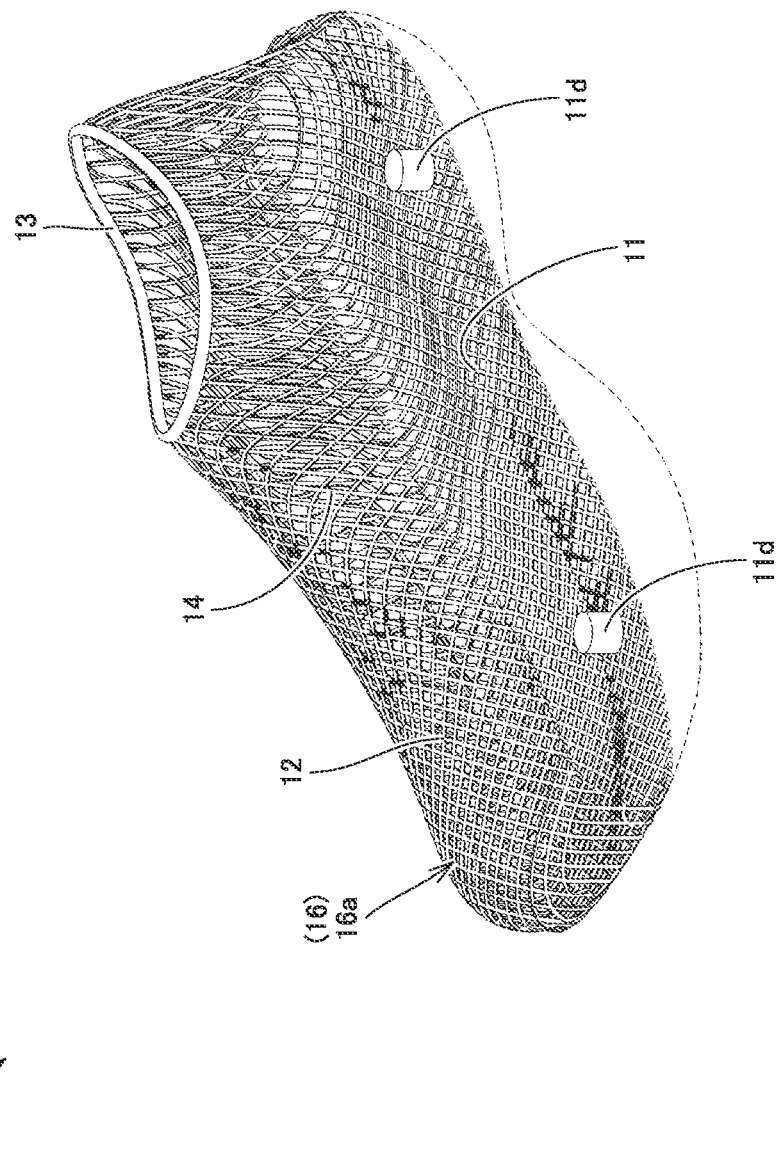
FIG. 28 is a partially cutaway perspective view of a shell that a shoe comprises according to a tenth embodiment.

FIG. 28 is a partially cutaway perspective view of a shell that a shoe comprises according to a tenth embodiment. Hereinafter, the shoe according to the present embodiment will be described with reference to FIG. 28. The shoe according to the present embodiment comprises a shell 10J shown in FIG. 28 instead of the shell 10A that the shoe 1A according to the first embodiment comprises, and has a remainder in configuration similar to that of the first embodiment.

As shown in FIG. 28, the shell 10J that the shoe according to the present embodiment comprises, as well as the shell 10A according to the first embodiment, includes the bottom wall portion 11 and the peripheral wall portion 12, and has the insertion portion 13 in the form of an opening at an upper end of the peripheral wall portion 12. The shell 10J has the bottom wall portion 11 and the peripheral wall portion 12 composed of the mesh member 16a serving as the base structure portion 16, and accordingly, these portions of the shell 10J have numerous holes 14.

The shell 10J is provided with a projection 11d on the bottom wall portion 11 at a generally central portion of a portion corresponding to the forefoot portion R1 as well as on the bottom wall portion 11 at a portion which is generally central in a portion corresponding to the rearfoot portion R3 and is closer to the front side. The projection 11d projects toward the internal space SP from the inner surface 11a of the bottom wall portion 11.

The projection 11d serves as a guide in assembling the sole body 20 to the shell 10J and prevents the sole body 20 from being positionally displaced with respect to the shell 10J after the sole body 20 is assembled to the shell 10J, and the sole body 20 is provided with a recess (not shown) corresponding to the projection 11d.

Thus, the shoe according to the present embodiment can provide the effect described in the first embodiment, and in addition thereto, can effectively facilitate an assembling operation when manufacturing the shoe and prevent the sole body 20 from being positionally displaced after it is assembled. While the shell 10J having such a structure can also be manufactured by injection molding or cast molding, the shell can be relatively easily manufactured by additive manufacturing using a three-dimensional additive manufacturing apparatus, as set forth above, in particular.

The projection is not particularly limited in position, number, size, shape and the like, and is changeable as appropriate. Further, it is not a requirement that the projection be provided on the bottom wall portion of the shell, and may be provided on the first portion that is a portion of the peripheral wall portion facing the sole body.

Eleventh Embodiment

Figure 29:
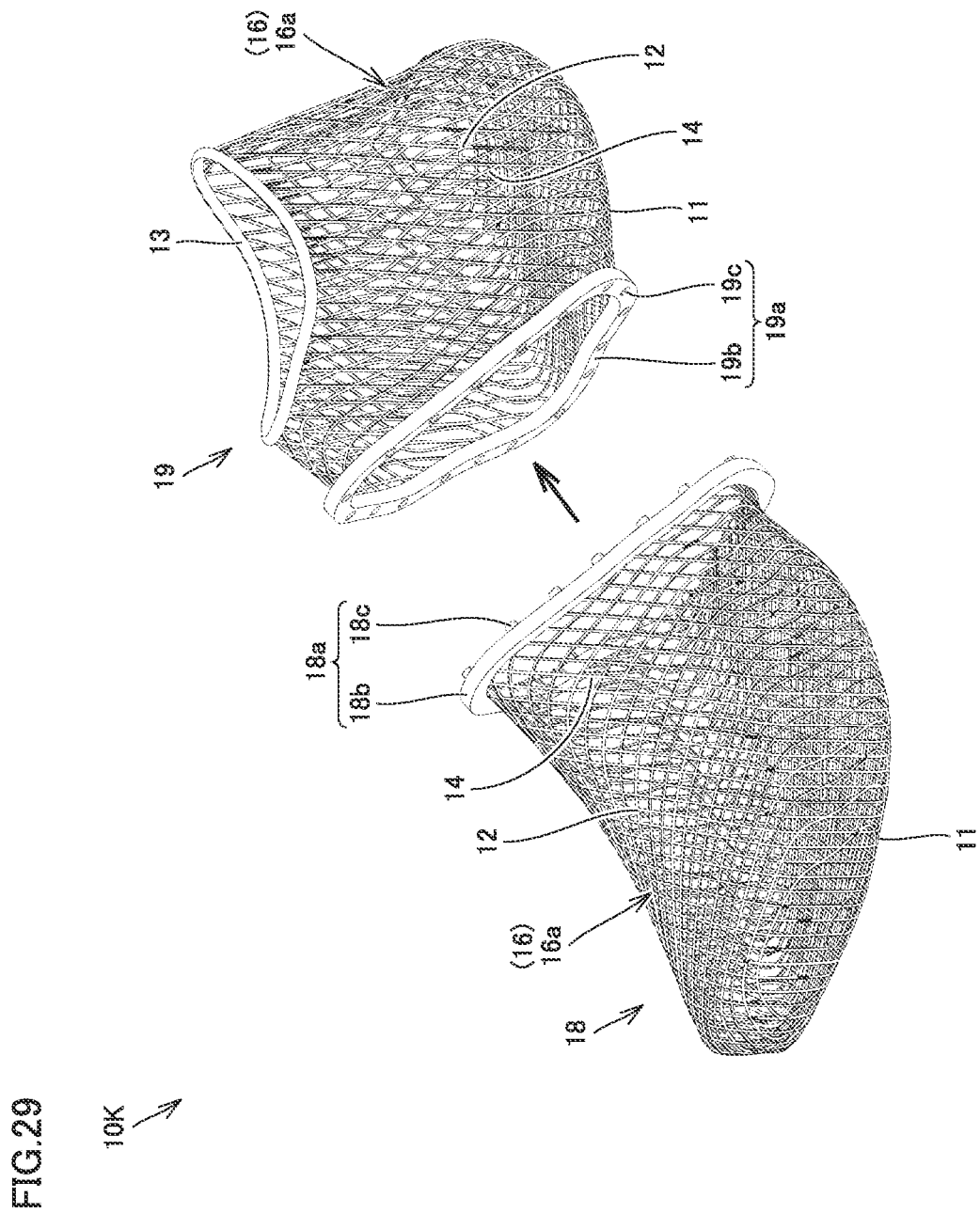
FIG. 29 is an exploded perspective view of a shell that a shoe comprises according to an eleventh embodiment.

FIG. 29 is an exploded perspective view of a shell that a shoe comprises according to an eleventh embodiment. Hereinafter, the shoe according to the present embodiment will be described with reference to FIG. 29. The shoe according to the present embodiment comprises a shell 10K shown in FIG. 29 instead of the shell 10A that the shoe 1A according to the first embodiment comprises, and has a remainder in configuration similar to that of the first embodiment.

As shown in FIG. 29, the shell 10K that the shoe according to the present embodiment comprises is composed of a first shell portion 18 and a second shell portion 19 serving as a plurality of members and combined together. The first shell portion 18 includes a portion corresponding to the forefoot portion R1 and a portion corresponding to generally the front half of the midfoot portion R2, and the second shell portion 19 includes a portion corresponding to generally the rear half of the midfoot portion R2 and a portion corresponding to the rearfoot portion R3. Thus, the shell 10K is divided into two parts at a generally central portion in the longitudinal direction.

The first shell portion 18 and the second shell portion 19 each include the bottom wall portion 11 and the peripheral wall portion 12, and the second shell portion 19 has the insertion portion 13 in the form of an opening at an upper end of the peripheral wall portion 12. The first shell portion 18 and the second shell portion 19 have the bottom wall portion 11 and the peripheral wall portion 12 composed of the mesh member 16a serving as the base structure portion 16, and accordingly, the first shell portion 18 and the second shell portion 19 of that portion have numerous holes 14.

A joint portion 18a is provided at a rear end portion of the first shell portion 18, and the joint portion 18a includes a frame-shaped portion 18b and a protrusion 18c provided on a rear end surface of the frame-shaped portion 18b. In contrast, a joint portion 19a is provided at a front end portion of the second shell portion 19, and the joint portion 19a includes a frame-shaped portion 19b and a recess 19c provided in a front end surface of the frame-shaped portion 19b.

The first shell portion 18 and the second shell portion 19 are assembled together as they have their respective joint portions 18a and 19a joined together. Specifically, the rear end surface of the joint portion 18a of the first shell portion 18 and the front end surface of the joint portion 19a of the second shell portion 19 abut against each other and the protrusion 18c of the first shell portion 18 is fitted into the recess 19c of the second shell portion 19 to assemble the first shell portion 18 and the second shell portion 19 together.

When simply fitting the protrusion 18c into the recess 19c does not provide sufficient bonding force, then, in addition thereto, bonding, welding, clipping, or engagement by engaging portions (such as a snap-fit structure) provided to the first shell portion 18 and the second shell portion 19, or the like may be utilized.

Such a configuration can also provide an effect similar to that described in the first embodiment. While the shell 10K having such a structure can also be manufactured by injection molding or cast molding, the shell can be relatively easily manufactured by additive manufacturing using a three-dimensional additive manufacturing apparatus, as set forth above, in particular.

When the shell is additively manufactured by using a three-dimensional additive manufacturing apparatus, it may be advantageous to compose the shell of a plurality of members as described in the present embodiment. That is, for additive manufacturing using a three-dimensional additive manufacturing apparatus, there are many cases with a limitation imposed in size on a product to be additively manufactured, and an additively manufactured product having a larger size requires a longer period of time for manufacturing it. A shell composed of a plurality of members combined together is less likely to be restricted in size, as described above, and furthermore, fabricating the plurality of members at the same time in parallel allows the shell to be manufactured in a short period of time.

Thus, the shoe according to the present embodiment can provide the effect described in the first embodiment, and in addition thereto, can also be effectively easily manufactured. While in the present embodiment the joint portion 18a of the first shell portion 18 and the joint portion 19a of the second shell portion 19 each include a portion projecting outward from the peripheral wall portion 12 in the form of a flange, it can be configured to be continue to the outer surface 12b of the peripheral wall portion 12 to make the joint portion 18a and the joint portion 19a unnoticeable (Sixth Exemplary Variation)

Figure 30:
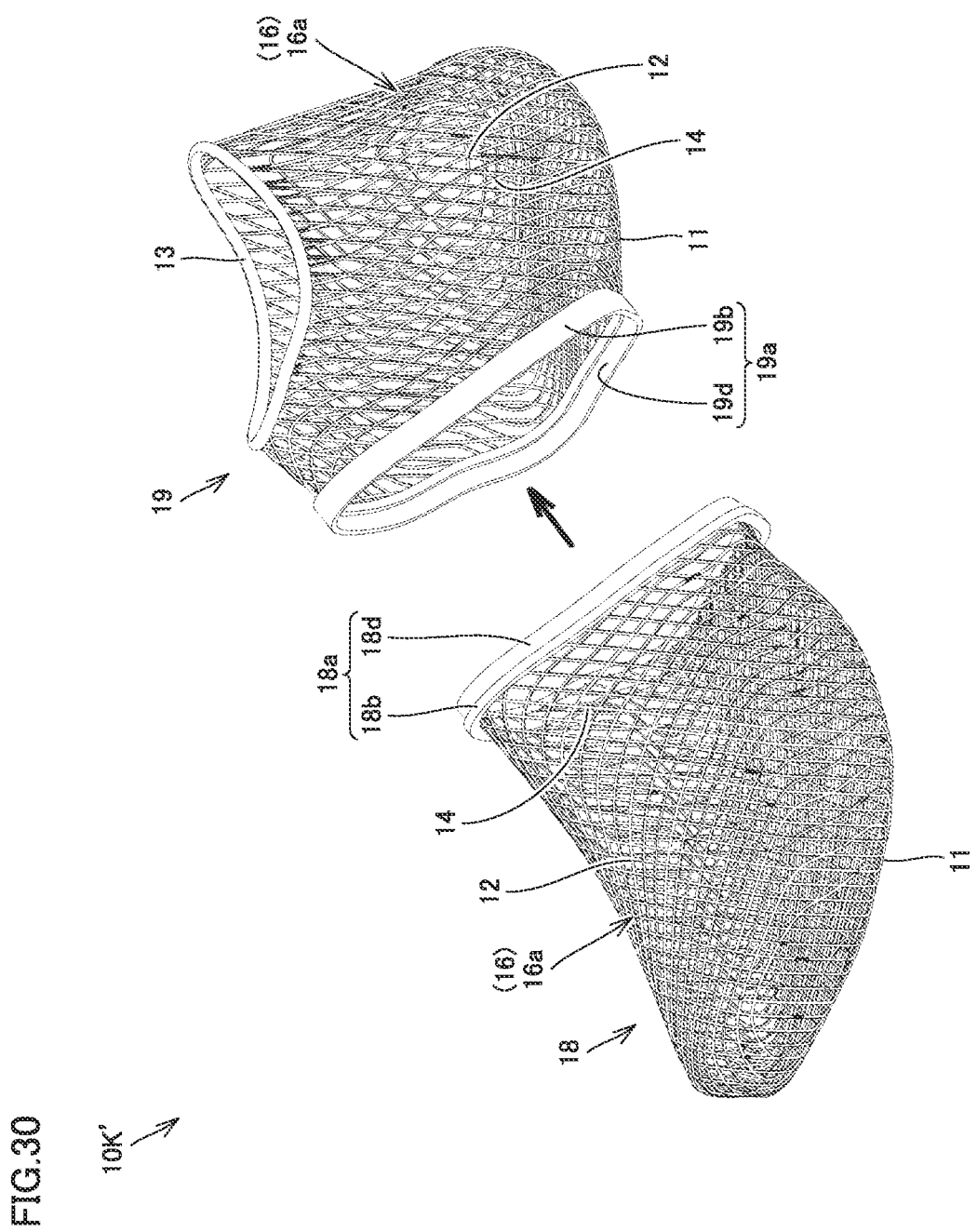
FIG. 30 is an exploded perspective view of a shell that a shoe comprises according to a sixth exemplary variation.

FIG. 30 is an exploded perspective view of a shell that a shoe comprises according to a sixth exemplary variation. Hereinafter, the shoe according to the sixth exemplary variation based on the eleventh embodiment will be described with reference to FIG. 30. The shoe according to the sixth exemplary variation comprises a shell 10K' shown in FIG. 30 instead of the shell 10A that the shoe 1A according to the first embodiment comprises, and has a remainder in configuration similar to that of the first embodiment.

As shown in FIG. 30, the shell 10K' that the shoe according to the sixth exemplary variation comprises is different from the shell 10K that the shoe according to the eleventh embodiment comprises in the configuration of the joint portions 18a and 19a. That is, for the shell 10K', the joint portion 18a includes the frame-shaped portion 18b and a step portion 18d provided on a rear end surface of the frame-shaped portion 18b, and the joint portion 19a includes the frame-shaped portion 19b and a step portion 19d provided on a front end surface of the frame-shaped portion 19b.

The first shell portion 18 and the second shell portion 19 are assembled together as they have their respective joint portions 18a and 19a joined together. Specifically, the rear end surface of the joint portion 18a of the first shell portion 18 and the front end surface of the joint portion 19a of the second shell portion 19 abut against each other and the step portion 18d of the first shell portion 18 is fitted to the step portion 19d of the second shell portion 19 to assemble the first shell portion 18 and the second shell portion 19 together.

When simply fitting the step portion 18d to the step portion 19d does not provide sufficient bonding force, then, in addition thereto, bonding, welding, clipping, or engagement by engaging portions (such as a snap-fit structure) provided to the first shell portion 18 and the second shell portion 19, or the like may be utilized.

Such a configuration can also provide the effect described in the first embodiment, and further, effectively facilitate manufacturing the shell when it is additively manufactured using a three-dimensional additive manufacturing apparatus, as described above.

Twelfth Embodiment

Figure 31:
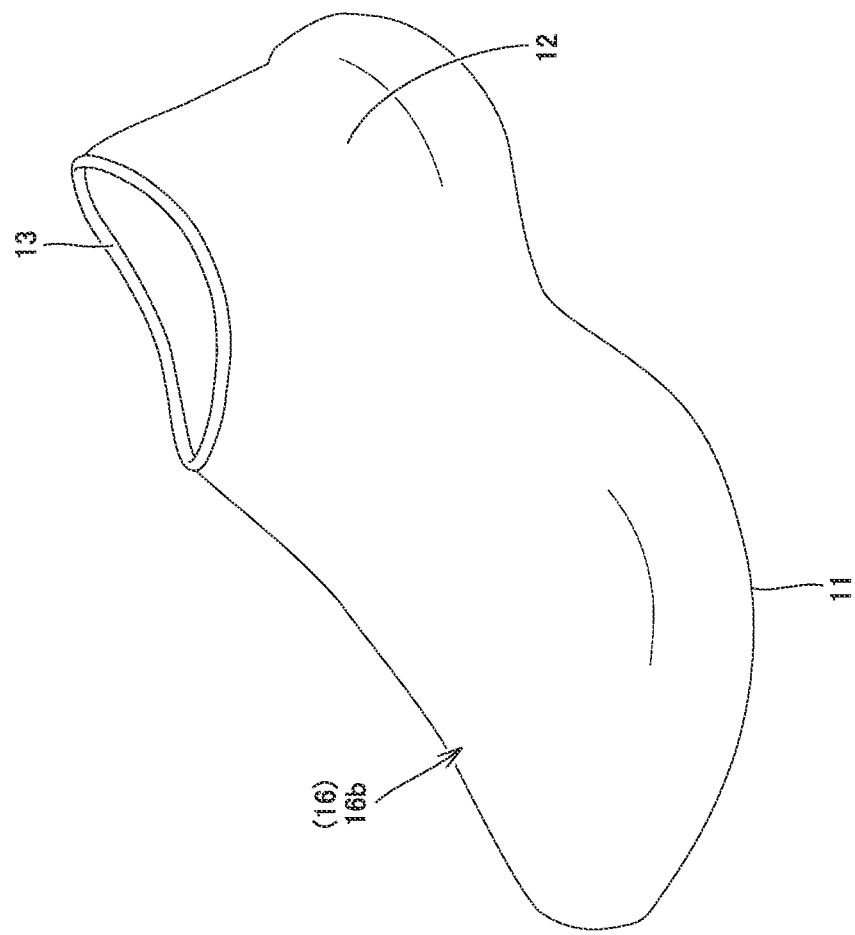
FIG. 31 is a perspective view of a shell that a shoe comprises according to a twelfth embodiment.
Figure 32:
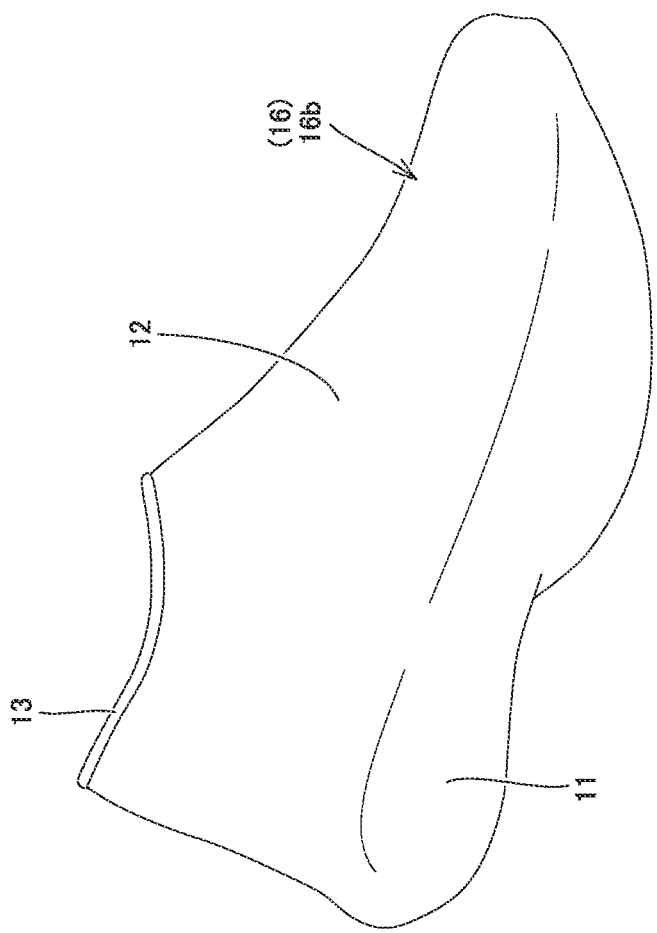
FIG. 32 is a perspective view of the shell shown in FIG. 31, as seen in a different direction.

FIG. 31 is a perspective view of a shoe according to a twelfth embodiment, and FIG. 32 is a perspective view of the shoe shown in FIG. 31, as seen in a different direction. Hereinafter, the shoe according to the present embodiment will be described with reference to FIGS. 31 and 32. The shoe according to the present embodiment comprises a shell 10L shown in FIGS. 31 and 32 instead of the shell 10A that the shoe 1A according to the first embodiment comprises, and has a remainder in configuration similar to that of the first embodiment.

As shown in FIGS. 31 and 32, the shell 10L that the shoe according to the present embodiment comprises, as well as the shell 10A according to the first embodiment, includes the bottom wall portion 11 and the peripheral wall portion 12, and has the insertion portion 13 in the form of an opening at an upper end of the peripheral wall portion 12. The shell 10L has the bottom wall portion 11 and the peripheral wall portion 12 differently than the shell 10A according to the first embodiment, that is, composed of the plate-shaped member 16b serving as the base structure portion 16, and accordingly, these portions of the shell 10L have no hole.

In such a configuration, the bottom wall portion 11 and the peripheral wall portion 12 are formed of the plate-shaped member 16b having no hole, and thus significantly enhanced in rigidity.

Thus, the shoe according to the present embodiment can provide the effect described in the first embodiment, and in addition thereto, can have the bottom wall portion 11 and the peripheral wall portion 12 effectively enhanced in strength. While the shell 10L having such a structure can also be manufactured by injection molding or cast molding, the shell can be relatively easily manufactured by additive manufacturing using a three-dimensional additive manufacturing apparatus, as set forth above, in particular.

Thirteenth Embodiment

Figure 33:
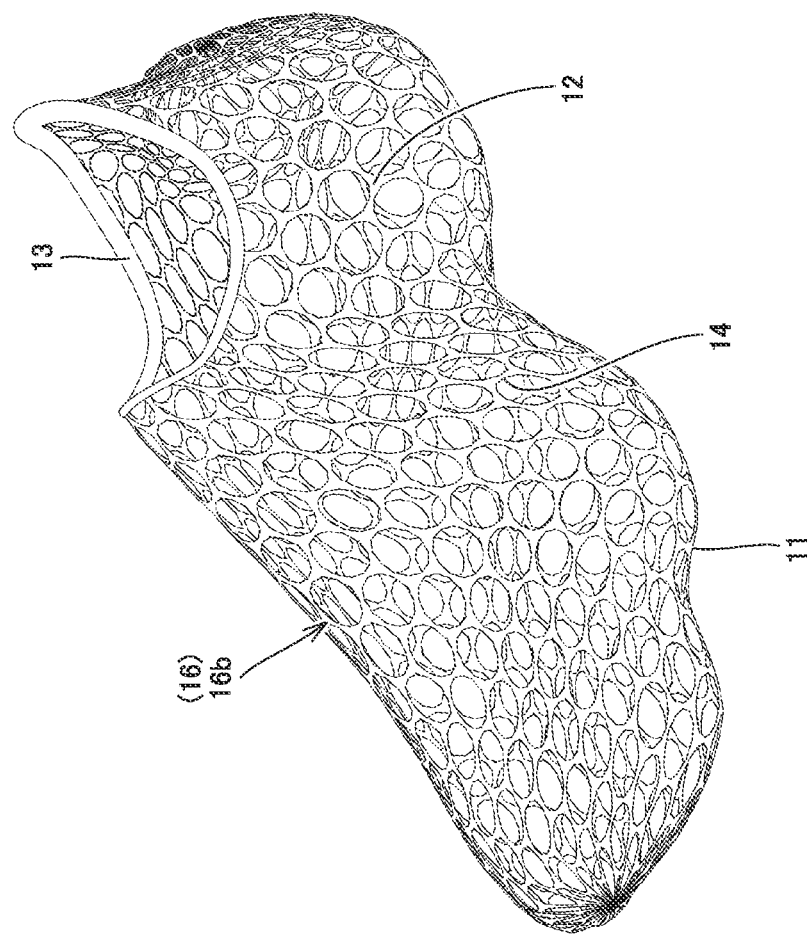
FIG. 33 is a perspective view of a shell that a shoe comprises according to a thirteenth embodiment.

FIG. 33 is a perspective view of a shoe according to a thirteenth embodiment. Hereinafter, the shoe according to the present embodiment will be described with reference to FIG. 33. The shoe according to the present embodiment comprises a shell 10M shown in FIG. 33 instead of the shell 10A that the shoe 1A according to the first embodiment comprises, and has a remainder in configuration similar to that of the first embodiment.

As shown in FIG. 33, the shell 10M that the shoe according to the present embodiment comprises, as well as the shell 10A according to the first embodiment, includes the bottom wall portion 11 and the peripheral wall portion 12, and has the insertion portion 13 in the form of an opening at an upper end of the peripheral wall portion 12. The shell 10M has the bottom wall portion 11 and the peripheral wall portion 12 differently than the shell 10A according to the first embodiment, that is, composed of the plate-shaped member 16b serving as the base structure portion 16. The plate-shaped member 16b is provided with openings so as to reach the inner surfaces 11a and 12a and the outer surfaces 11b and 12b, and accordingly, these portions of the shell 10M have numerous holes 14.

In such a configuration, the bottom wall portion 11 and the peripheral wall portion 12 are composed of the plate-shaped member 16b and thus enhanced in rigidity, and the plate-shaped member 16b having numerous holes 14 is light in weight.

Thus, the shoe according to the present embodiment can provide the effect described in the first embodiment, and in addition thereto, can have the bottom wall portion 11 and the peripheral wall portion 12 effectively enhanced in strength and light in weight. While the shell 10M having such a structure can also be manufactured by injection molding or cast molding, the shell can be relatively easily manufactured by additive manufacturing using a three-dimensional additive manufacturing apparatus, as set forth above, in particular.

Fourteenth Embodiment

Figure 34:
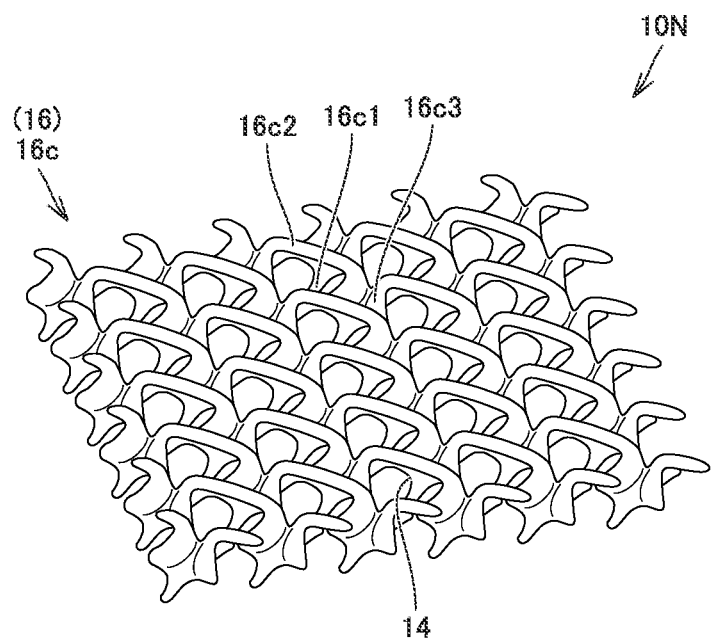
FIG. 34 is a partial perspective view of a shell that a shoe comprises according to a fourteenth embodiment.

FIG. 34 is a partial perspective view of a shell that a shoe comprises according to a fourteenth embodiment. Hereinafter, the shoe according to the present embodiment will be described with reference to FIG. 34. The shoe according to the present embodiment comprises a shell 10N, which is partially shown in FIG. 33, instead of the shell 10A that the shoe 1A according to the first embodiment comprises, and has a remainder in configuration similar to that of the first embodiment.

The shell 10N that the shoe according to the present embodiment comprises is different from the shell 10A that the shoe 1A according to the first embodiment comprises in the configuration of the base structure portion 16 that the bottom wall portion 11 and the peripheral wall portion 12 have, and specifically, the base structure portion 16 is composed of a member 16c analogous to a knitted structure as shown in FIG. 34.

As shown in FIG. 34, the member 16c serving as the base structure portion 16 and analogous to a knitted structure includes a warp element 16c1, a weft element 16c2, and a connecting portion 16c3, and the warp element 16c1 and the weft element 16c2 extend across each other at different locations in the direction of the thickness of the base structure portion 16 and are also connected to each other at the connecting portion 16c3 disposed in a matrix.

When the shell with the bottom wall portion and the peripheral wall portion composed of the base structure portion having a three-dimensional shape analogous to such a knitted structure is compared with the shell with the bottom wall portion and the peripheral wall portion composed of the meshy or plate-shaped base structure portion, the former allows a larger degree of freedom in designing strength, deformability, foot comfort, and the like than the latter.

Thus, the shoe according to the present embodiment can provide the effect described in the first embodiment, and in addition thereto, can also provide another effect, that is, the shoe can be more excellent in strength, deformability, foot comfort, and the like. The shell 10N having such a structure can be relatively easily manufactured by additive manufacturing using a three-dimensional additive manufacturing apparatus, as set forth above, in particular.

Fifteenth Embodiment

Figure 35:
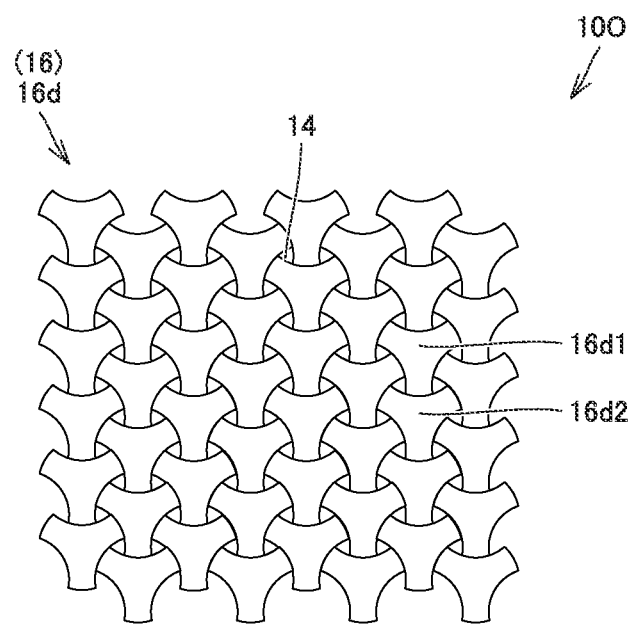
FIG. 35 is a partial plan view of a shell that a shoe comprises according to a fifteenth embodiment.

FIG. 35 is a partial plan view of a shell that a shoe comprises according to a fifteenth embodiment. Hereinafter, the shoe according to the present embodiment will be described with reference to FIG. 35. The shoe according to the present embodiment comprises a shell 10O, which is partially shown in FIG. 35, instead of the shell 10A that the shoe 1A according to the first embodiment comprises, and has a remainder in configuration similar to that of the first embodiment.

The shell 10O that the shoe according to the present embodiment comprises is different from the shell 10A that the shoe 1A according to the first embodiment comprises in the configuration of the base structure portion 16 that the bottom wall portion 11 and the peripheral wall portion 12 have, and specifically, the base structure portion 16 is composed of a member 16d analogous to a knitted structure as shown in FIG. 35.

As shown in FIG. 35, the member 16d analogous to a knitted structure and serving as the base structure portion 16 has a pair of a first perforated plate element 16d1 and a second perforated plate element 16d2, each received in a hole provided in the other.

When the shell with the bottom wall portion and the peripheral wall portion composed of the base structure portion having a three-dimensional shape analogous to such a knitted structure is compared with the shell with the bottom wall portion and the peripheral wall portion composed of the meshy or plate-shaped base structure portion, the former allows a larger degree of freedom in designing strength, deformability, foot comfort, and the like than the latter.

Thus, the shoe according to the present embodiment can provide the effect described in the first embodiment, and in addition thereto, can also provide another effect, that is, the shoe can be more excellent in strength, deformability, foot comfort, and the like. The shell 10O having such a structure can be relatively easily manufactured by additive manufacturing using a three-dimensional additive manufacturing apparatus, as set forth above, in particular.

Sixteenth Embodiment

Figure 36:
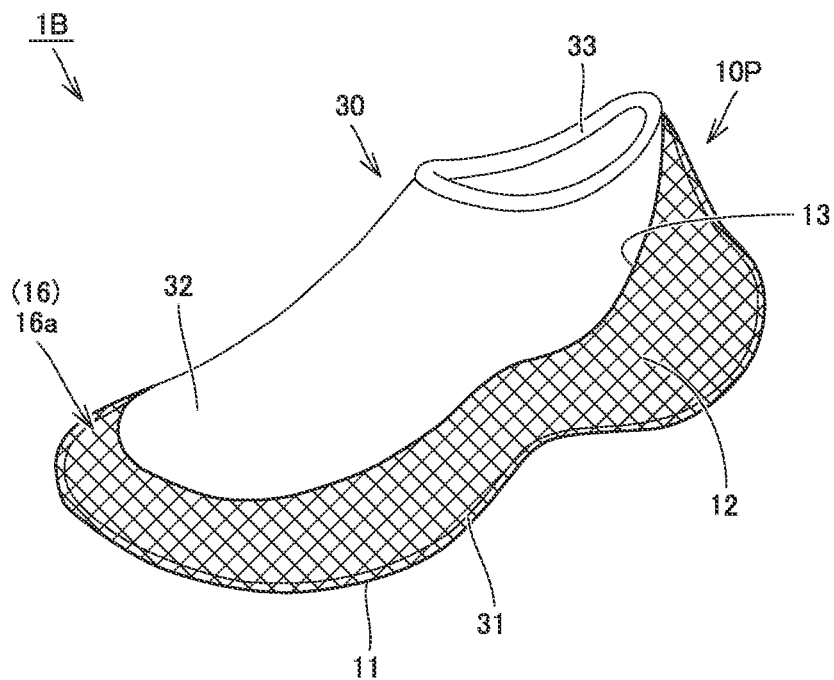
FIG. 36 is a perspective view of a shoe according to a sixteenth embodiment.

FIG. 36 is a perspective view of a shoe according to a sixteenth embodiment. Hereinafter, a shoe 1B according to the present embodiment will be described with reference to FIG. 36.

As shown in FIG. 36, the shoe 1B according to the present embodiment comprises a shell 10P having a configuration different from that of the shell 10A that the shoe 1A according to the first embodiment comprises, and has a remainder in configuration similar to the shoe 1A according to the first embodiment.

Specifically, for the shell 10P, the insertion portion 13 in the form of an opening provided at an upper end of the peripheral wall portion 12 is formed to be large across the forefoot portion R1, the midfoot portion R2, and the rearfoot portion R3. More specifically, the peripheral wall portion 12 is configured to mainly cover a portion of a foot of the wearer corresponding to the toes, a portion of the foot of the wearer corresponding to the medial and lateral sides of the instep, and a portion of a peripheral surface of the heel of the foot of the wearer that corresponds to the side of the sole of the foot of the wearer, and the peripheral wall portion 12 generally does not cover a portion corresponding to a central portion of the instep of the foot of the wearer in the direction of the width of the foot and a portion of the peripheral surface of the heel of the foot of the wearer that corresponds to the side of an ankle.

Thus, the upper body 30 has the wall portion 32 externally exposed at the portion corresponding to the central portion of the instep of the foot of the wearer in the direction of the width of the foot and the portion of the peripheral surface of the heel of the foot of the wearer that corresponds to the side of the ankle.

The shoe 1B according the present embodiment also has the shell 10P with the internal space SP divided into the lower space SP1 and the upper space SP2 and the lower space SP1 is defined by the bottom wall portion 11 and the above-described first portion of the peripheral wall portion 12 and the upper space SP2 is defined by the above-described second portion of the peripheral wall portion 12. And when the sole body 20 is disposed inside the upper body 30, the sole body 20 is accommodated in the upper space SP1, whereby the shoe 1B has a tread composed of the outer surface 11b of the bottom wall portion 11 of the shell 10P.

Thus, the shoe 11B according to the present embodiment, as well as the shoe 1A according to the first embodiment, can suppress an increase in the number of parts thereof while increasing a degree of freedom in selecting a material for the sole body, and furthermore, can be manufactured more easily than conventional.

Seventeenth Embodiment

Figure 37:
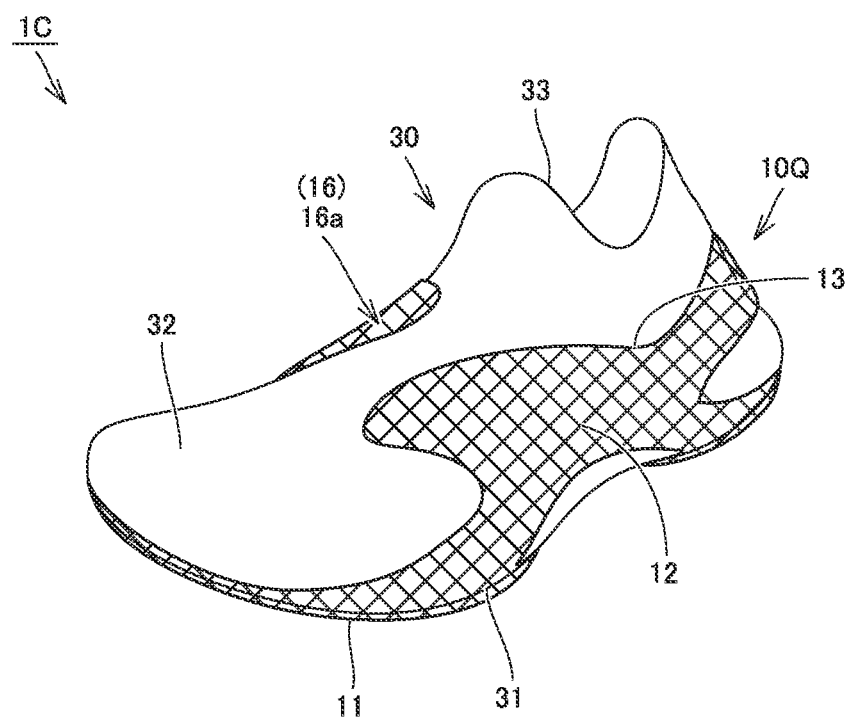
FIG. 37 is a perspective view of a shoe according to a seventeenth embodiment.

FIG. 37 is a perspective view of a shoe according to a seventeenth embodiment. Hereinafter, a shoe 1C according to the present embodiment will be described with reference to FIG. 37.

As shown in FIG. 37, the shoe 1C according to the present embodiment comprises a shell 10Q having a configuration different from that of the shell 10A that the shoe 1A according to the first embodiment comprises, and has a remainder in configuration similar to the shoe 1A according to the first embodiment.

Specifically, for the shell 10Q, the insertion portion 13 in the form of an opening provided at an upper end of the peripheral wall portion 12 is formed to be large across the forefoot portion R1, the midfoot portion R2, and the rearfoot portion R3. More specifically, the peripheral wall portion 12 is configured to mainly cover a portion of a foot of the wearer corresponding to the tips of the toes, a portion of the foot of the wearer corresponding to the medial and lateral sides of the instep, a portion of a peripheral surface of the heel of the foot of the wearer that corresponds to the side of the sole of the foot of the wearer, and a portion of the peripheral surface of the heel of the foot of the wearer that corresponds to a portion intermediate between the side of the sole of the foot of the wearer and the side of an ankle of the wearer, and the peripheral wall portion 12 generally does not cover a portion of the foot of the wearer corresponding to the base of the toes, a portion corresponding to a central portion of the instep of the foot of the wearer in the direction of the width of the foot, a portion of the peripheral surface of the heel of the foot of the wearer that corresponds to the side of the ankle, and a portion on a lower side of a rear end of the heel of the foot of the wearer.

Thus, the upper body 30 has the wall portion 32 externally exposed at the portion of the foot of the wearer corresponding to the base of the toes, the portion corresponding to the central portion of the instep of the foot of the wearer in the direction of the width of the foot, the portion of the peripheral surface of the heel of the foot of the wearer that corresponds to the side of the ankle, and the portion on the lower side of the rear end of the heel of the foot of the wearer.

The shoe 1C according the present embodiment also has the shell 10Q with the internal space SP divided into the lower space SP1 and the upper space SP2, and the lower space SP1 is defined by the bottom wall portion 11 and the above-described first portion of the peripheral wall portion 12 and the upper space SP2 is defined by the above-described second portion of the peripheral wall portion 12. And when the sole body 20 is disposed inside the upper body 30, the sole body 20 is accommodated in the lower space SP1, whereby the shoe 1C has a tread composed of the outer surface 11b of the bottom wall portion 11 of the shell 10Q.

Thus, the shoe 1C according to the present embodiment, as well as the shoe 1A according to the first embodiment, can suppress an increase in the number of parts thereof while increasing a degree of freedom in selecting a material for the sole body, and furthermore, can be manufactured more easily than conventional.

Eighteenth Embodiment

Figure 38:
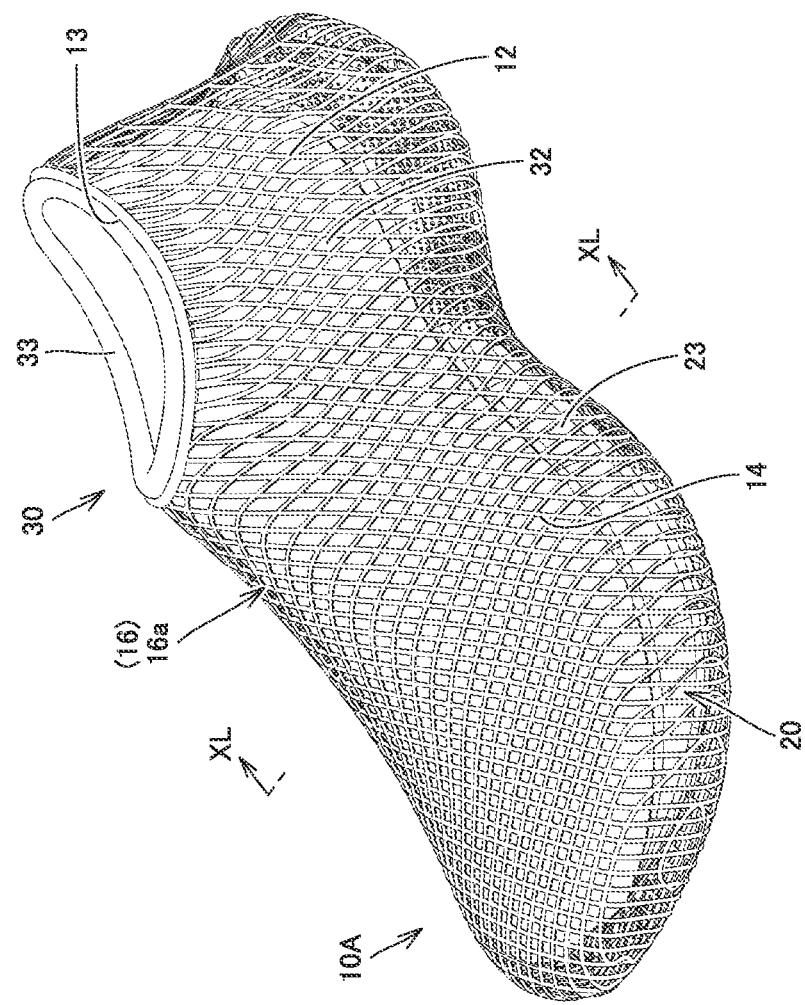
FIG. 38 is a perspective view of a shoe according to an eighteenth embodiment.
Figure 39:
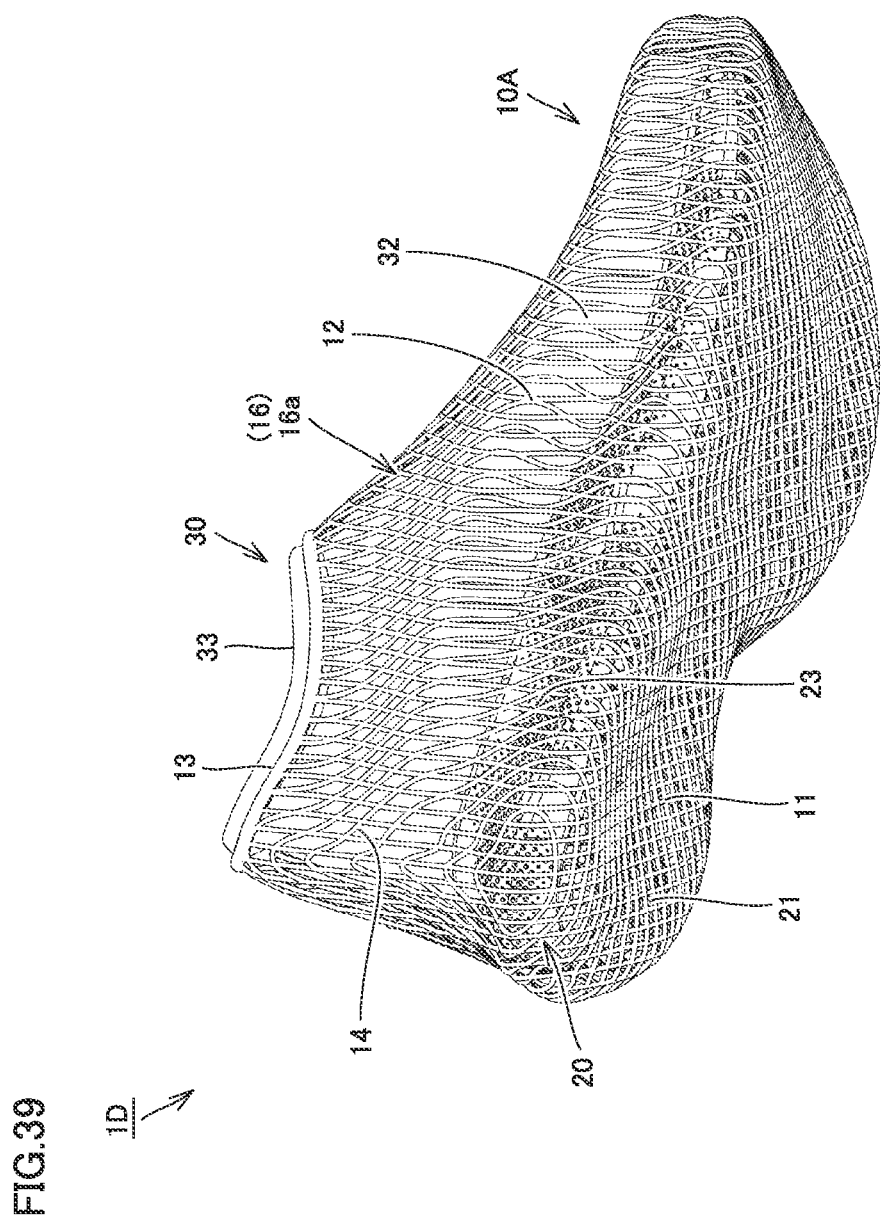
FIG. 39 is a perspective view of the shoe shown in FIG. 38, as seen in a different direction.
Figure 40:
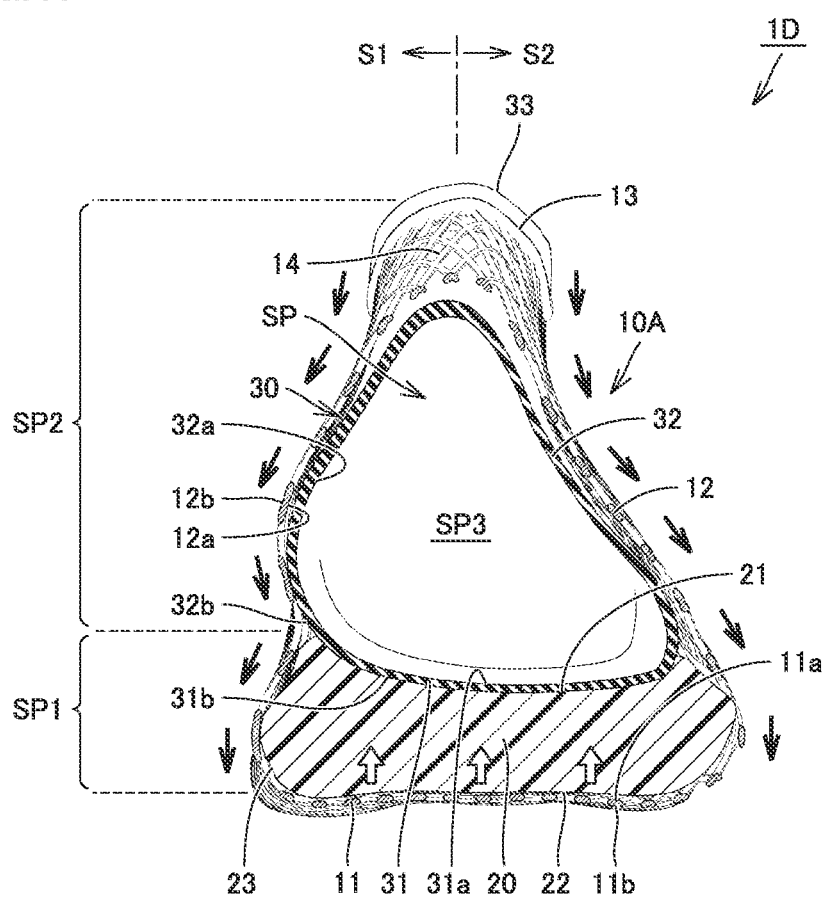
FIG. 40 is a cross-sectional view of the shoe shown in FIG. 38.

FIG. 38 is a perspective view of a shoe according to an eighteenth embodiment and FIG. 39 is a perspective view of the shoe shown in FIG. 38, as seen in a different direction. FIG. 40 is a cross-sectional view taken along a line XL-XL indicated in FIG. 38. Initially, a configuration of a shoe 1D according to the present embodiment will be described with reference to FIGS. 38 to 40.

As shown in FIGS. 38 to 40, the shoe 1D according to the present embodiment is in the form of a sock substantially entirely covering a foot of a wearer of the shoe (that is, a portion on the side of the distal end as seen at an ankle) and comprises a shell 10A, a sole body 20, and an upper body 30. An upper portion of the shoe 1D is provided with a topline 33 through which the foot of the wearer is inserted, and an internal space SP (see FIG. 40) into which the foot of the wearer is inserted when the shoe 1D is worn is formed inside the shoe 1D.

For the shoe 1D according to the present embodiment, the sole body 20 is accommodated in the shell 10A, and the upper body 30 is accommodated in the shell 10A so as to be located on the sole body 20. Thus, the sole body 20 is sandwiched between the shell 10A and the upper body 30. The shell 10A, the sole body 20, and the upper body 30 are all located across the forefoot portion R1, the midfoot portion R2, and the rearfoot portion R3.

More specifically, the shell 10A constitutes an outermost shell of the shoe 1D, and is formed of a single flexible member in the form of a bag. The shell 10A includes the bottom wall portion 11 and the peripheral wall portion 12 erected to extend continuously upward from a peripheral edge of the bottom wall portion 11, and the bottom wall portion 11 defines an outermost surface located on a lower side of the shoe 1D in the vertical direction and the peripheral wall portion 12 defines an outermost surface of the shoe 1D located in the longitudinal direction and the lateral direction.

The bottom wall portion 11 has an inner surface 11a and an outer surface 11b serving as a pair of main surfaces, and the peripheral wall portion 12 has an inner surface 12a and an outer surface 12b serving as a pair of main surfaces. The shell 10A has the bottom wall portion 11 and the peripheral wall portion 12 composed of the mesh member 16a serving as the base structure portion 16, and accordingly, these portions of the shell 10A have numerous holes 14 formed to reach the inner surfaces 11a and 12a and the outer surfaces 11b and 12b.

An insertion portion 13 in the form of an opening is provided at an upper end of the peripheral wall portion 12. The insertion portion 13 is provided across the midfoot portion R2 and the rearfoot portion R3.

The shell 10A is similar in configuration to the shell 10A that the shoe 1A according to the first embodiment comprises, and its material(s), the configuration of the base structure portion 16, and the like are also similar to those of the shell 10A that the shoe 1A according to the first embodiment comprises. This shell 10A, as well as the shell 10A that the shoe 1A according to the first embodiment comprises, can be manufactured, for example, by injection molding, cast molding, or additive manufacturing using a three-dimensional additive manufacturing apparatus, and in particular, can be suitably manufactured by additive manufacturing using the three-dimensional additive manufacturing apparatus.

As shown in FIG. 40, the internal space SP is formed in the shell 10A. The internal space SP is defined by the inner surface 11a of the bottom wall portion 11 and the inner surface 12a of the peripheral wall portion 12, and communicates with the insertion portion 13. The internal space SP is located across the forefoot portion R1, the midfoot portion R2, and the rearfoot portion R3. The internal space SP includes a space in which the sole body 20 and the upper body 30 are disposed as they are accommodated therein, and an insertion space SP3 that is a space in which a foot of the wearer is inserted.

Figure 41:
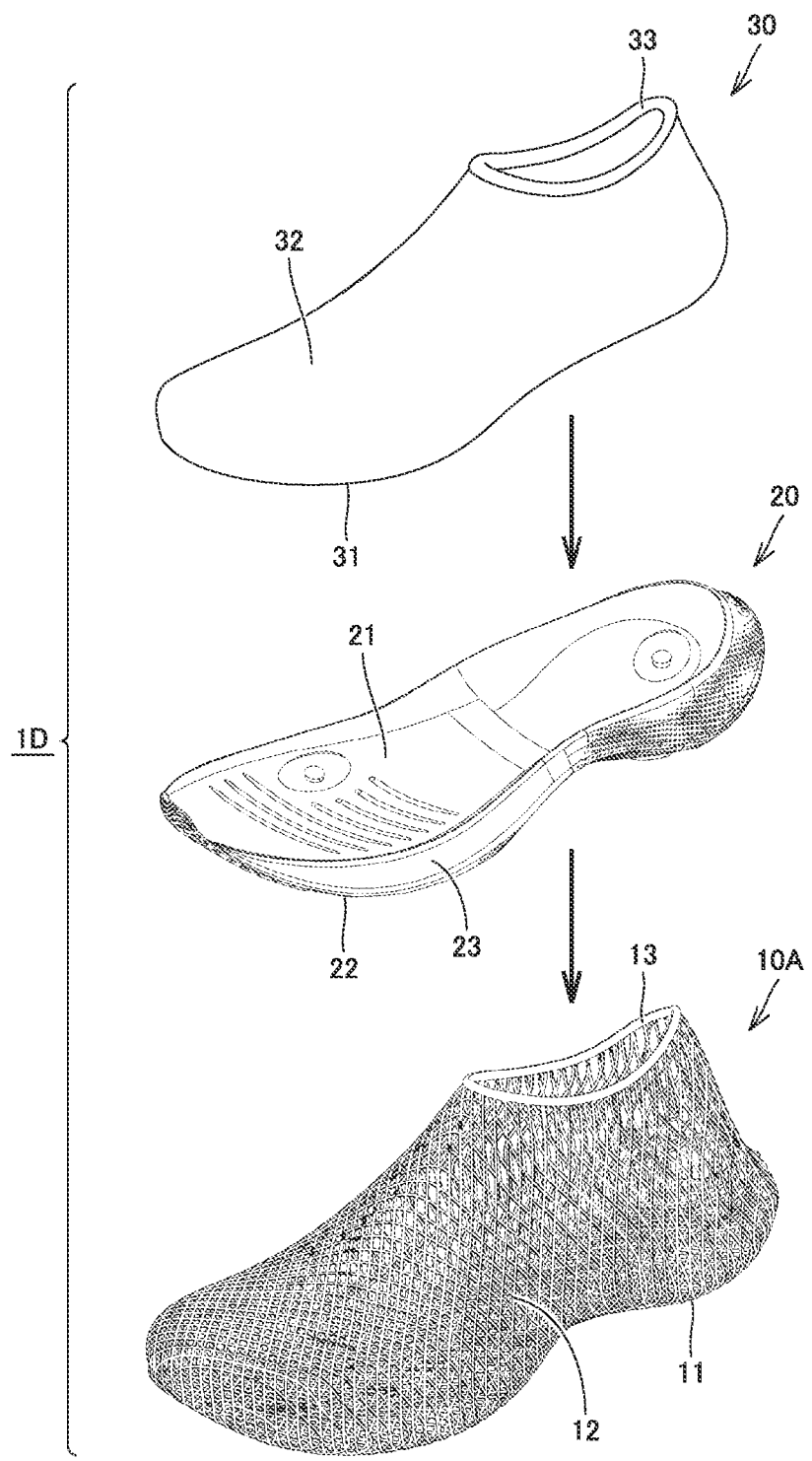
FIG. 41 is an exploded perspective view for illustrating a structure for assembling the shoe shown in FIG. 38.

As shown in FIGS. 38 to 40, the sole body 20 supports the sole of the foot of the wearer and is composed of an elastically deformable flat member (see FIG. 41). The sole body 20 is accommodated in the internal space SP of the shell 10A.

The sole body 20 has an upper surface 21 and a lower surface 22 serving as a pair of main surfaces, and a side surface 23 interconnecting the upper surface 21 and the lower surface 22. The lower surface 22 of the sole body 20 faces the inner surface 11a of the bottom wall portion 11 of the shell 10A, and the side surface 23 of the sole body 20 faces a portion of the inner surface 12a of the peripheral wall portion 12 of the shell 10A closer to a lower end. Thus, the sole body 20 covers the inner surface 11a of the bottom wall portion 11 of the shell 10A and the portion of the inner surface 12a of the peripheral wall portion 12 of the shell 10A closer to the lower end.

The sole body 20 is similar in configuration to the sole body 20 that the shoe 1A according to the first embodiment comprises, and what material is used therefor and the like are also similar to those of the sole body 20 that the shoe 1A according to the first embodiment comprises.

The upper body 30 configures a portion of the shoe 1D that comes into contact with a foot of the wearer to hold the foot of the wearer, and is composed of a flexibly deformable bag-shaped member. The upper body 30 is accommodated in the internal space SP of the shell 10A. The upper body 30 includes a bottom portion 31 and a wall portion 32 erected to extend continuously upward from a peripheral edge of the bottom portion 31.

The bottom portion 31 has an inner surface 31a and an outer surface 31b serving as a pair of main surfaces, and the wall portion 32 has an inner surface 32a and an outer surface 32b serving as a pair of main surfaces. The outer surface 31b of the bottom portion 31 of the upper body 30 faces the upper surface 21 of the sole body 20, and the outer surface 32b of the wall portion 32 of the upper body 30 faces a portion of the inner surface 12a of the peripheral wall portion 12 of the shell 10A excluding a side closer to the lower end. Thus, the bottom portion 31 covers the upper surface 21 of the sole body 20, and the wall portion 32 covers the portion of the inner surface 12a of the peripheral wall portion 12 of the shell 10A excluding the side closer to the lower end.

The upper body 30 is similar in configuration to the upper body 30 that the shoe 1A according to the first embodiment comprises, and what material is used therefor and the like are also similar to those of the upper body 30 that the shoe 1A according to the first embodiment comprises.

As shown in FIG. 40, the internal space SP of the shell 10A is divided into a lower space SP1 and an upper space SP2. The lower space SP1 is located at a lower portion of the shoe 1D in the vertical direction, and the upper space SP2 is located at an upper portion of the shoe 1D in the vertical direction.

The lower space SP1 is a space defined by the bottom wall portion 11 and a portion of the peripheral wall portion 12 adjacent to the bottom wall portion 11 (that is, the first portion described above), and the entirety of the sole body 20 is disposed in the lower space SP1.

The upper space SP2 is a space defined by a portion of the peripheral wall portion 12 located above the first portion (that is, the second portion described above), and the entirety of the upper body 30 is disposed in the upper space SP2.

As has been described above, since the sole body 20 is accommodated in the internal space SP so as to cover the inner surface 11a of the bottom wall portion 11 of the shell 10A and a portion of the inner surface 12a of the peripheral wall portion 12 of the shell 10A closer to the lower end and the upper body 30 is accommodated in the internal space SP so as to cover the upper surface 21 of the sole body 20 and a portion of the inner surface 12a of the peripheral wall portion 12 of the shell 10A excluding the portion closer to the lower end, an insertion space SP3 defined by the upper body 30 will be formed in the internal space SP of the shell 10A.

The insertion space SP3 is a space in which a foot of the wearer is inserted when the shoe is worn, as has been set forth above, and more specifically, the insertion space SP3 is defined by the inner surface 31a of the bottom portion 31 of the upper body 30 and the inner surface 32a of the wall portion 32 of the upper body 30. The insertion space SP3 is included in the upper space SP2 of the internal space SP.

Note that, for the shoe 1D according to the present embodiment, the upper body 30 has a shape that entirely covers a portion of the foot of the wearer on the side of the distal end as seen at the ankle of the wearer, and a portion of the shell 10A that defines the upper space SP2, at a portion other than that corresponding to the topline 33 through which the foot of the wearer is inserted, entirely covers a portion of the foot of the wearer excluding the sole of the foot of the wearer.

Therefore, when a user wears the shoe 1D, the foot of the wearer comes into contact with the inner surface 31a of the bottom portion 31 and the inner surface 32a of the wall portion 32 of the upper body 30 that can be deformed in a flexible manner. Therefore, the shell 10A does not come into direct contact with the foot of the wearer, thereby ensuring that the user wears the shoe comfortably.

Note that it is not a requirement that the upper body 30 entirely comes into contact with the foot of the wearer, and the upper body 30 may be notched away or have a portion removed to have an opening insofar as the user can wear the shoe comfortably.

For the shoe 1D according to the present embodiment, as has been described above, an outermost shell of the shoe 1D is composed of the shell 10A, and in particular, by covering the lower surface 22 of the sole body 20 with the bottom wall portion 11 of the shell 10A, an outermost surface of the shoe 1D located on a lower side in the vertical direction is defined by the bottom wall portion 1 of the shell 10A. Thus, the shoe 1D has a tread composed of the outer surface 11b of the bottom wall portion 11 of the shell 10A.

Accordingly, by this configuration, in contrast to conventional shoes, the sole body 20 does not form a tread, which significantly increases a room for selection of material for the sole body 20, and an optimal material can be selected for the sole body 20 for functions required for a general sole in view of improved foot comfort and ensured cushioning. Performance required for the tread, such as abrasion resistance and grip, can be ensured by selecting a material for the shell 10A or in addition selecting a shape therefor. Therefore, the number of parts is not increased as compared with conventional shoes.

Thus, the shoe 1D according to the present embodiment can suppress an increase in the number of parts thereof while increasing a degree of freedom in selecting a material for the sole body.

Further, for the shoe 1D according to the present embodiment, as has been described above, the outermost shell of the shoe 1D is composed of the shell 10A, and the shell 10A includes the bottom wall portion 11 that defines the tread, and the peripheral wall portion 12 erected from a peripheral edge of the bottom wall portion 11 and including a portion that covers the instep of a foot of the wearer. By this configuration, there is also an advantage in that the shoe presents higher performance than a conventional shoe having an outermost shell composed of a sole and an upper (that is, a shoe which does not comprise such a member as the shell 10A of the shoe 1D according to the present embodiment).

That is, the above-described conventional shoe is typically configured such that the upper including a portion covering the instep of a foot of the wearer is composed of a woven material, a knitted material, nonwoven fabric, or the like and furthermore, the upper is bonded or the like to the sole by adhesion or the like, and accordingly, a delay is easily caused in a period of time for which a load acting on the portion of the upper that covers the instep when the wearer of the shoe kicks the ground is transmitted to the sole via a side wall of the upper, and the shoe would poorly follow the foot for running or the like, in particular.

In contrast, the shoe 1D according to the present embodiment is configured such that the peripheral wall portion 12 of the shell 10A including a portion covering the instep of the foot of the wearer is composed of a member composed of resin or rubber, similarly as has been described above for the first embodiment, and in addition, composed of a harder material than a woven material, a knitted material, nonwoven fabric, and the like, and furthermore, the peripheral wall portion 12 including the portion covering the instep and the bottom wall portion 11 including a portion defining the tread are integrally composed of the shell 10A composed of a single member. This allows a load acting when kicking the ground to be transmitted faster, and the shoe can thus excellently follow the foot for running, in particular. A direction in which the shell 10A transmits a load is schematically indicated in FIG. 40 by solid arrows, and a direction of a load thereby acting on the bottom wall portion 11 of the shell 10A is schematically indicated in FIG. 40 by blank arrows.

Thus, the shoe 1D according to the present embodiment can not only suppress an increase in the number of parts thereof while increasing a degree of freedom in selecting a material for the sole body but can also excellently follow the foot.

FIG. 41 is an exploded perspective view for illustrating a structure for assembling the shoe according to the present embodiment. Hereinafter a structure and method for assembling the shoe 1D according to the present embodiment will be described with reference to FIG. 41.

As shown in FIG. 41, the shoe 1D according to the present embodiment is manufactured by assembling together the shell 10A, the sole body 20, and the upper body 30 separately manufactured in advance. The shell 10A, the sole body 20 and the upper body 30 may be manufactured in any method.

Specifically, initially, the sole body 20 is inserted into the internal space SP of the shell 10A. As the sole body 20 is elastically deformable, the sole body 20 can be inserted into the internal space SP of the shell 10A via the insertion portion 13 in the form of an opening provided at an upper end of the shell 10A. The inserted sole body 20 is disposed along the inner surface 11a of the bottom wall portion 11 of the shell 10A.

Subsequently, the sole body 20 is fixed to the shell 10A. This can be done for example by sewing, bonding, welding, clipping, or engagement by engaging portions provided to the sole body 20 and the shell 10A, or the like. When the sole body 20 does not easily move inside the shell 10A, the former may not be fixed to the latter.

Subsequently, the upper body 30 is inserted into the internal space SP of the shell 10A. As the upper body 30 is flexibly deformable, the upper body 30 can be inserted into the internal space SP of the shell 10A via the insertion portion 13 in the form of an opening provided at an upper end of the shell 10A. The inserted upper body 30 is disposed along the upper surface 21 of the sole body 20 and the inner surface 12a of the peripheral wall portion 12 of the shell 10A. The upper body 30 in a vicinity of the topline 33 is externally exposed from the insertion portion 13 of the shell 10A.

Subsequently, the upper body 30 is fixed to the shell 10A and the sole body 20. This can be done for example by sewing, bonding, welding, clipping, engagement by engaging portions provided to the upper body 30 and the shell 10A, engagement by engaging portions provided to the upper body 30 and the sole body 20, or the like. When the upper body 30 does not easily move inside the shell 10A, the former may not be fixed to the latter.

The above procedure completes assembling the shell 10A, the sole body 20 and the upper body 30 together, and hence manufacturing the shoe 1D according to the present embodiment. Note that the above-described assembling method is merely an example, and other assembling methods may be adopted.

Thus, the shoe 1D according to the present embodiment can be manufactured through a very simple operation, that is, the shell 10A, the sole body 20, and the upper body 30 that are separately manufactured in advance are assembled together, and the shoe is thus manufactured more easily than conventional. In addition, assembling the shell 10A, the sole body 20 and the upper body 30 together does not require a cumbersome positioning operation or the like, either.

Thus, the shoe 1D according to the present embodiment can not only suppress an increase in the number of parts thereof while increasing a degree of freedom in selecting a material for the sole body but can also be manufactured more easily than conventional.

Nineteenth Embodiment

Figure 42:
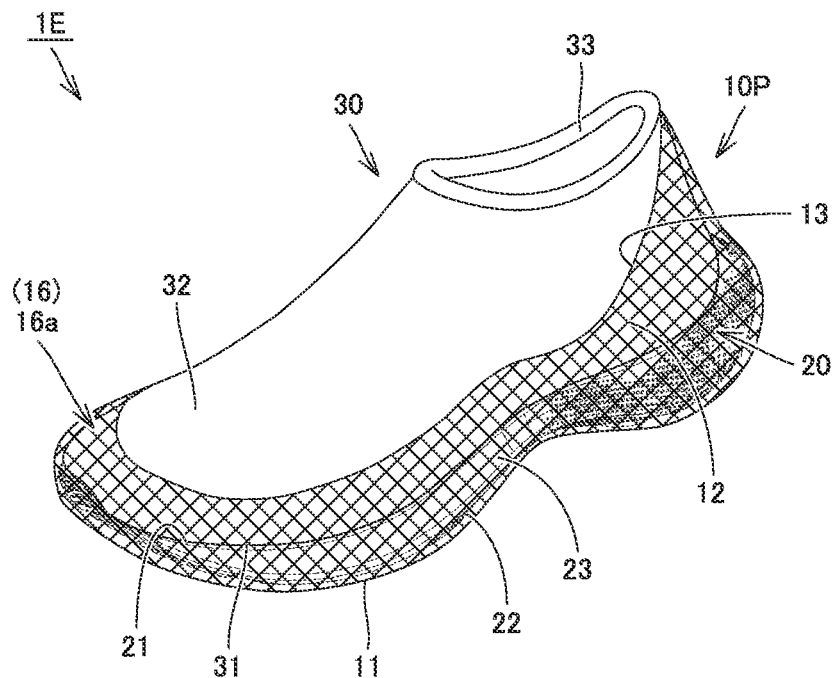
FIG. 42 is a perspective view of a shoe according to a nineteenth embodiment.

FIG. 42 is a perspective view of a shoe according to a nineteenth embodiment. Hereinafter, a shoe 1E according to the present embodiment will be described with reference to FIG. 42.

As shown in FIG. 42, the shoe 1E according to the present embodiment comprises a shell 10P having a configuration different from that of the shell 10A that the shoe 1D according to the eighteenth embodiment comprises, and has a remainder in configuration similar to the shoe 1D according to the eighteenth embodiment.

Specifically, for the shell 10P, the insertion portion 13 in the form of an opening provided at an upper end of the peripheral wall portion 12 is formed to be large across the forefoot portion R1, the midfoot portion R2, and the rearfoot portion R3. More specifically, the peripheral wall portion 12 is configured to mainly cover a portion of a foot of the wearer corresponding to the toes, a portion of the foot of the wearer corresponding to the medial and lateral sides of the instep, and a portion of a peripheral surface of the heel of the foot of the wearer that corresponds to the side of the sole of the foot of the wearer, and the peripheral wall portion 12 generally does not cover a portion corresponding to a central portion of the instep of the foot of the wearer in the direction of the width of the foot and a portion of the peripheral surface of the heel of the foot of the wearer that corresponds to the side of an ankle.

Thus, the upper body 30 has the wall portion 32 externally exposed at the portion corresponding to the central portion of the instep of the foot of the wearer in the direction of the width of the foot and the portion of the peripheral surface of the heel of the foot of the wearer that corresponds to the side of the ankle.

The shoe 1E according the present embodiment also has the shell 10P with the internal space SP divided into the lower space SP1 and the upper space SP2, and the lower space SP1 is defined by the bottom wall portion 11 and the above-described first portion of the peripheral wall portion 12 and the upper space SP2 is defined by the above-described second portion of the peripheral wall portion 12. And by accommodating the sole body 20 inside the lower space SP1, the shoe 1E has a tread composed of the outer surface 11b of the bottom wall portion 11 of the shell 10P.

Thus, the shoe 1E according to the present embodiment, as well as the shoe 1D according to the eighteenth embodiment, can suppress an increase in the number of parts thereof while increasing a degree of freedom in selecting a material for the sole body, and furthermore, can be manufactured more easily than conventional.

Twentieth Embodiment

Figure 43:
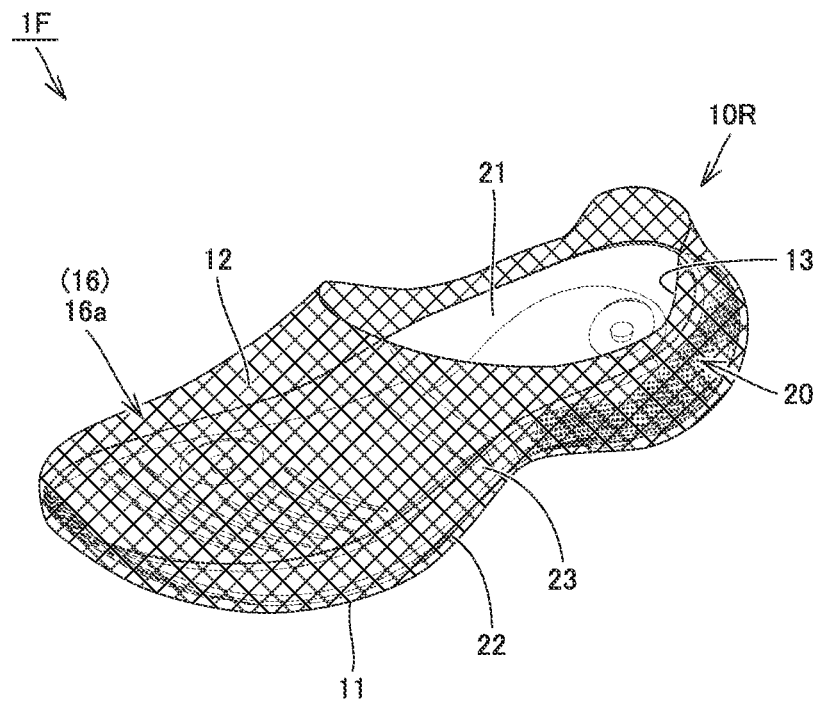
FIG. 43 is a perspective view of a shoe according to a twentieth embodiment.

FIG. 43 is a perspective view of a shoe according to a twentieth embodiment. Hereinafter, a shoe 1F according to the present embodiment will be described with reference to FIG. 43.

As shown in FIG. 43, the shoe 1F according to the present embodiment comprises a shell 10R having a configuration different from that of the shell 10A that the shoe 1D according to the eighteenth embodiment comprises, excludes the upper body 30 that the shoe 1D according to the eighteenth embodiment comprises, and has a remainder in configuration similar to the shoe 1D according to the eighteenth embodiment. The shoe 1F according to the present embodiment is a so-called sandal.

Specifically, for the shell 10R, the insertion portion 13 in the form of an opening provided at an upper end of the peripheral wall portion 12 is formed to be large across the midfoot portion R2 and the rearfoot portion R3. More specifically, the peripheral wall portion 12 is configured to mainly cover a portion of a foot of the wearer corresponding to the toes, a portion of the foot of the wearer corresponding to the instep, and a portion of a peripheral surface of the heel of the foot of the wearer that corresponds to the side of the sole of the foot of the wearer, and the peripheral wall portion 12 generally does not cover a portion of the peripheral surface of the heel of the foot of the wearer that corresponds the side of the ankle.

The shoe 1F according the present embodiment also has the shell 10R with the internal space SP divided into the lower space SP1 and the upper space SP2 and the lower space SP1 is defined by the bottom wall portion 11 and the above-described first portion of the peripheral wall portion 12 and the upper space SP2 is defined by the above-described second portion of the peripheral wall portion 12. And by accommodating the sole body 20 inside the lower space SP1, the shoe 1F has a tread composed of the outer surface 11b of the bottom wall portion 11 of the shell 10R.

Thus, the shoe 1F according to the present embodiment, as well as the shoe 1D according to the eighteenth embodiment, can suppress an increase in the number of parts thereof while increasing a degree of freedom in selecting a material for the sole body, and furthermore, can be manufactured more easily than conventional.

Summary of Disclosure in Embodiments

The first to twentieth embodiments and their exemplary variations disclose characteristic configurations, as summarized below:

A shoe according to an aspect of the present disclosure comprises a shell and a sole body. The shell is formed of a flexible member having an internal space to receive a foot of a wearer of the shoe. The sole body is accommodated in the shell and supports the sole of the foot of the wearer. The shell includes a bottom wall portion and a peripheral wall portion erected from a peripheral edge of the bottom wall portion. For a shoe according to an aspect of the present disclosure, the bottom wall portion and a portion of the peripheral wall portion adjacent to the bottom wall portion define a lower space of the internal space in which the sole body is disposed, and a portion of the peripheral wall portion located above the portion adjacent to the bottom wall portion defines at least a portion of an upper space of the internal space in which the wearer's foot is inserted. For a shoe according to an aspect of the present disclosure, the bottom wall portion covers a lower surface of the sole body and thus has an external surface configuring a tread of the shoe.

A shoe according to an aspect of the present disclosure may further comprise an upper body accommodated in the shell and at least covering the instep of the foot of the wearer.

For a shoe according to an aspect of the present disclosure, the upper body may be in a form of a bag having an opening at a portion thereof corresponding to a topline through which the foot of the wearer is inserted. In that case, the upper body may be disposed in the upper space and the lower space along an inner surface of the shell and the sole body may thus be accommodated in the upper body.

For a shoe according to an aspect of the present disclosure, the upper body may be in a form of a bag having an opening at a portion thereof corresponding to a topline through which the foot of the wearer is inserted. In that case, the upper body may be disposed along an inner surface of the portion of the shell that defines the upper space and along an upper surface of the sole body, and the sole body may thus be sandwiched between the bottom wall portion and the upper body.

For a shoe according to an aspect of the present disclosure, it is preferable that the portion of the shell that defines the upper space at least covers a portion of the instep of the foot of the wearer on a medial foot side and a portion of the instep of the foot of the wearer on a lateral foot side.

For a shoe according to one aspect of the present disclosure, it is preferable that the portion of the shell that defines the upper space at least covers a peripheral surface of the heel of the foot of the wearer.

For a shoe according to an aspect of the present disclosure, the portion of the shell that defines the upper space, at a portion other than that corresponding to a topline through which the foot of the wearer is inserted, may entirely cover a portion of the foot of the wearer excluding the sole of the foot of the wearer.

For a shoe according to an aspect of the present disclosure, the shell may at least have a base structure portion composed of a curved mesh member including a plurality of wire elements connected to cross one another.

For a shoe according to an aspect of the present disclosure, the shell may at least have a base structure portion composed of a curved plate-shaped member. In that case, the base structure portion may have a plurality of holes.

For a shoe according to an aspect of the present disclosure, the shell may at least have a base structure portion composed of a member analogous to a curved knitted structure.

For a shoe according to an aspect of the present disclosure, the shell may further include a design portion formed to cover the base structure portion.

For a shoe according to an aspect of the present disclosure, the portion of the shell that defines the upper space may at least cover the instep of the foot of the wearer, and in that case, the portion of the shell that covers the instep of the foot of the wearer may have a multilayer structure.

For a shoe according to an aspect of the present disclosure, the portion of the shell that defines the upper space may at least cover a peripheral surface of the heel of the foot of the wearer, and in that case, the portion of the shell that covers the peripheral surface of the heel of the foot of the wearer may have a multilayer structure.

For a shoe according to an aspect of the present disclosure, the portion of the shell that defines the upper space may at least cover a portion adjacent to a topline through which the foot of the wearer is inserted, and in that case, the portion of the shell adjacent to the topline through which the foot of the wearer is inserted may have a multilayer structure.

For a shoe according to one aspect of the present disclosure, the bottom wall portion may have a multilayer structure.

For a shoe according to one aspect of the present disclosure, the bottom wall portion may be larger in thickness than the peripheral wall portion.

For a shoe according to one aspect of the present disclosure, the shell may be composed of a single member.

For a shoe according to one aspect of the present disclosure, the shell may be composed of a plurality of members combined together.

(Other Modes)

The first to twentieth embodiments and their exemplary variations indicate a variety of parts, which can be changed specifically in shape, configuration, size, number, position and the like as appropriate without departing from the gist of the present invention.

The first to twentieth embodiments and their exemplary variations disclose characteristic configurations, which can be combined with one another without departing from the gist of the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A shoe comprising:
    a flexible shell having an internal space configured to receive a foot of a wearer; and
    a sole body accommodated in the shell and supporting a sole of the foot of the wearer, wherein
    the shell includes a bottom wall portion and a peripheral wall portion erected from a peripheral edge of the bottom wall portion,
    the shell is comprised of an additively manufactured product composed of resin or rubber,
    the bottom wall portion and a portion of the peripheral wall portion adjacent to the bottom wall portion define a lower space of the internal space in which the sole body is disposed, and a portion of the peripheral wall portion located above the portion adjacent to the bottom wall portion defines at least a portion of an upper space of the internal space that is configured to receive the foot of the wearer,
    the bottom wall portion covers a lower surface of the sole body and has an external surface configuring a tread of the shoe, and
    the shell at least has a base structure portion comprising a curved mesh member including a plurality of wire elements connected to cross one another.

2. The shoe according to claim 1, further comprising:
    an upper body accommodated in the shell and configured to cover at least an instep of the foot of the wearer.

3. The shoe according to claim 2, wherein
    the upper body has an opening at a portion thereof corresponding to a topline through which the foot of the wearer is inserted, and
    the upper body is disposed in the upper space and the lower space along an inner surface of the shell and the sole body is thus accommodated in the upper body.

4. The shoe according to claim 2, wherein
    the upper body is configured as a bag having an opening at a portion thereof corresponding to a topline through which the foot of the wearer is inserted, and the upper body is disposed along an inner surface of the portion of the shell that defines the upper space and along an upper surface of the sole body, and the sole body is thus sandwiched between the bottom wall portion and the upper body.

5. The shoe according to claim 1, wherein
the portion of the shell that defines the upper space is configured to cover at least a portion of an instep of the foot of the wearer on a medial foot side and a portion of the instep of the foot of the wearer on a lateral foot side.

6. The shoe according to claim 1, wherein
the portion of the shell that defines the upper space is configured to cover at least a peripheral surface of a heel of the foot of the wearer.

7. The shoe according to claim 1, wherein
the portion of the shell that defines the upper space, at a portion other than that corresponding to a topline through which the foot of the wearer is inserted, is configured to entirely cover a portion of the foot of the wearer excluding the sole of the foot of the wearer.

8. The shoe according to claim 1, wherein
the shell at least has a base structure portion comprising a curved plate-shaped member.

9. The shoe according to claim 8, wherein
the base structure portion has a plurality of holes therein.

10. The shoe according to claim 1, wherein
the shell at least has a base structure portion including a curved knitted structure.

11. The shoe according to claim 1, wherein
the shell further includes a design portion configured to cover the base structure portion.

12. The shoe according to claim 1, wherein
the portion of the shell that defines the upper space is configured to cover at least an instep of the foot of the wearer, and
the portion of the shell that is configured to cover the instep of the foot of the wearer has a multilayer structure.

13. The shoe according to claim 1, wherein
the portion of the shell that defines the upper space is configured to cover at least a peripheral surface of a heel of the foot of the wearer, and
the portion of the shell that is configured to cover the peripheral surface of the heel of the foot of the wearer has a multilayer structure.

14. The shoe according to claim 1, wherein
a portion of the shell that defines the upper space is configured to cover at least a portion adjacent to a topline through which the foot of the wearer is inserted, and
the portion of the shell adjacent to the topline through which the foot of the wearer is inserted has a multilayer structure.

15. The shoe according to claim 1, wherein
the bottom wall portion has a multilayer structure.

16. The shoe according to claim 1, wherein
the bottom wall portion is larger in thickness than the peripheral wall portion.

17. The shoe according to claim 1, wherein
the shell is configured of a single member.

18. The shoe according to claim 1, wherein
the shell is configured of a plurality of members combined together.

* * * * *